US011740206B2

(12) United States Patent
Giurgiutiu et al.

(10) Patent No.: US 11,740,206 B2
(45) Date of Patent: Aug. 29, 2023

(54) ANGLE-BEAM GUIDED WAVES FOR COMPOSITE-DAMAGE IDENTIFICATION AND MONITORING

(71) Applicant: University of South Carolina, Columbia, SC (US)

(72) Inventors: Victor Giurgiutiu, Columbia, SC (US); Robin James, Columbia, SC (US); Hanfei Mei, Columbia, SC (US); Mohammad Faisal Haider, East Palo Alto, CA (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/024,906

(22) Filed: Sep. 18, 2020

(65) Prior Publication Data
US 2021/0148861 A1 May 20, 2021

Related U.S. Application Data

(60) Provisional application No. 62/936,758, filed on Nov. 18, 2019.

(51) Int. Cl.
*G01N 29/04* (2006.01)
*G01N 29/07* (2006.01)

(52) U.S. Cl.
CPC ......... *G01N 29/041* (2013.01); *G01N 29/075* (2013.01)

(58) Field of Classification Search
CPC ............... G01N 29/041; G01N 29/075; G01N 29/0645; G01N 29/07; G01N 29/46; G01N 29/4472; G01N 2291/0231; G01N 2291/0425; G01N 2291/0427; G01N 29/2487

See application file for complete search history.

(56) References Cited

U.S. PATENT DOCUMENTS

| 6,578,424 B1 * | 6/2003 | Ziola | G01N 29/223 73/632 |
| 2016/0011151 A1 * | 1/2016 | Campbell Leckey | G01N 29/043 73/601 |

OTHER PUBLICATIONS

A Methodological Review of Piezoelectric Based Acoustic Wave Generation and Detection Techniques for Structural Health Monitoring (Year: 2013).*

* cited by examiner

*Primary Examiner* — Xin Y Zhong
(74) *Attorney, Agent, or Firm* — Burr & Forman LLP; Douglas L. Lineberry

(57) ABSTRACT

Detection, identification, and monitoring of various composite-damage types such as impact damage, delaminations, etc. using angle-beam coupled guided waves and methods and systems that permit excitation with angle-beam techniques of certain composite-material guided-wave modes that cannot be excited in isotropic metals with angle-beam methods.

18 Claims, 68 Drawing Sheets

Table 1. Engineering constants of the unidirectional prepreg.

| $E_{11}$ | $E_{22}$ | $E_{33}$ | $\nu_{12}$ | $\nu_{13}$ | $\nu_{23}$ | $G_{12}$ | $G_{13}$ | $G_{23}$ | $\rho$ |
|---|---|---|---|---|---|---|---|---|---|
| 153 GPa | 8.7 GPa | 8.7 GPa | 0.37 | 0.37 | 0.5 | 6.9 GPa | 6.9 GPa | 2.9 GPa | 1625 kg/m³ |

FIGURE 43

Table 2
Impact testing conducted on the 3-mm thick quasi-isotropic composite coupon.

| Mass (kg) | Drop Height (cm) | Velocity (m/s) | Energy (J) |
|---|---|---|---|
| 3.06 | 58.54 | 3.07 | 17.56 |

FIGURE 63

ANGLE-BEAM GUIDED WAVES FOR COMPOSITE-DAMAGE IDENTIFICATION AND MONITORING

This invention was made with government support under FA9550-16-1-0401 awarded by the Air Force Office of Scientific Research. The government may have certain rights in the invention.

BACKGROUND OF THE INVENTION

1) Field of the Invention

The present invention relates to detection, identification, and monitoring of various composite-damage types such as impact damage, delaminations, etc. using angle-beam coupled guided waves and methods and systems that permit excitation with angle-beam techniques of certain composite-material guided-wave modes that cannot be excited in isotropic metals with angle-beam methods.

2) Description of Related Art

Carbon fiber reinforced polymer (CFRP) composite materials have been widely used in aerospace structures due to their high specific strength and stiffness, resistance to corrosion, and being lightweight. However, it has posed new challenges for implementing guided wave-based structural health monitoring (SHM) techniques due to the general anisotropic behavior and complicated wave-damage interaction phenomena in composites.

Composite structures are prone to various types of damage, including fiber breakage, matrix cracking, delamination, and impact damage. Barely visible impact damage (BVID) from low-velocity impact is the most prevalent type of damage found in composite structures. This damage, in the form of matrix cracks, delamination, and fiber breakage, is invisible to the naked eye and is easily induced from various sources such as bird strikes, tools dropped on parts during manufacture and servicing, or runway debris encountered during takeoff. BVID can result in a noticeable decrease in the load carrying capability of the composite structures, and such damage can develop progressively, leading to a catastrophic failure. Due to the general anisotropic behavior and complex damage scenarios, the successful implementation of damage detection in aerospace composite structures is extremely challenging To ensure the safety and reliability of composite structures, various nondestructive evaluation (NDE) techniques have been developed for the damage detection in composite structures, including thermography, X-ray, and ultrasonic C-scan. However, the use of these techniques is often expensive, labor-intensive, and depends heavily on the skill and experience of the operator. Structural health monitoring (SHM) technologies offer a promising alternative. In recent decades, many SHM techniques have been developed for the damage detection in composites, such as electromechanical impedance (EMI), acoustic emission (AE), and guided-wave-based methods. Among them, guided wave based SHM technologies have been used to detect various types of damage in composite structures, including delamination, fiber breakage, and debonding.

Guided waves have the advantage of long-distance propagation in complex structures and low energy loss, which have been widely used in the structural health monitoring of composite structures. However, the problem for the typical guided wave is complicated by the existence of at least two wave modes at any given frequency, and by the inherent dispersive nature of the guided wave modes existing in thin-wall structures. It makes the result difficult to interpret. To solve the problem, researchers are using tuning effect to find the gist of the suitable frequency to excite the single mode guided wave. In recent years, the angle beam transducer (ABT) with wedge has been utilized to achieve tuned wave excitation and detection based on Snell's law.

Many studies facilitate the understanding of guided wave based SHM applications using angle beam transducer.

Compared with widely used guided waves, shear horizontal (SH) waves are relatively simple but less investigated probably due to the traditional notion that SH waves were usually excited by electromagnetic acoustic transducers (EMAT), which required the high energy in excitation and the conductive materials in the inspection. The significance of SH waves has increased in recent years by the development of new techniques to overcome difficulties associated with SH wave generation. The SH wave piezoelectric transducers based on d24, d36, and d15 piezoelectric wafers or strips have been developed for the generation of SH waves. However, these SH wave transducers have to be bonded on the structure to be effective. The pure SH wave excitation in composites and its damage detection are very limited.

Accordingly, it is an object of the present invention to provide enhanced identification, and monitoring of various composite-damage types such as impact damage, delaminations, etc. using angle-beam coupled guided waves via methods that permit excitation with angle-beam techniques of certain composite-material guided-wave modes that cannot be excited in isotropic metals with angle-beam methods.

SUMMARY

In one embodiment, a method for detecting various types of damage in composites is provided. The method may include employing at least one adjustable angle beam transducer to achieve single-mode guided wave excitation, generating a shear horizontal (SH0) wave, observing wave propagation and interaction with a test subject, and detecting damage in the test subject. Further, types of damage detected may include wrinkle damage, multilayer delamination, and/or impact damage. Yet still, damage in the test subject may be indicated via an SH0 amplitude drop. Still again, linear scanning may estimate a size of at least one delamination and impact damage. Further again, the least one adjustable angle beam transducer may impinge on the test subject at an oblique angle. Yet still, the method may include adjusting a tuning angel via an angle-adjustable wedge. Moreover, the tuning angle may be calculated via the equation:

$$\sin\theta = \frac{c_w}{c}.$$

Still further, the tuning angle may be adjusted from 0 to 70 degrees. Again, the method may include obtaining a phase-velocity dispersion curve of the test subject. Further again, trapped energy analysis may indicate a number of delaminations in the test subject.

In a further embodiment, a nondestructive inspection method is provided. The method may include exciting at least one adjustable angle beam transducer with an excitation signal, achieving single-mode guided wave excitation, generating a shear horizontal (SH0) wave, observing wave propagation and interaction with a test subject, detecting damage in the test subject. Further, trapped energy analysis may be used to separate locations of multiple delaminations in the test subject. Still again, at least two adjustable angle beam transducers may be employed with one acting as a transmitter and one acting as a receiver. Further still, detecting a SH0 amplitude drop may estimate a size of damage to a test subject. Yet again, detecting damages may include detecting matrix cracking, fiber breakage, and/or interlaminar delamination. Yet further, the method may include conducting line scanning using at least two adjustable angle beam transducers. Yet still, line scanning may determine a size of impact damage on the test subject. Again further, a tuning angel may be adjusted via an angle-adjustable wedge. Still further, the tuning angle may be calculated via the equation:

$$\sin\theta = \frac{c_w}{c}.$$

Again still, the tuning angle may be adjusted from 0 to 70 degrees.

These and other aspects, objects, features, and advantages of the example embodiments will become apparent to those having ordinary skill in the art upon consideration of the following detailed description of example embodiments.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 43 shows Table 1—Engineering constants of the unidirectional prepreg.

FIG. 63 shows Table 2, Impact testing conducted on the 3-mm thick quasi-isotropic composite coupon.

Figure 1:
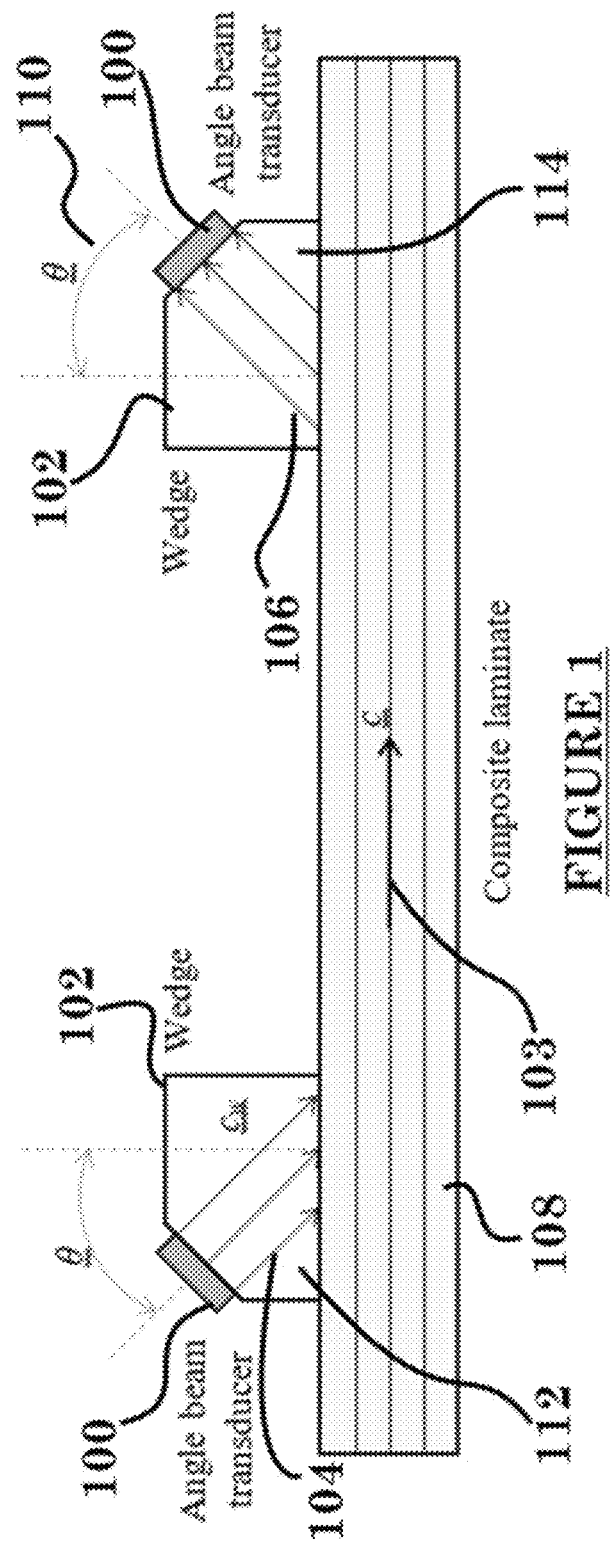
FIG. 1 shows wave tuning using an angle beam transducer and wedge in a composite laminate.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure is intended for rapid large-area inspection of composite structures to detect the presence of flaws or damage and identify their type and location. For more detailed evaluation, the methods of this disclosure can be followed up by local-area conventional methods (e.g., through-thickness ultrasound, X-ray, eddy current, etc.) which are more precise but slower and labor intensive. The advantage of the proposed method is that permits rapid decision upon which local structural areas need labor-intensive evaluation by conventional inspection methods. The current disclosure provides use of the existing angle-beam and phased array transducers for generating pure shear horizontal (SH) mode excitation for damage detection in composites which has not been demonstrated previously as well as multi-mode guided-wave generation using angle beam transducers in the same composite material for damage detection of different composite damage types which has not been demonstrated in the past The current disclosure deals with detection, identification, and monitoring of various composite-damage types such as impact damage, delaminations, etc. using angle-beam coupled guided waves. The novelty of the current disclosure consists in developing methods that permit excitation with angle-beam techniques of certain composite-material guided-wave modes that cannot be excited in isotropic metals with angle-beam methods.

This guided-wave method is much more efficient than point-by-point through-the-thickness scanning methods currently employed in practice because guided waves can be transmitted between angle-beam or phased-array transducers covering a considerable area between them.

This disclosure presents a new methodology for the detection of various types of composite damage such as delamination growth and impact damage through the application of guided waves using multiple modes of propagation. The fundamental idea is that various wave modes interact differently with various types of composite damage.

In the proposed new method, selectively pure guided wave excitation was achieved in the composite structures using the angle beam transducer (ABT), and variable angle wedge and another ABT or a phased array transducer (PAT) were used as receivers, shown via two separate experimental setups. First, guided wave dispersion curves were determined from the semi-analytical finite element (SAFE) method, and the corresponding tuning angles for various wave modes were obtained by applying Snell's law. After this, pitch-catch experiments were conducted to validate the pure mode excitations and the experimental group velocity was measured and compared to the theoretical value to verify if the pure modes were indeed excited during the experiments. In addition, long-distance wave propagation experiments were conducted to demonstrate the applicability of guided wave detection over a large area. Next, experimental validations on a thin quasi-isotropic CFRP composite plate with simulated delamination by Teflon insert and impact damage were conducted.

In the experiment, pure quasi-S0 mode and quasi-SH0 mode were used to detect the damage. For the case of exciting the quasi-S0 mode, it was observed that it is only sensitive to the impact damage, while quasi-SH0 mode is sensitive to both delamination and impact damage. In this way, we can separate the detection of delamination and impact damage by choosing different wave modes. This can enable us to identify the type of damage as well. In addition, it can be found that a significant decrease in the signal amplitude was observed due to the presence of different types of damage.

Finally, the same technique was applied to a thick quasi-isotropic CFRP composite plate using the guided wave detection by exciting multiple modes to distinguish delamination and impact damage. In this disclosure, we demonstrate the validity and usefulness of this technique for damage detection in composite structures of different thicknesses and over long distances.

Two experimental setups have been described in this disclosure: (1) ABT-ABT setup and ABT-PAT setup. For ABT-ABT, in this experimental setup one ABT is used as the transmitter and the other ABT is used as the receiver. Both ABT's are set at the same angle using their variable angle wedges to excite and receive pure wave modes. For ABT-PAT, ABT is used as the transmitter and its variable angle wedge is set to a specific angle to excite a pure wave mode and the PAT is used as a receiver and receives the waves at multiple angles (0 degrees to 70 degrees). The advantage of using the PAT as a receiver is that it can receive the wave mode at multiple angles and if there is mode conversion due to the presence of damage, the mode converted time-domain signal can also be extracted.

The current disclosure has multiple significant features: theory of angle beam transducers for single mode excitation; determining the tuning angles for pure mode excitation; FEM simulation of pure mode excitation and experimental validation; detection of various composite damage types using an ABT-ABT experimental setup; and detection of various composite damage types using an ABT-PAT experimental setup.

Angle beam transducer (ABT) 100 and wedge 102 are generally used to generate and receive guided waves with specified mode-frequency combinations. In a practical application, the selection of single wave mode can be realized by using wedge 102 for a selected frequency. Referring to Equation 1, let cm be the velocity of the pressure waves 104 and 106 in wedge 102, c 103 is the phase velocity of a desired wave mode at a selected frequency in a thin-wall composite structure 108, and θ 110 is the incident angle of the pressure waves impinging on composite structure 108, as depicted in FIG. 1. According to Snell's law, wave mode with a phase velocity of c will be enhanced through the phase matching, much more than waves of any other phase velocities, if the following condition is satisfied, where θ is the tuning angle or incident angle:

$$\sin\theta = \frac{c_w}{c} \quad (1)$$

Figure 2:
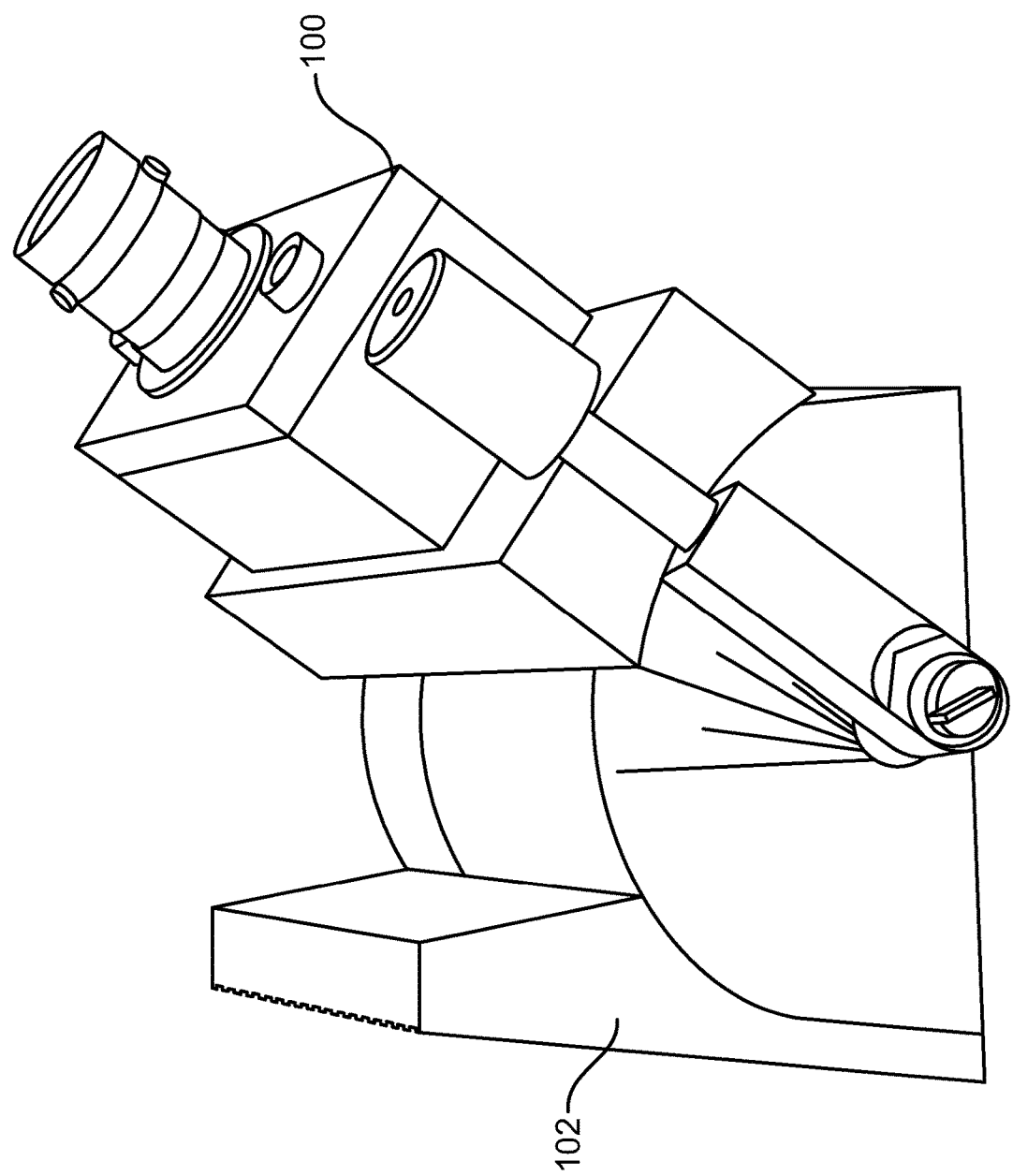
FIG. 2 shows an Olympus variable angle wedge with angle beam transducer (ABT) on the top.

Therefore, wedge 102 and angle beam transducer 100 can be paired and used for tuned wave excitation and detection. In order to change the incident angle θ and excited different wave modes, the variable angle beam wedge 102, for example an ABWX-2001 manufactured by Olympus, may be used, as shown in FIG. 2. Variable angle beam wedge 102 allows the user to adjust the incident angle from 0° to 70° to generate various wave modes.

Figure 3:
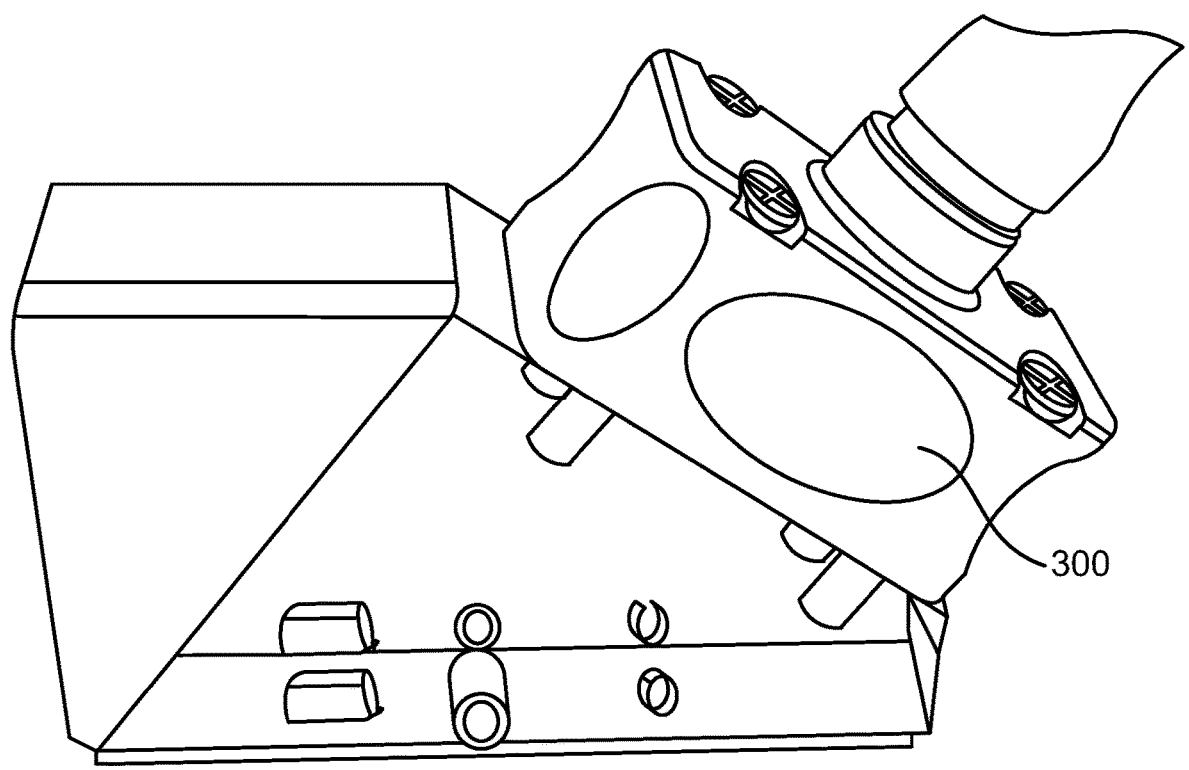
FIG. 3 shows a phased array transducer.

ABT 100 may be used as both a transmitter 112 and receiver 114 for the ABT-ABT experimental setup shown in FIG. 1 and the PAT 300 displayed in FIG. 3 can be used as a receiver for the ABT-PAT experimental setup.

Determining the Tuning Angles for Pure Mode Excitation

In this section, the tuning angle of the 2 mm [−45/90/45/0]$_{2s}$ quasi-isotropic CFRP composite plate was determined for pure mode guided wave excitation. The material properties were measured experimentally using the ultrasonic immersion technique as described in, given in, TABLE 1, see FIG. 43.

Dispersion curves for a 2-mm quasi-isotropic CFRP composite plate were obtained using the semi-analytical finite element (SAFE) method. For the SAFE approach, 32 one-dimensional (1D) quadratic elements across the thickness direction were used to ensure the convergence of the solution.

Figure 4:
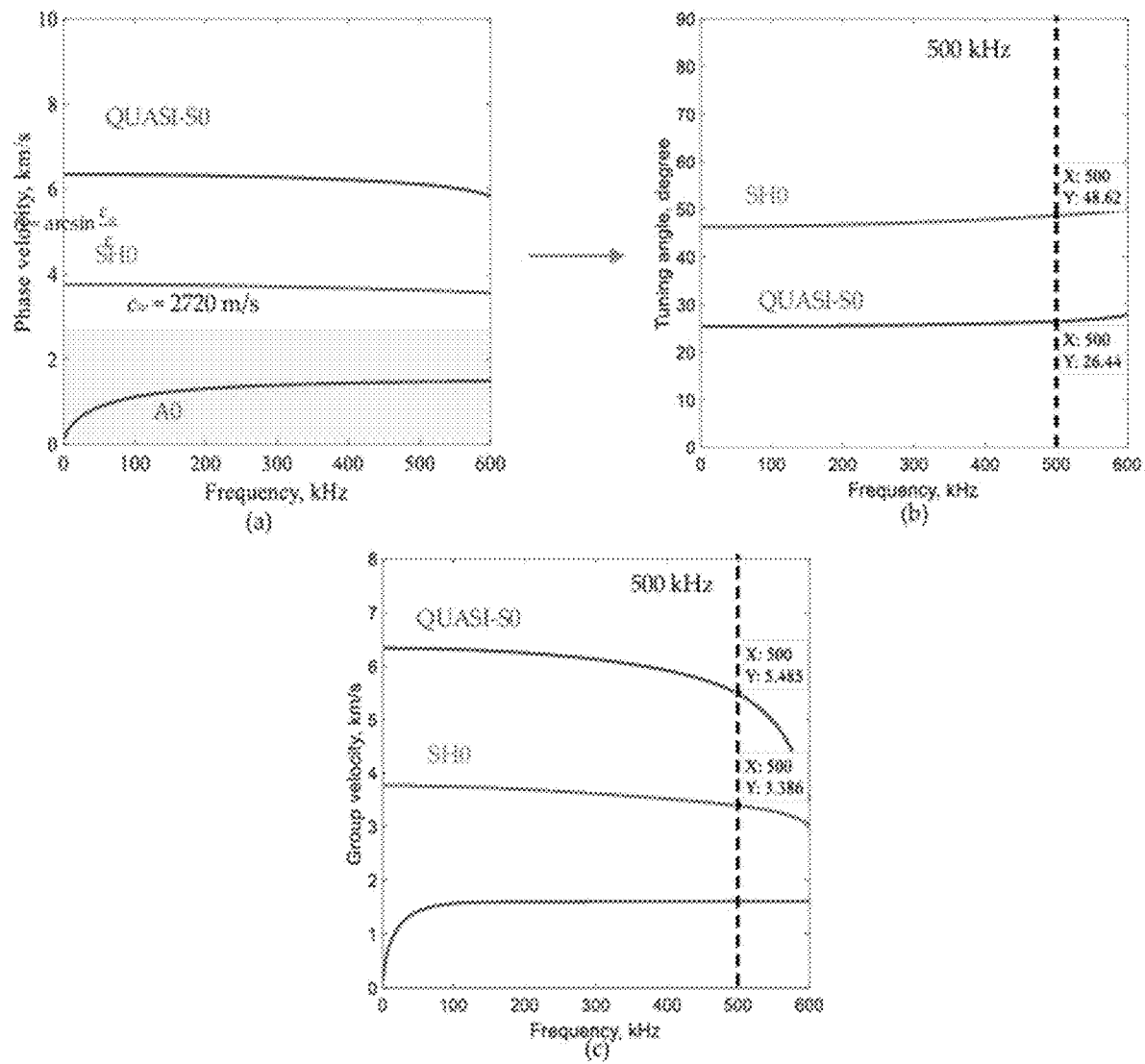
FIG. 4 shows dispersion curves in the 2-mm [−45/90/45/0]$_{2s}$ quasi-isotropic composite plate: (a) phase velocity; (b) tuning angle; (c) group velocity.

Phase-velocity dispersion curves of the quasi-isotropic CFRP composite plate in the 0° direction are shown in FIG. 4 at (a). In this study, the wedge velocity of variable angle wedge is 2720 m/s and the central frequency of the angle beam transducer is 500 kHz. The theoretical tuning angle was calculated based on Equation 1, as shown in FIG. 4 at (b). It can be found that the wave modes cannot be excited when their phase velocities are below cw. At 500 kHz, quasi-S0 mode and quasi-SH0 mode can be excited and the corresponding tuning angle are around 26° and 49°, respectively Therefore, the incident angles of the angle beam transducer should be set to 26° and 49° to excite pure quasi-S0 mode and quasi-SH0 mode in the quasi-isotropic CFRP composite plate. In addition, the group-velocity dispersion curves are shown in FIG. 4 at (c), and the group velocities of quasi-S0 mode and quasi-SH0 mode at 500 kHz are 5.485 mm/μs and 3.386 mm/μs, respectively.

FEM Simulation of Pure Mode Excitation and Experimental Validation

Figure 5:
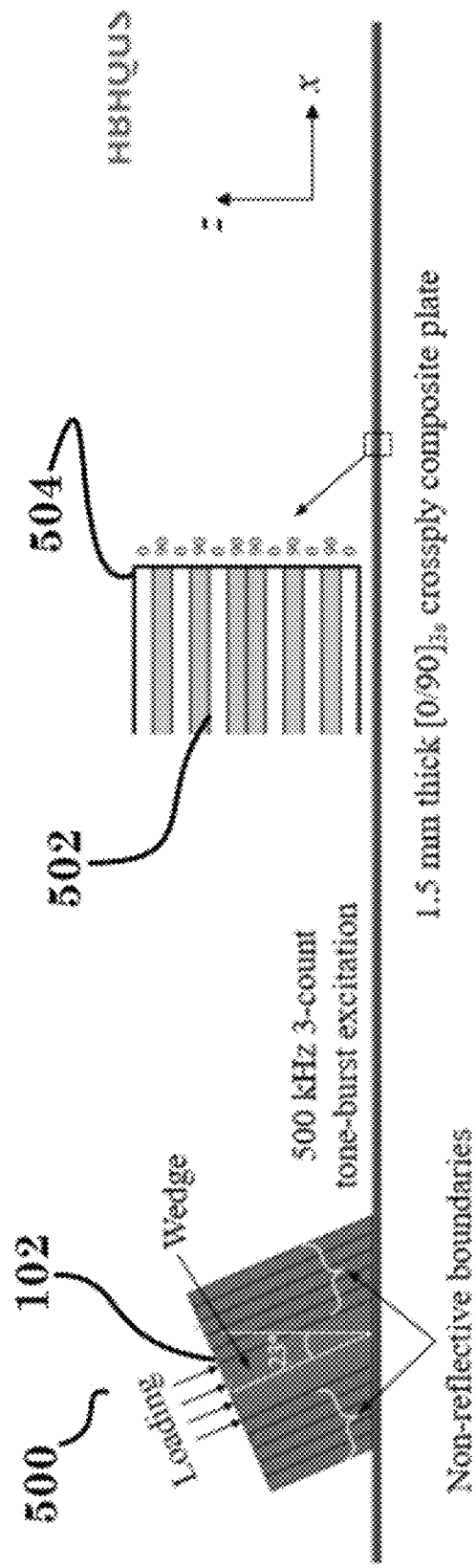
FIG. 5 shows the geometry of the 2D FEM model.
Figure 6:
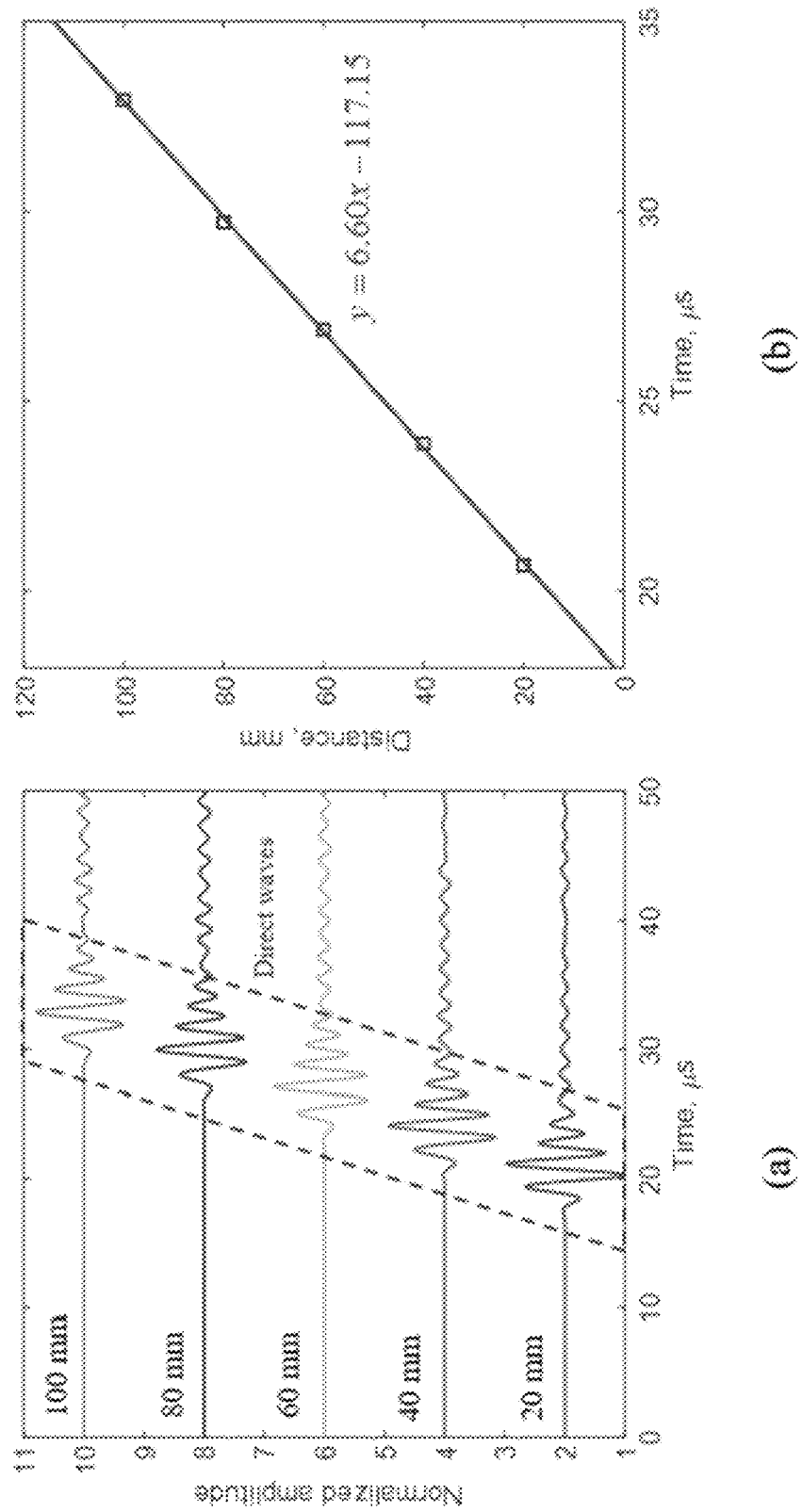
FIG. 6 at (a) shows extracted signals of x-direction displacement at different locations from the transducer and at (b) the time of flight vs distance plot.

To verify that pure mode excitation can be achieved using an angle beam transducer, an FEM simulation 500 was conducted on a 1.5 mm thick cross-ply CFRP composite coupon 502 having a stacking sequence 504 of $[0/90]_{3s}$ in ABAQUS. The material properties described in Table 1, see FIG. 43, were used to model the CFRP composite coupon 502. An angle beam transducer, not shown, with a wedge 102 was modeled to produce a 500 kHz 3-count tone-burst excitation 504 to generate a pure quasi-S0 mode and the tuning angle to do so was determined using the method described supra. FIG. 5 shows the geometry of the 2D FEM model. The displacement in the x-direction was picked up at different distances from the ABT and these direct waves were used to calculate the group velocity. FIG. 6 (a) displays the extracted signals at different locations and FIG. 6 (b) displays the time of flight vs. distance plot to determine the group velocity.

The calculated group velocity of the direct waves is 6.60 mm/μs, which matches the group velocity of quasi-S0 mode (theoretical value is 6.58 mm/μs at 500 kHz). By conducting this simulation we found that pure mode guided wave excitation can be achieved using ABT and variable angle wedge.

Figure 7:
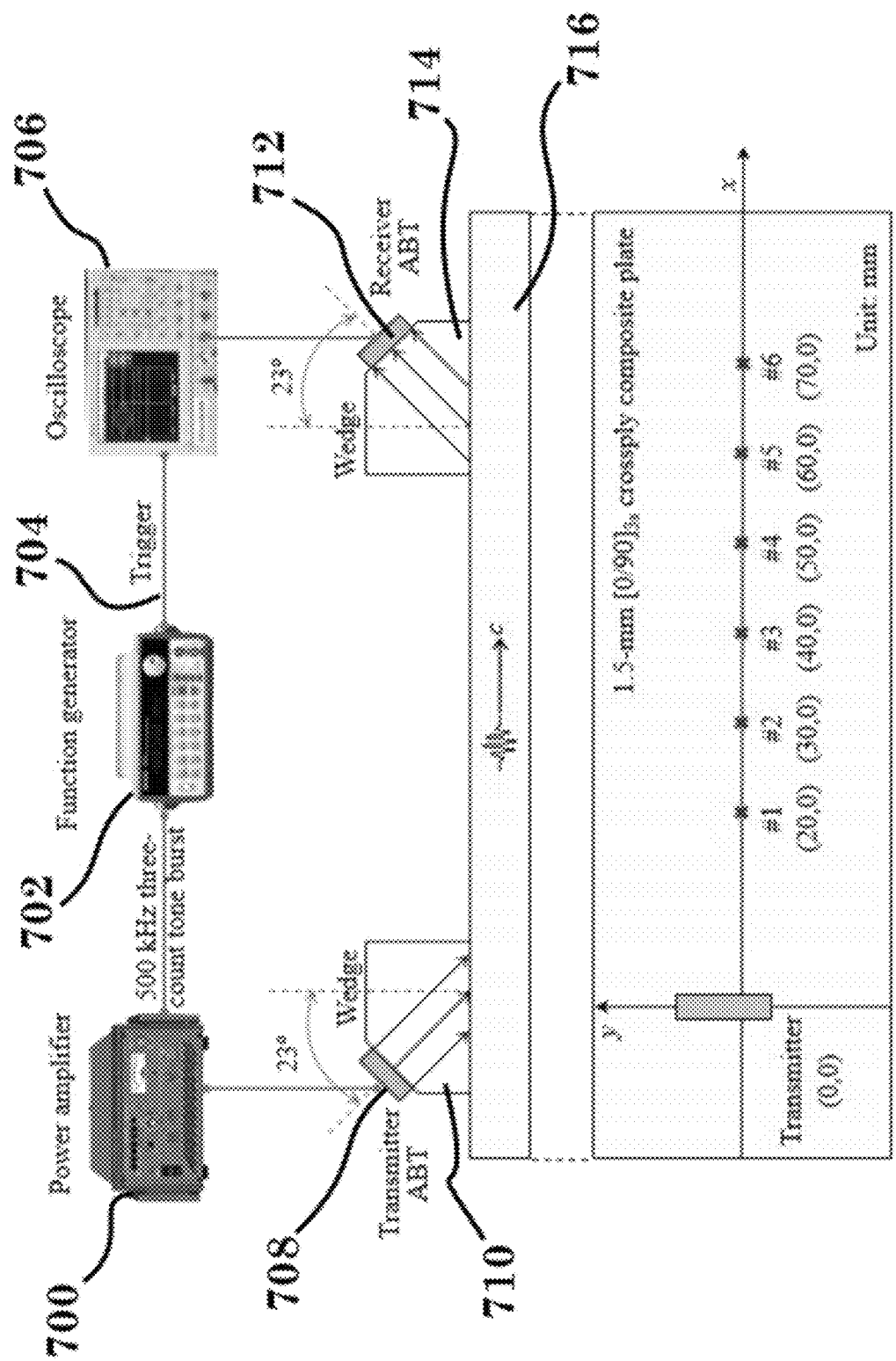
FIG. 7 shows an experimental setup of the current disclosure via pitch catch experiments on 1.5 mm cross-ply composite plate.

Next, an experimental validation was conducted using the experimental setup as displayed in FIG. 7 using a power amplifier 700, function generator 702, trigger 704, oscilloscope 706, a transmitter ABT 708 and transmitter wedge 710, a receiver ABT 712 and a receiver wedge 714, and a crossply composite plate 716. The measured signals obtained were used to determine the time of flight vs distance plot, which was used to find the experimental group velocity. The measured group velocity from the experiment is around 6.53 mm/μs, which matches the group velocity of the quasi-S0 mode (theoretical velocity is 6.58 mm/μs at 500 kHz). By conducting this experiment we have validated the results obtained from the simulation.

Detection of Various Composite Damage Types Using ABT-ABT Experimental Setup

Quasi-SH0 Mode Excitation at Short Distances

Figure 9:
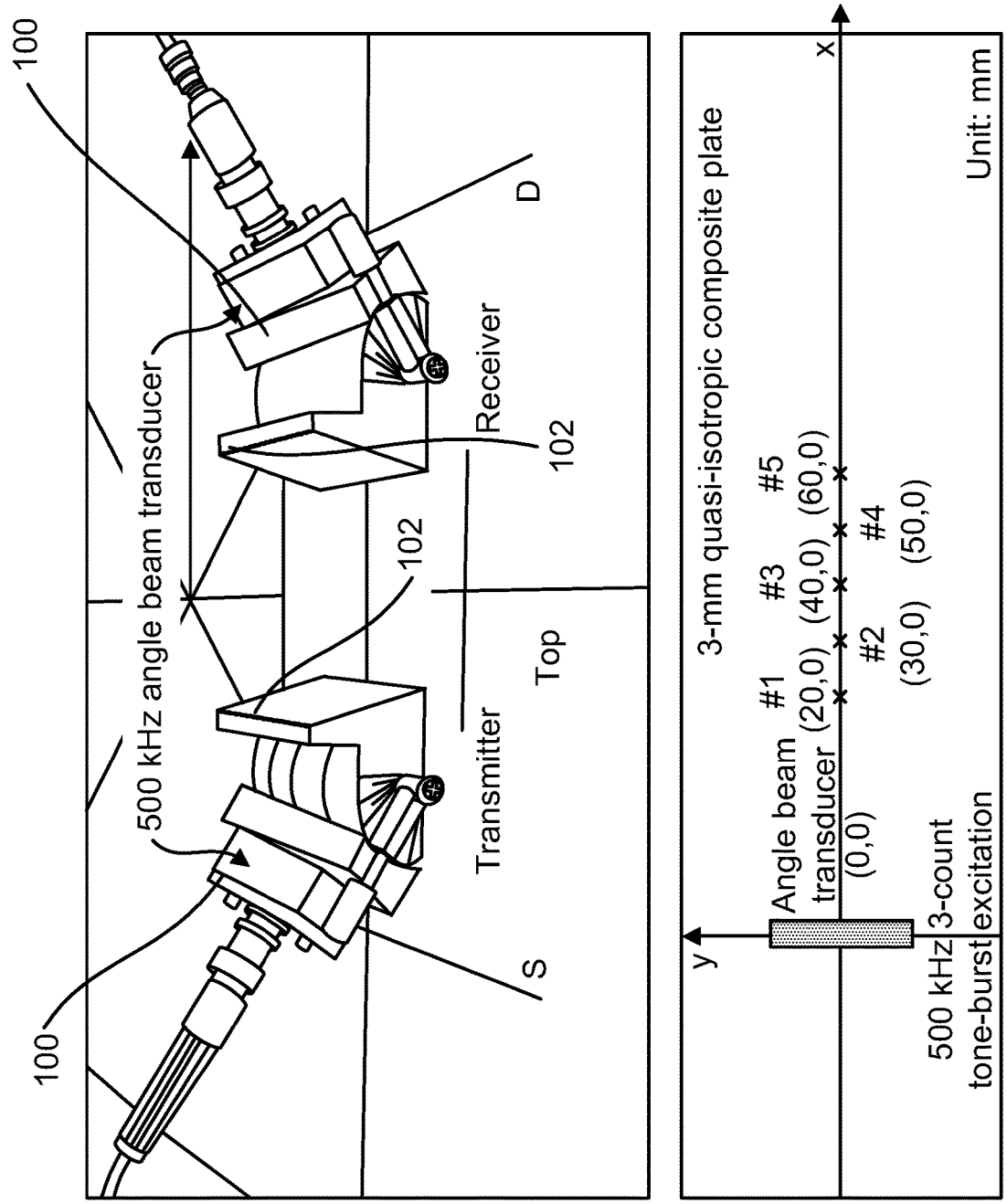
FIG. 9 shows quasi-SH0 mode excitation at short distances.
Figure 10:
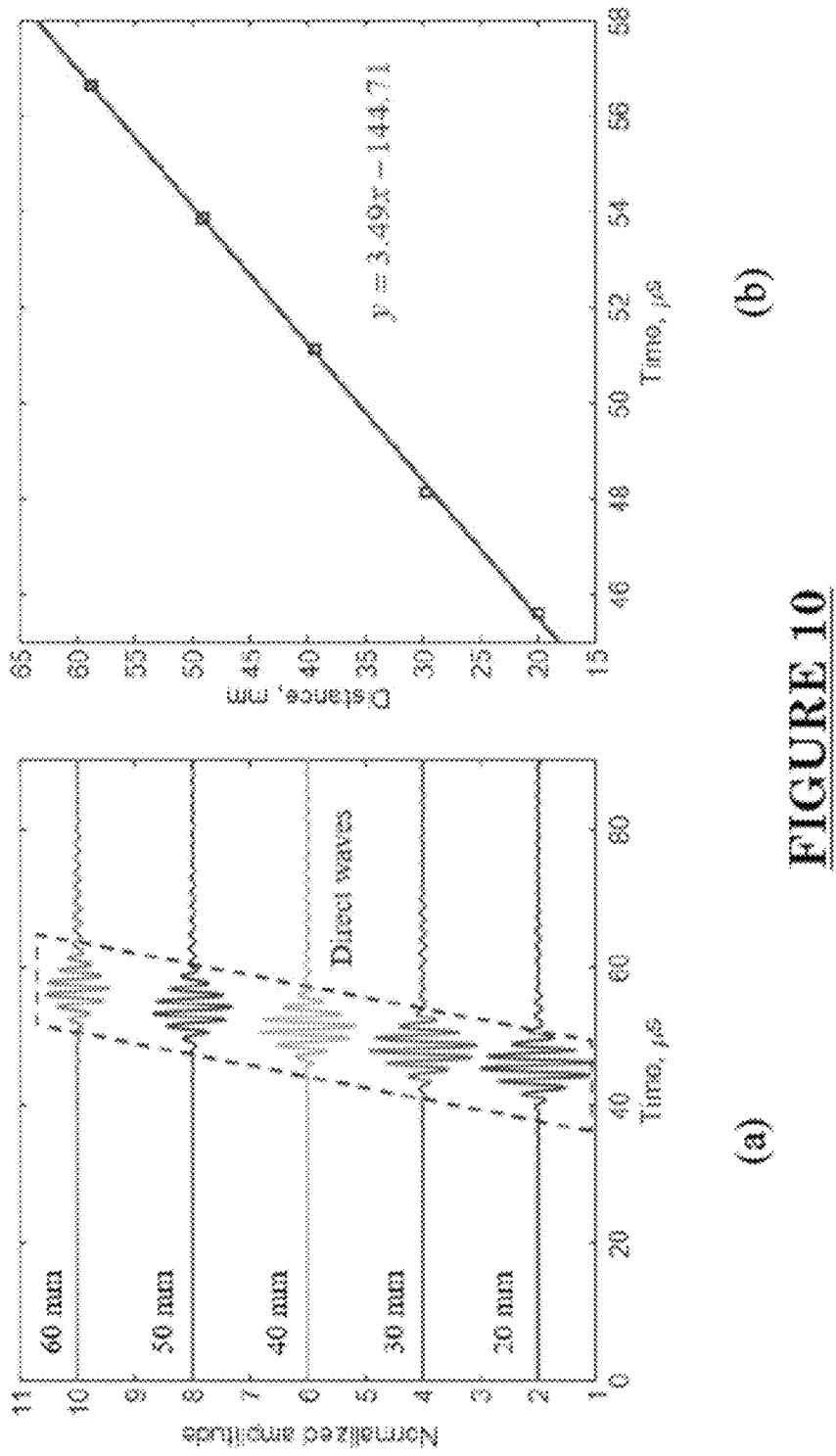
FIG. 10 shows at (a) measured signals and (b) time of flight versus distance of FIG. 9.

Pitch catch experiments were conducted on a 3-mm $[-45/90/45/0]_{3s}$ quasi-isotropic CFRP composite plate using the ABT-ABT experimental setup at short distances. The receiver ABT was kept at different short distances from the transmitter ABT and the signals were measured to find the experimental group velocity and compare it to the theoretical group velocity to see if the pure quasi-SH0 mode can be excited. The experimental setup is displayed in FIG. 9. From the measured signals that were obtained, it can be observed that nondispersive waves were received and the measured group velocity of the direct waves is 3.49 km/s, which matches well with the group velocity of the quasi-SH0 mode (theoretical value is 3.39 km/s).

Quasi-SH0 Mode Excitation at Long Distances

Figure 11:
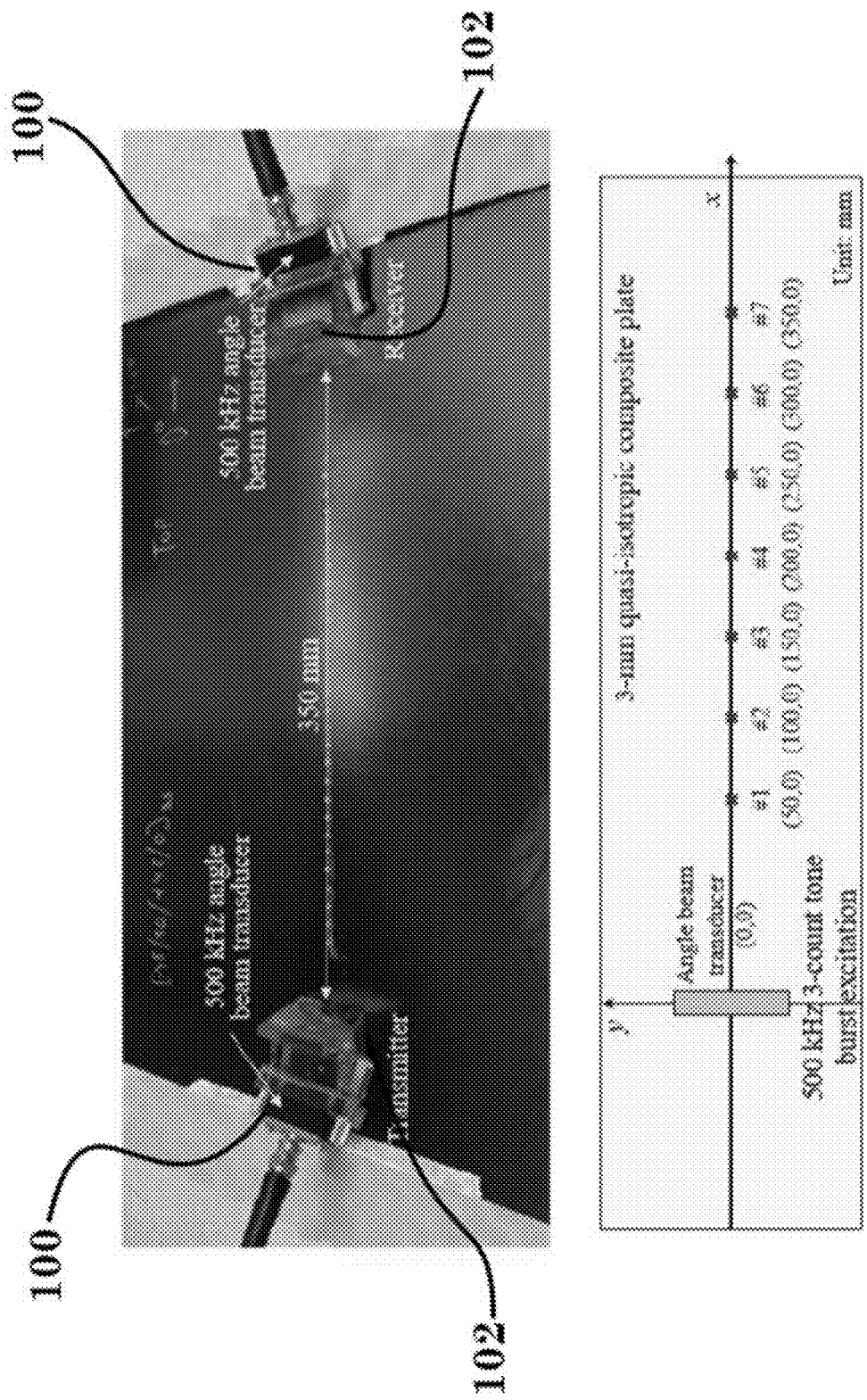
FIG. 11 shows quasi-SH0 mode excitation at long distances.
Figure 12:
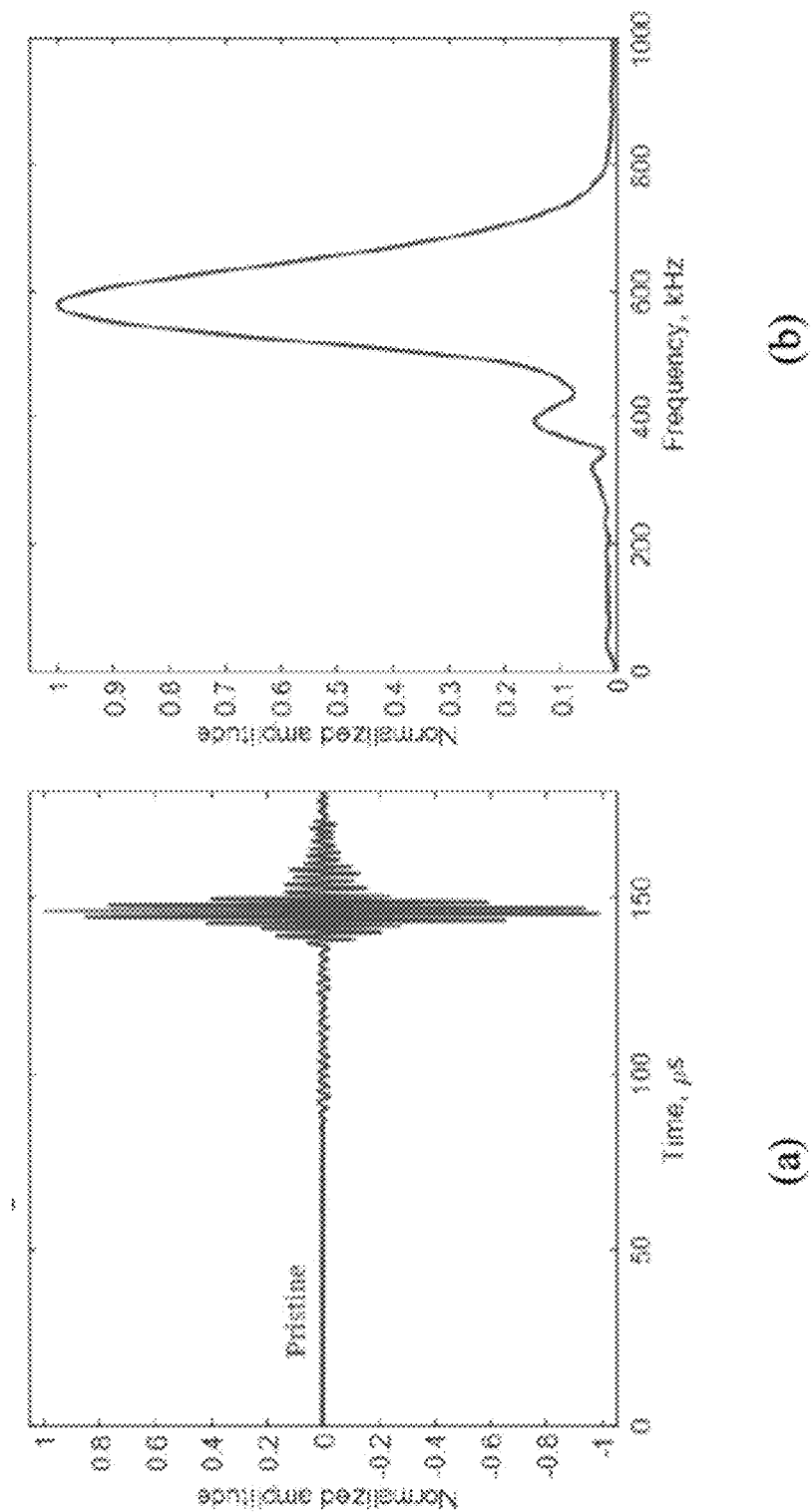
FIG. 12 shows at: (a) measured signal at 350-mm distance and at (b) FFT results of the setup of FIG. 11.

Pitch catch experiments were conducted on a 3-mm $[-45/90/45/0]_{3S}$ quasi-isotropic CFRP composite plate using the ABT-ABT experimental setup at long distances. The receiver ABT was kept at different long distances from the transmitter ABT and the signals were measured to find the experimental group velocity and compare it to the theoretical group velocity to see if the pure quasi-SH0 mode can be excited at long distances. The experimental setup is displayed in FIG. 11. From the measured signal, it can be observed in FIG. 12 that strong quasi-SH0 signal can be measured even at a far distance of 350-mm using ABT-ABT experimental setup.

Figure 13:
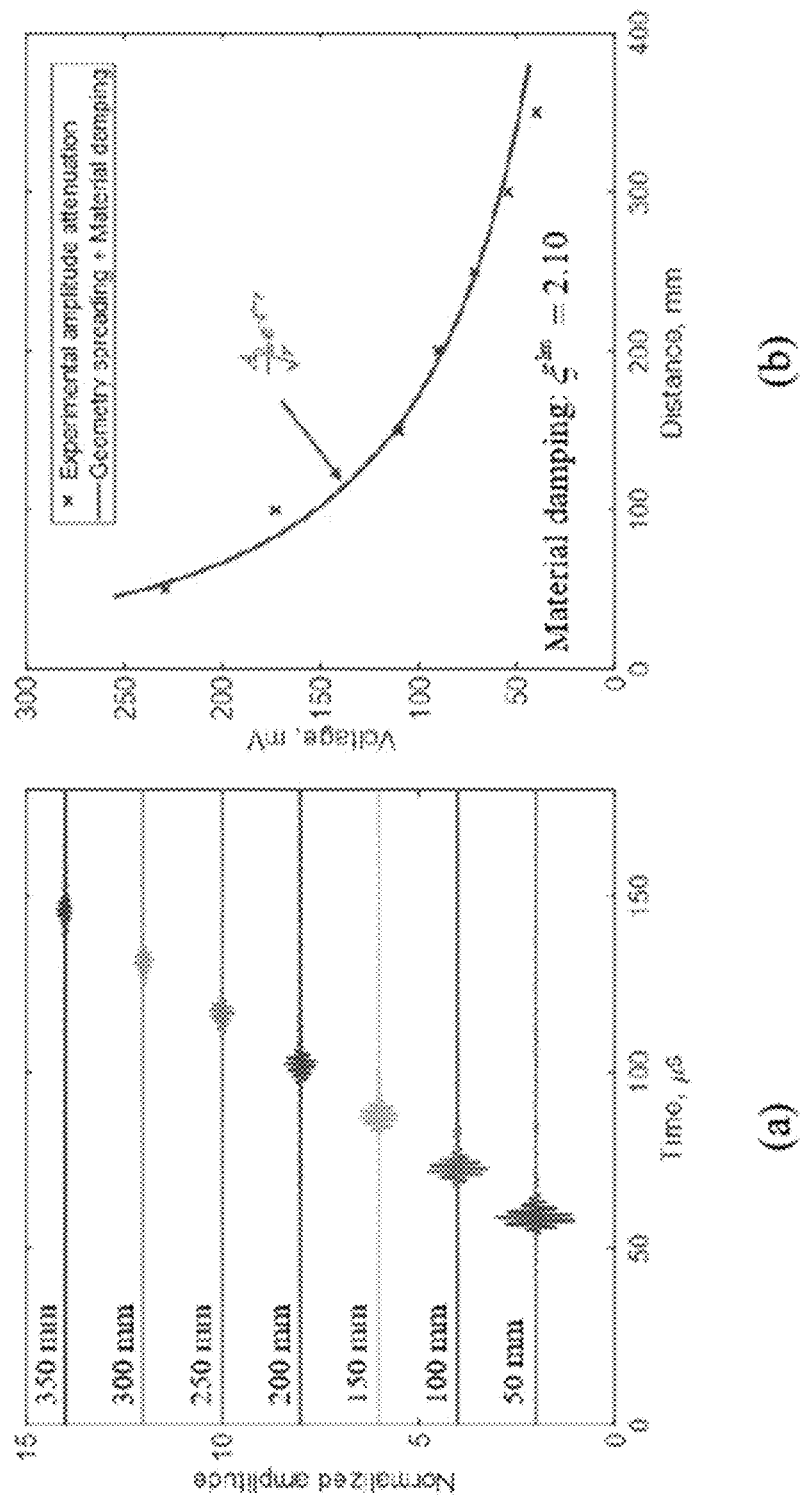
FIG. 13 shows at (a) measured signals at different long distances and at (b) amplitude vs distance to determine experimental material damping.
Figure 14:
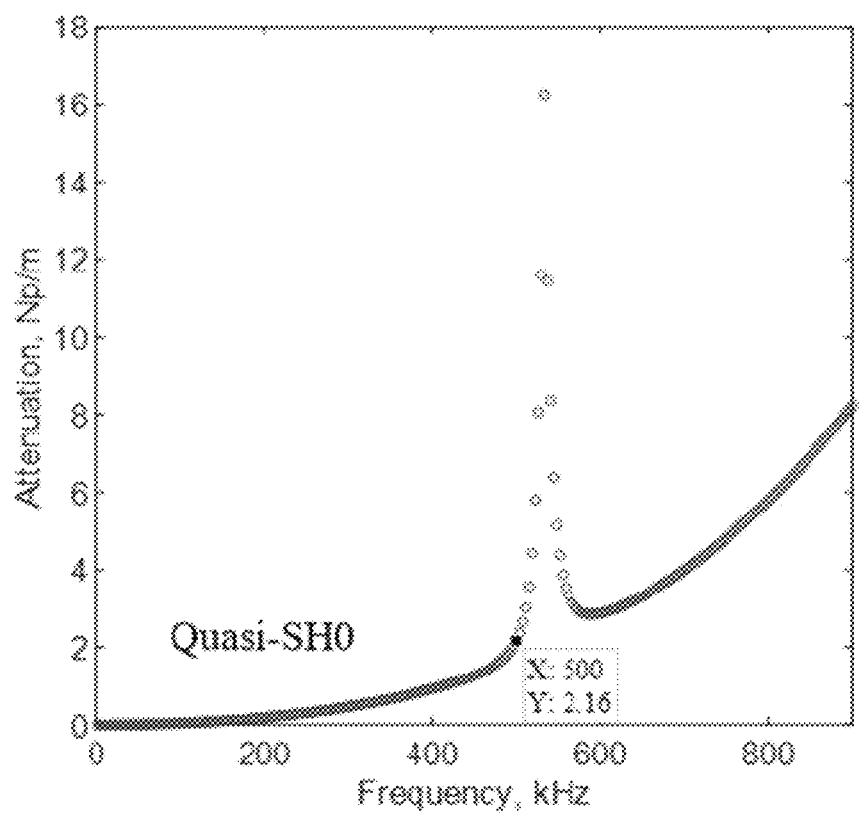
FIG. 14 shows a theoretical attenuation prediction of a 3-mm quasi-isotropic CFRP composite for quasi-SH0 mode.

From FIG. 13 it can be observed that strong signals can be measured at far distances using the ABT-ABT experimental setup. The material damping was determined through curve fitting of the peak-to-peak amplitude versus the distance. The theoretical attenuation prediction is displayed in FIG. 14 and it can be observed that the experimentally obtained material damping matches very well with the theoretical prediction.

Short Distance Detection of One Delamination Vs Two Delaminations

Simulated delamination was introduced in a 3-mm quasi-isotropic CFRP composite plate 1500 by introducing Teflon inserts of different sizes at different locations 1502 and 1504. The location of the single delamination and double deamination and their sizes can be observed in FIG. 15 (one delamination: 25 mm; two delaminations: 20 mm and 25 mm). Ultrasonic immersion tank scanning using a 10 MHz, 1" focus transducer was used to image the simulated delaminations as displayed in FIG. 16. We can clearly see that in the case of two delaminations, we can identify the smaller delamination (20-mm) 1506 placed above the bigger delamination (25-mm) 1508.

Figure 16:
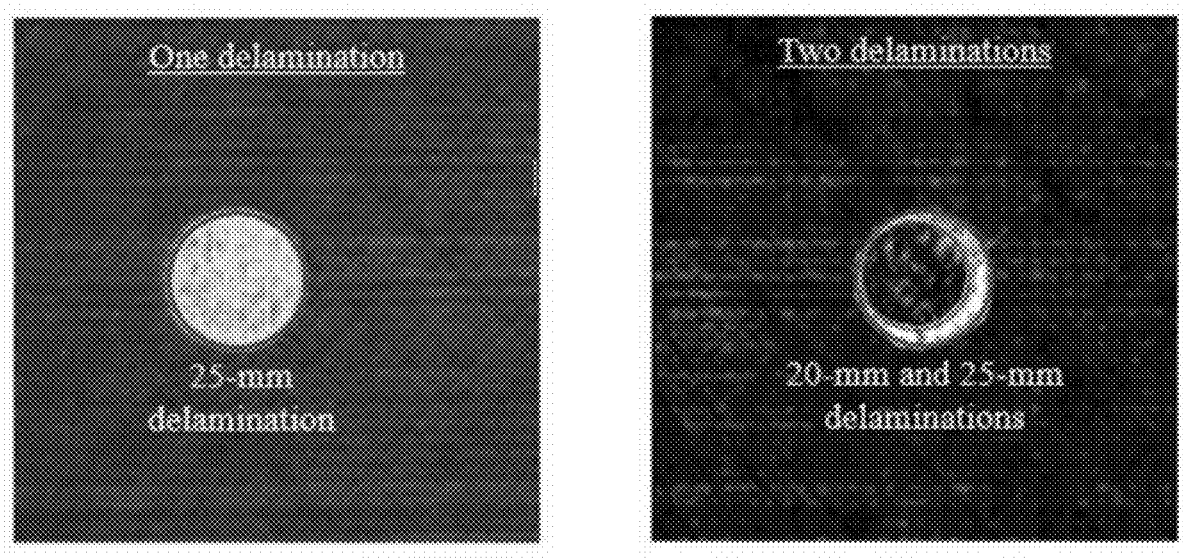
FIG. 16 shows C-scan results of one delamination (left) and two delaminations (right).

Ultrasonic immersion tank scanning using a 10 MHz, 1" focus transducer was used to image the simulated delaminations as displayed in FIG. 16. We can clearly see that in the case of two delaminations, we can identify the smaller delamination (20-mm) placed above the bigger delamination (25-mm). An experimental setup similar to the one displayed in FIG. 9 where the ABTs are kept 100-mm apart is used to detect the presence of one delamination vs two delamination.

Figure 17:
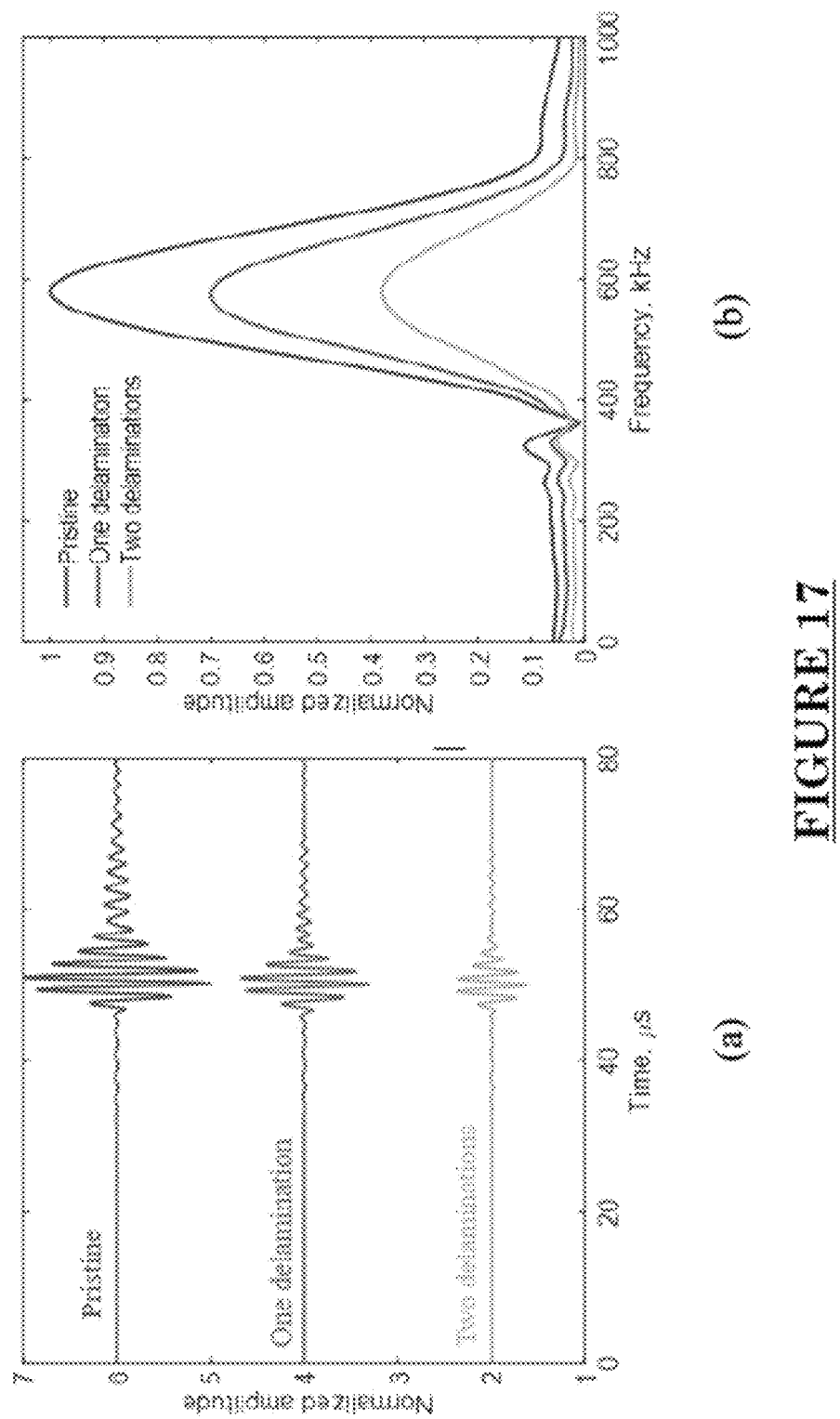
FIG. 17 shows at (a) measured signals and at (b) FFT results of an experimental setup as shown in FIG. 9 where the ABTs are kept 100-mm apart.
Figure 18:
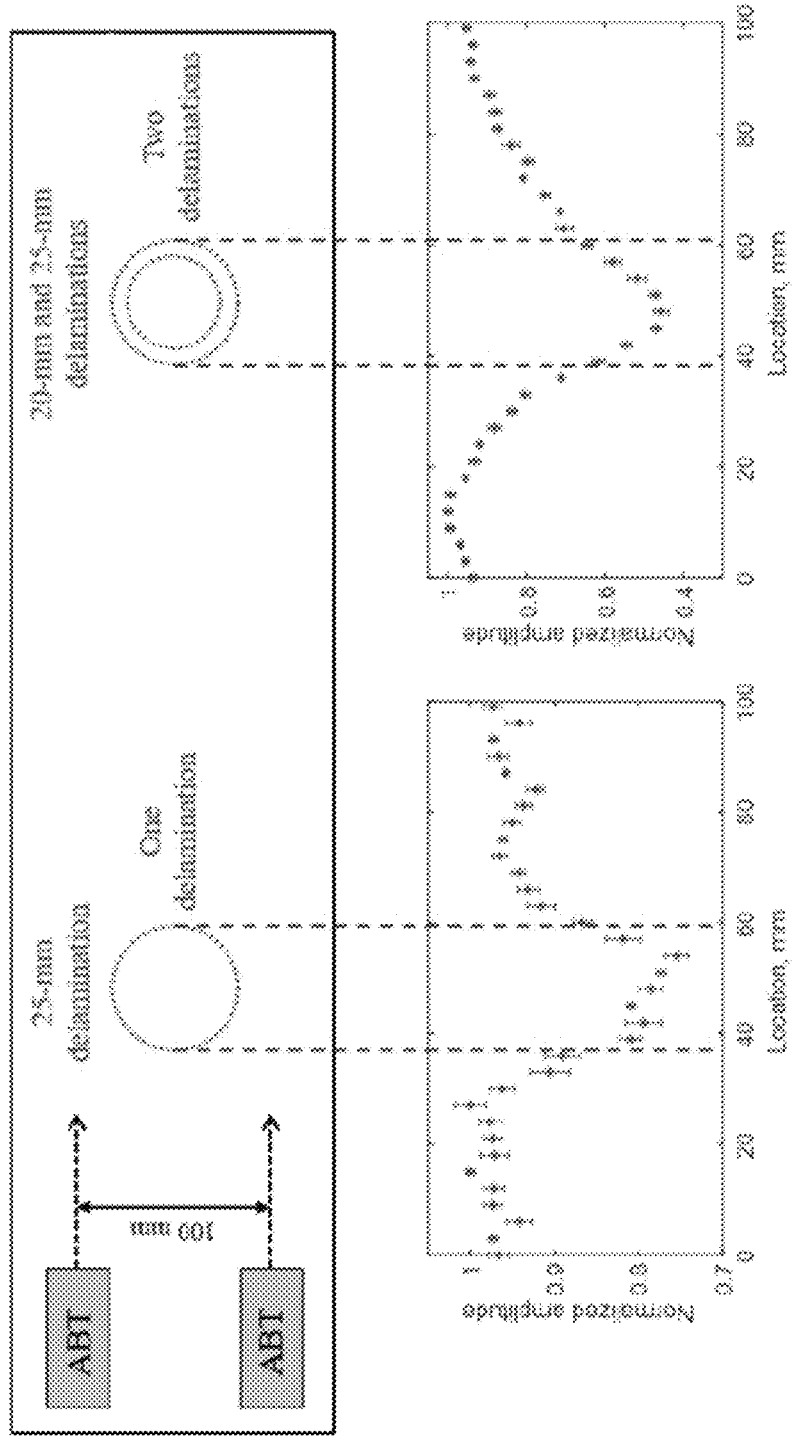
FIG. 18 shows size estimation of one and two delaminations.
Figure 19:
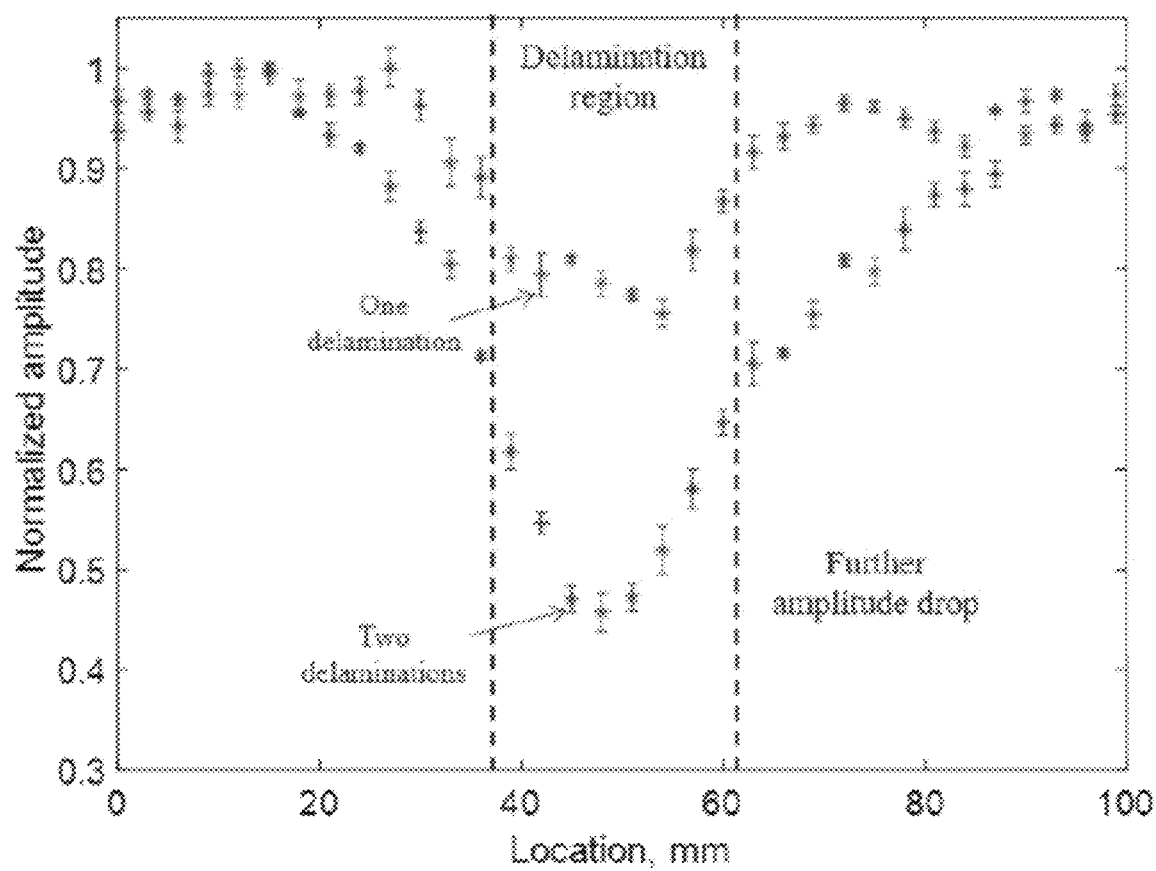
FIG. 19 shows a signal comparison between one and two delaminations.

From our results in FIG. 17, we can observe that signal amplitude drop can be clearly seen due to the presence of the delaminations. The amplitude drop is higher for the case of two delaminations. We can also conduct a line scan by keeping the distance as 100-mm between the two ABT and moving them in a line over the deamination regions and pristine are and seeing the signal amplitude drops as displayed in FIG. 18. From FIGS. 18 and 19, it can be observed that a significant difference in amplitude drop can be observed due to the presence of one and two delaminations. In this way this ABT-ABT system can be used to differentiate between one delamination and two delamination.

Long Distance Detection of One Delamination Vs Two Delaminations

Figure 15:
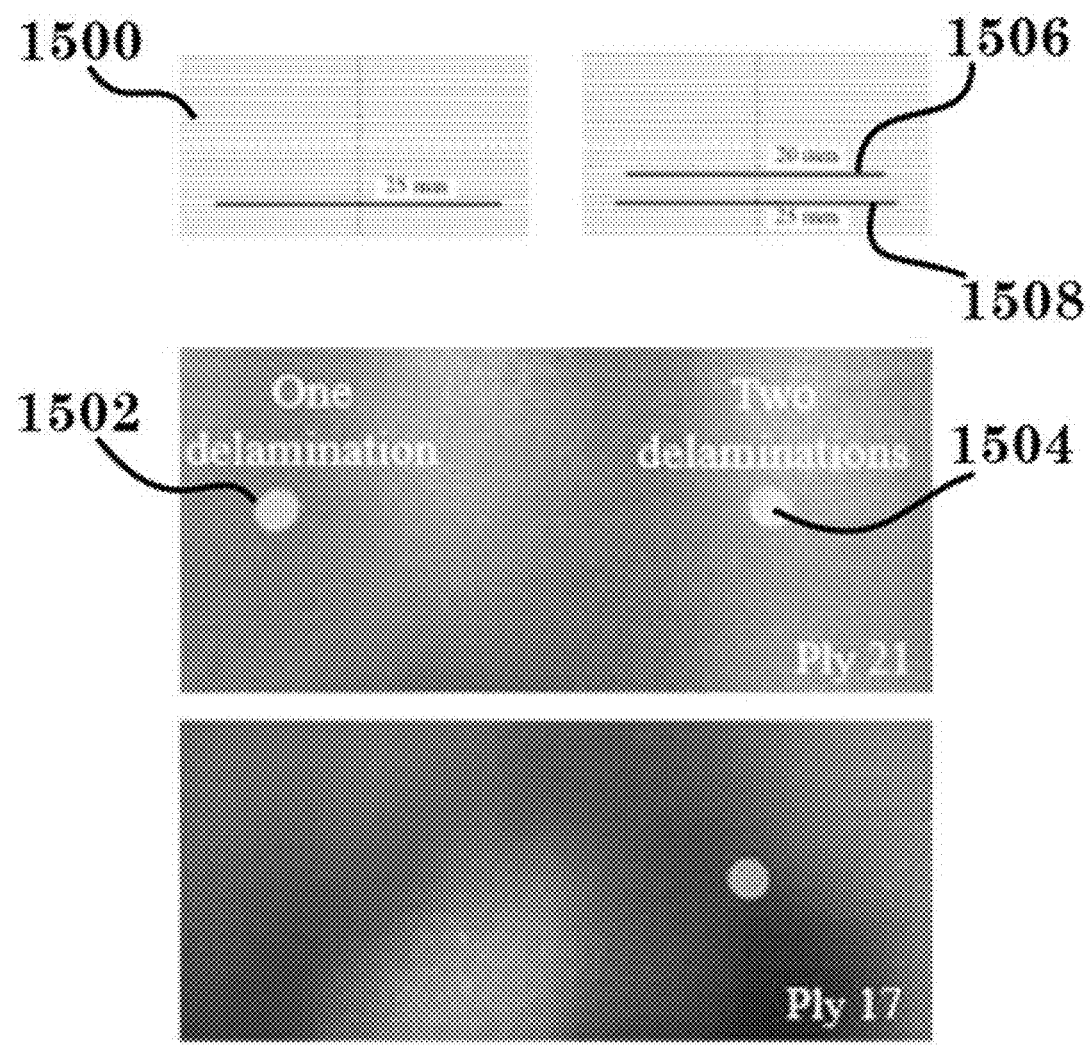
FIG. 15 shows a prepreg layup and the location of Teflon® inserts.
Figure 20:
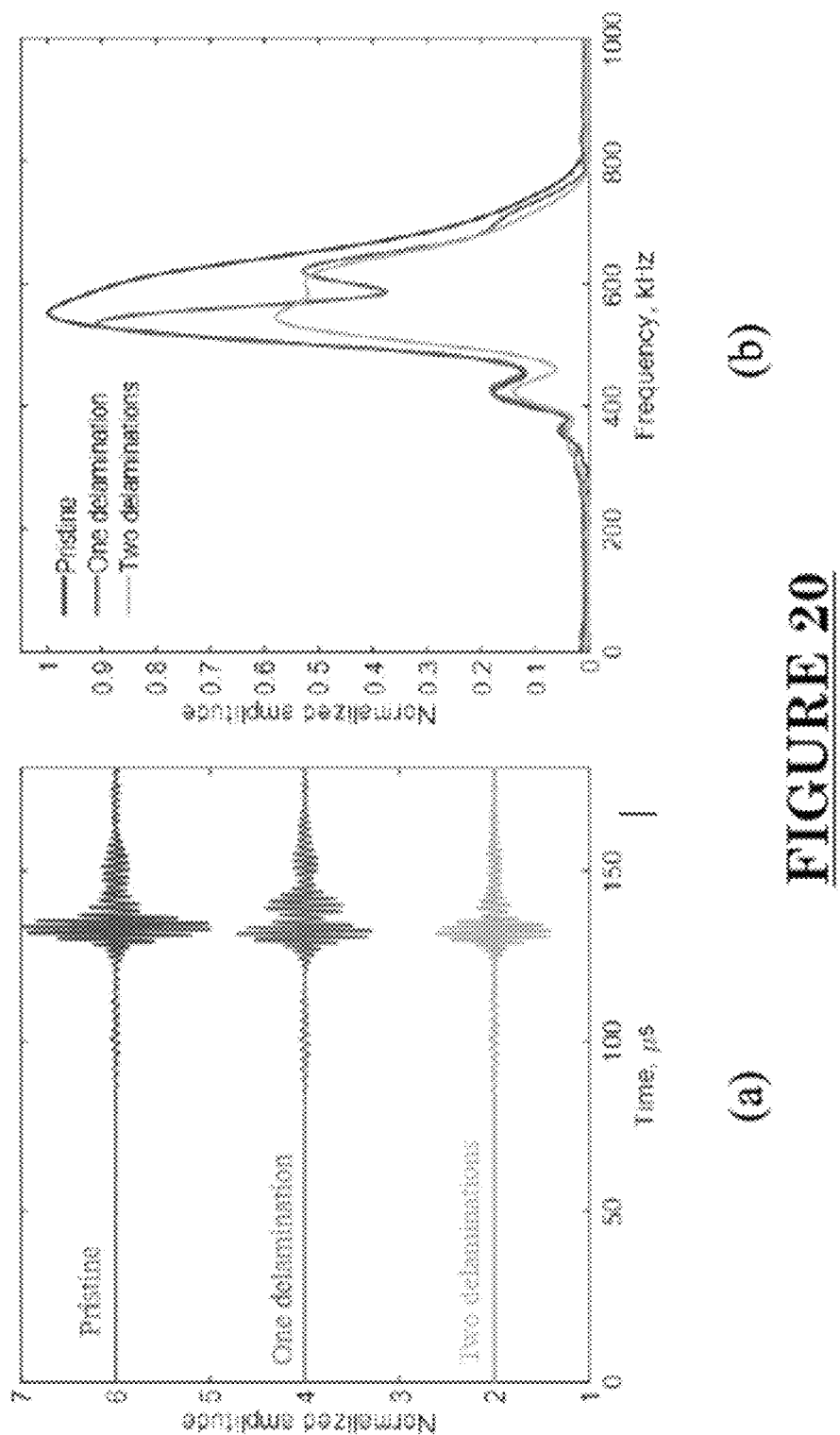
FIG. 20 shows at: (a) measured signals and (b) FFT results.
Figure 21:
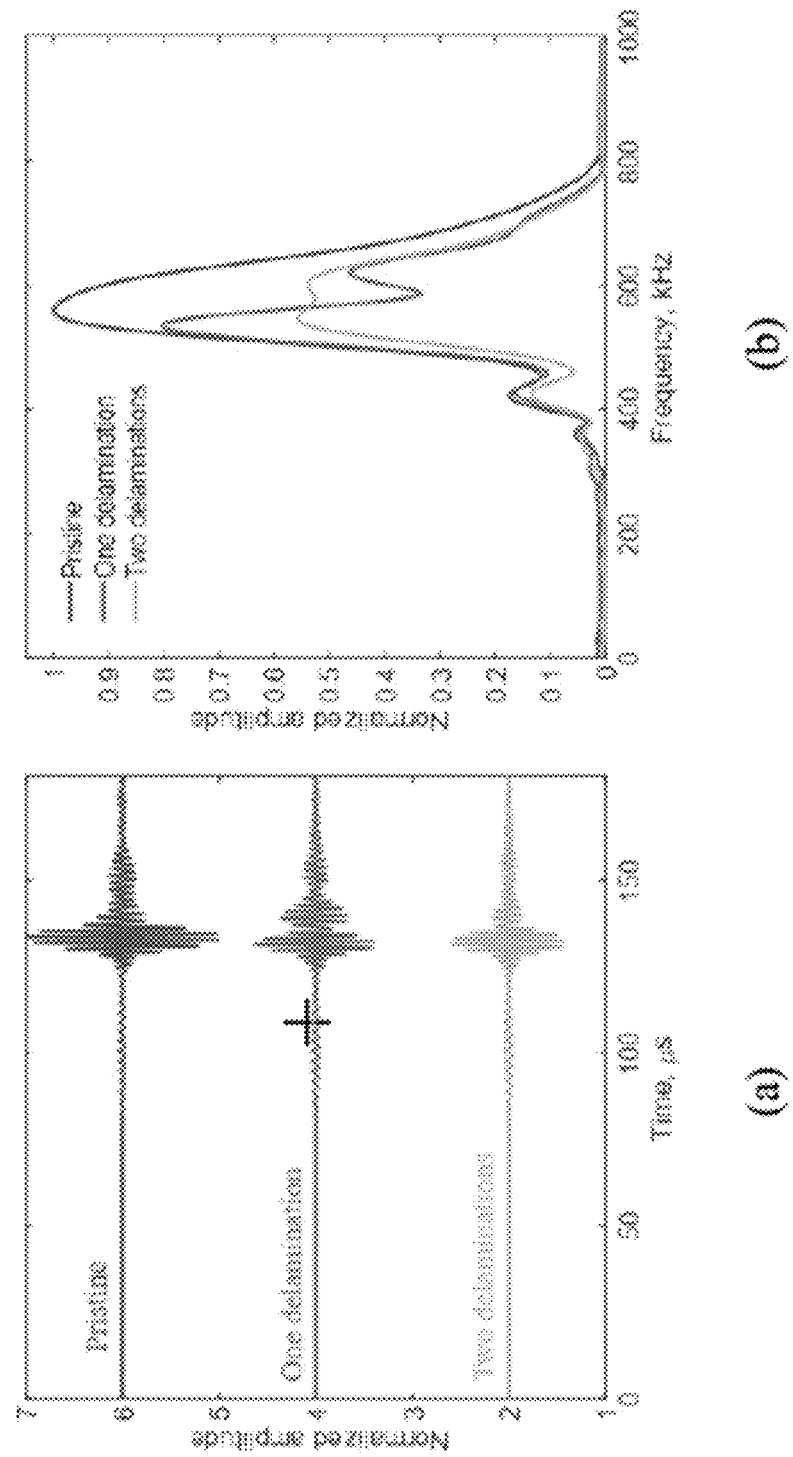
FIG. 21 shows at: (a) measured signals and (b) FFT results.

The same coupon as described with Teflon inserts in FIG. 15 was used to conduct the long distance detection in the 3-mm quasi-isotropic coupon. The experimental setup looks similar to the one displayed in FIG. 11. FIG. 20 displays the results obtained when the transmitter ABT is kept close to the delamination area and the receiver ABT is kept 350-mm away from it. FIG. 21 displays the results obtained when the receiver ABT is kept close to the delamination are and the transmitter ABT is kept 350-mm away. From both the results we can observe that long distance detection can be used to differentiate between different types of damage.

Impact Damage Detection in 3-mm Quasi-Isotropic CFRP Composite Plate

Figure 22:
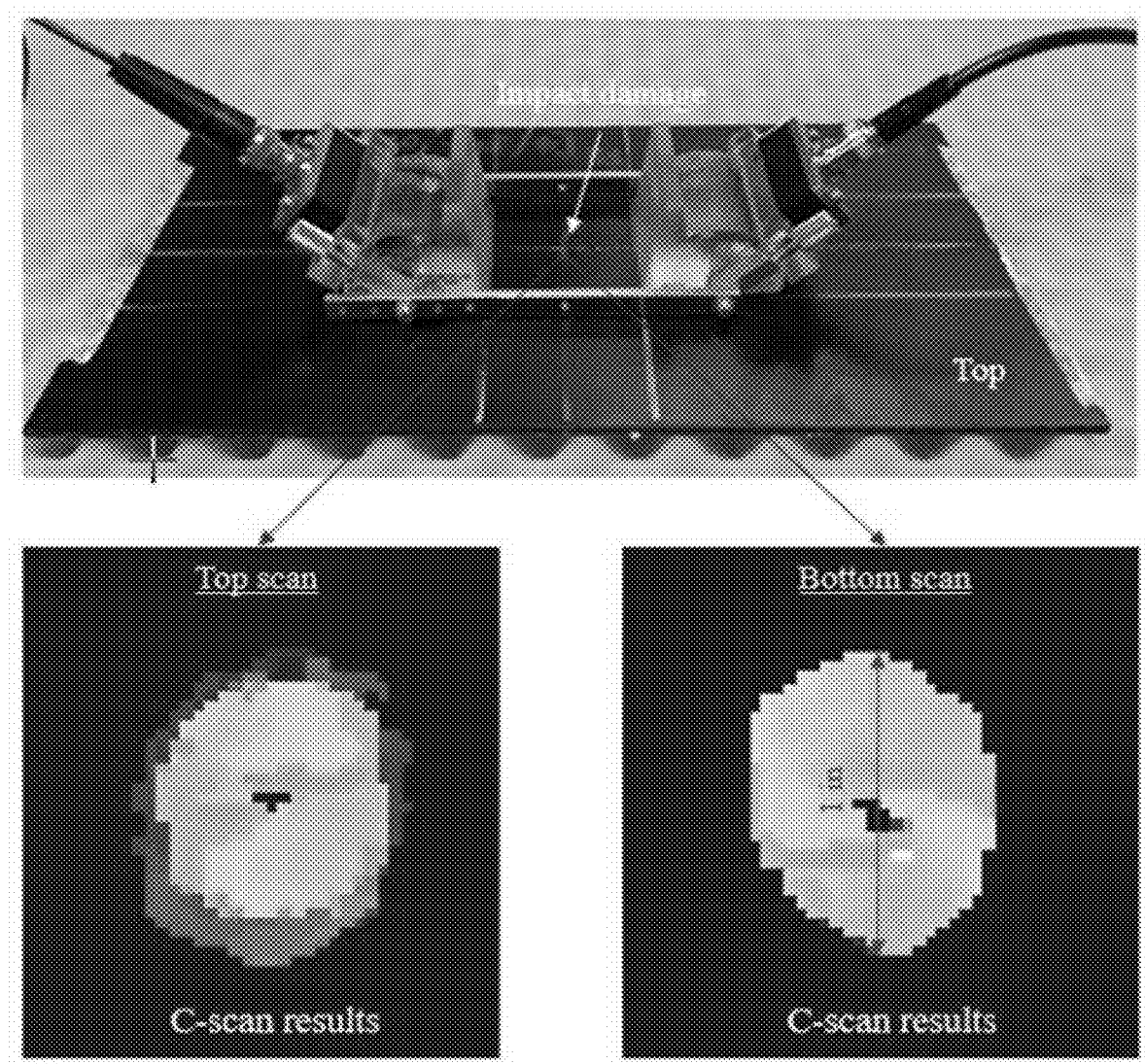
FIG. 22 shows an ABT-ABT experimental setup (top); C-Scan results of top and bottom surface (bottom).
Figure 23:
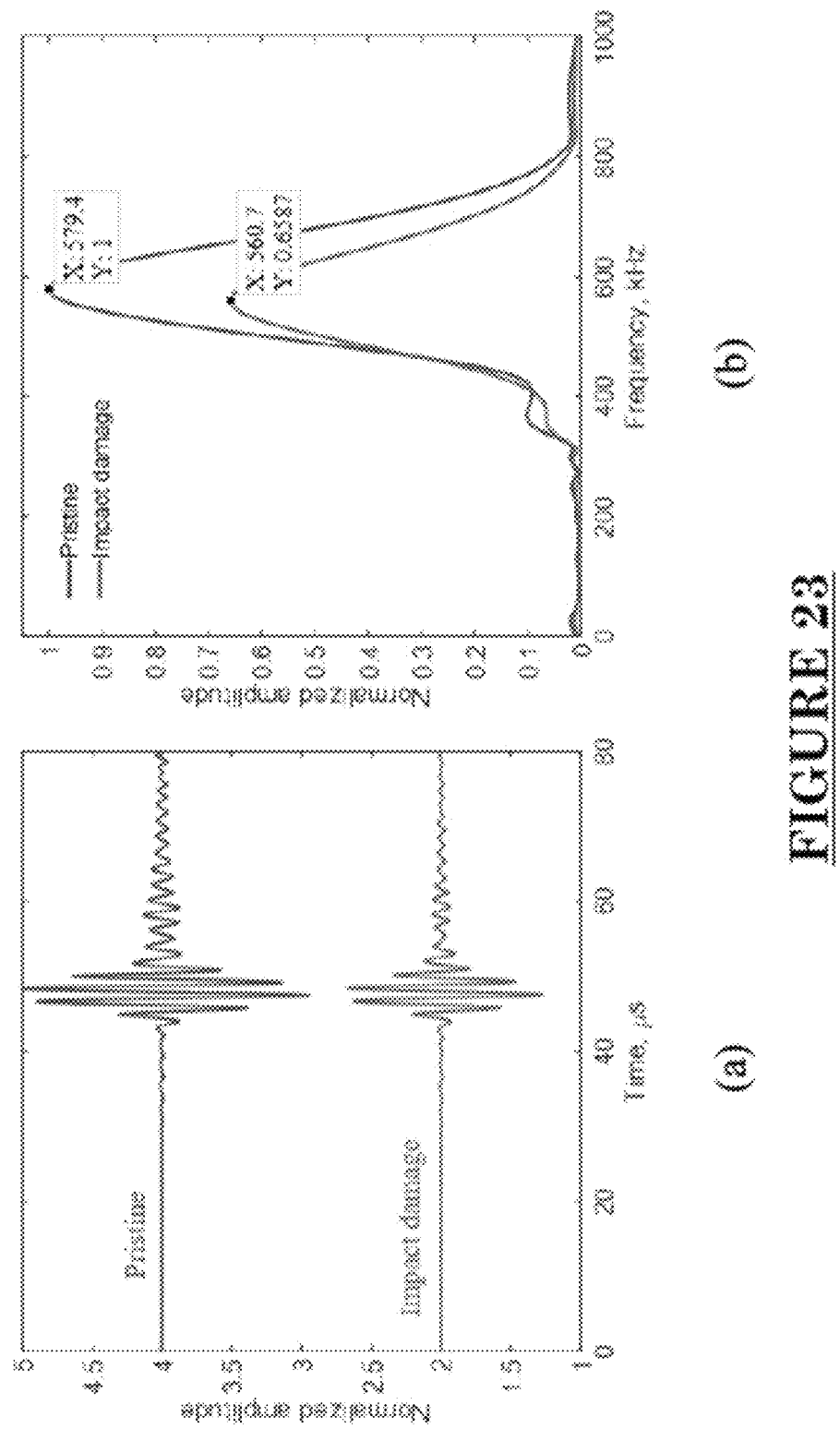
FIG. 23 shows at (a) measured signals and at (b) FFT results.
Figure 24:
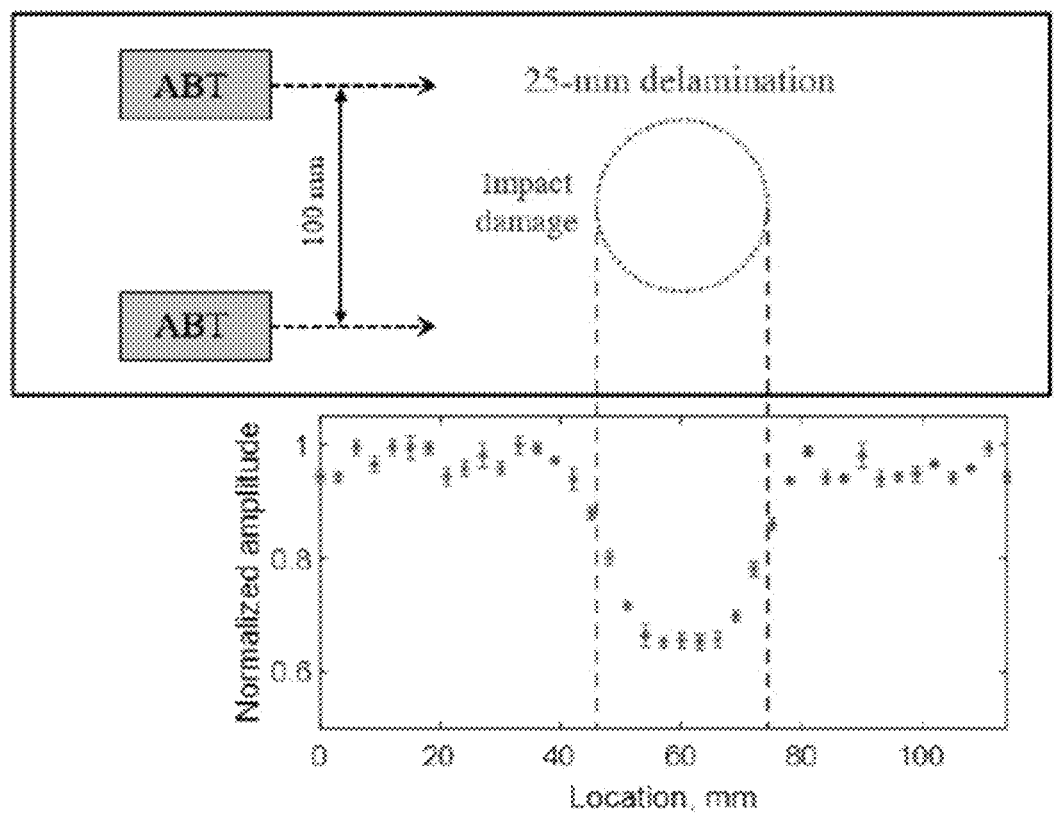
FIG. 24 shows line scan result over impact damage area.

A 1" impact damage was created on a 6"×12", 3-mm quasi-isotropic CFRP composite plate using the ASTM D7136 standard and then the ABT-ABT method was used to detect the impact damage. The experimental setup along with top and bottom C-Scan results are displayed in FIG. 22. Point scan experimental results are displayed in FIG. 23 and from the results we can clearly observe a significant drop in signal amplitude due to the presence of impact damage. FIG. 24 displays the line scan result over the impact damage location. The size of the impact damage can be roughly estimated from the maximum amplitude information at various locations.

Figure 25:
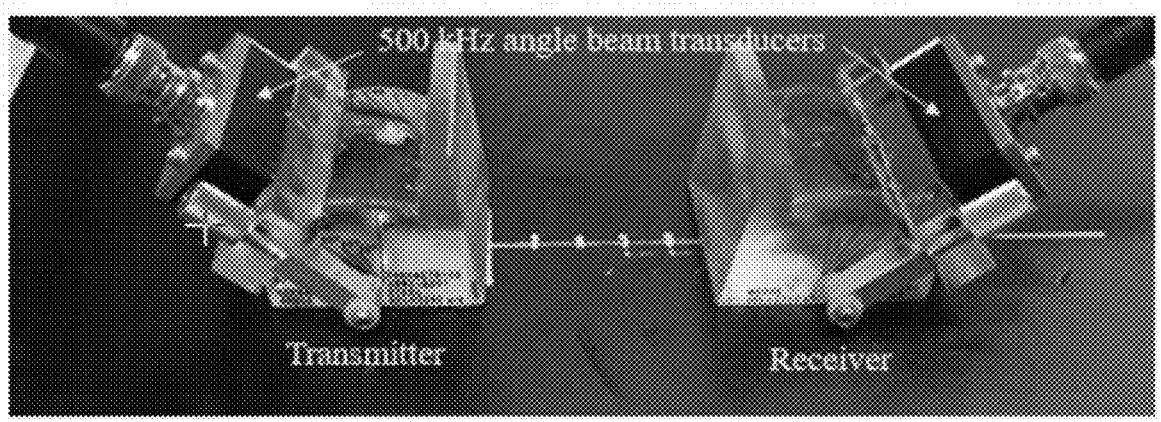
FIG. 25 shows an ABT-ABT experimental setup.
Figure 25:
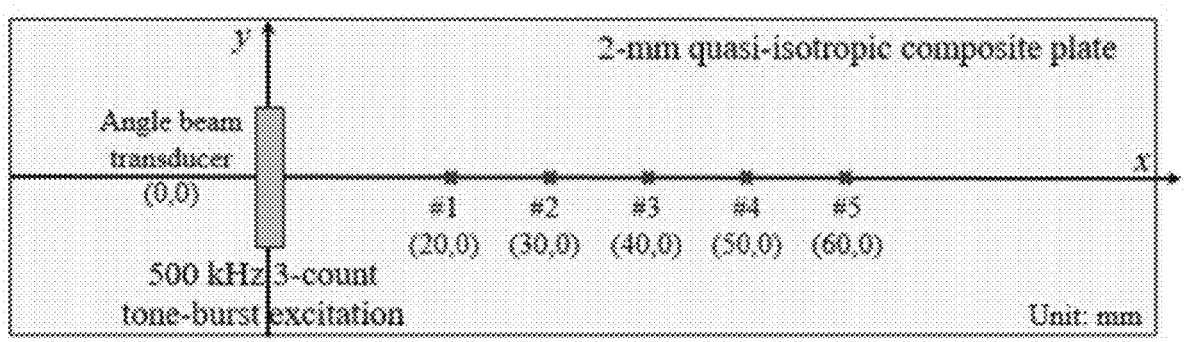
Figure 26:
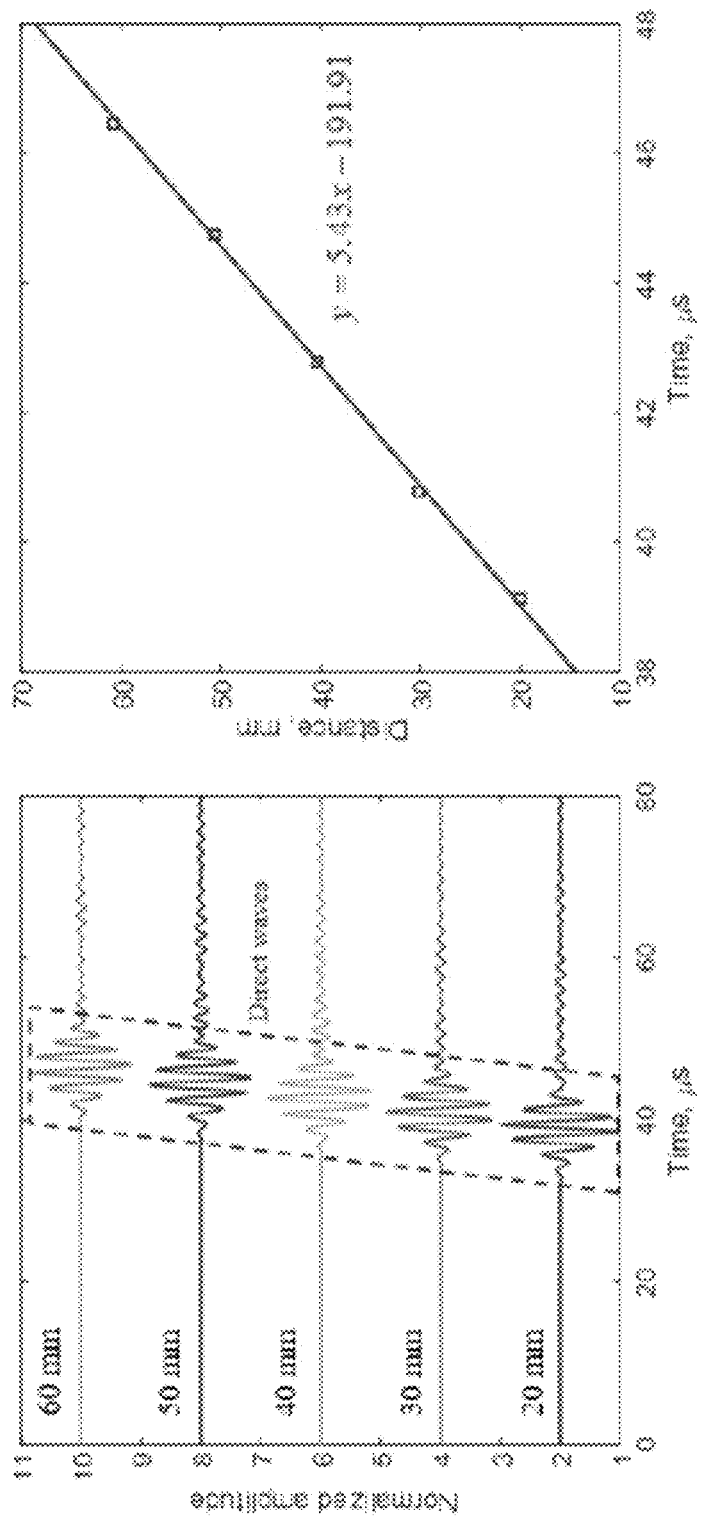
FIG. 26 shows measured signals (left) and time of flight vs distance (right).
Figure 27:
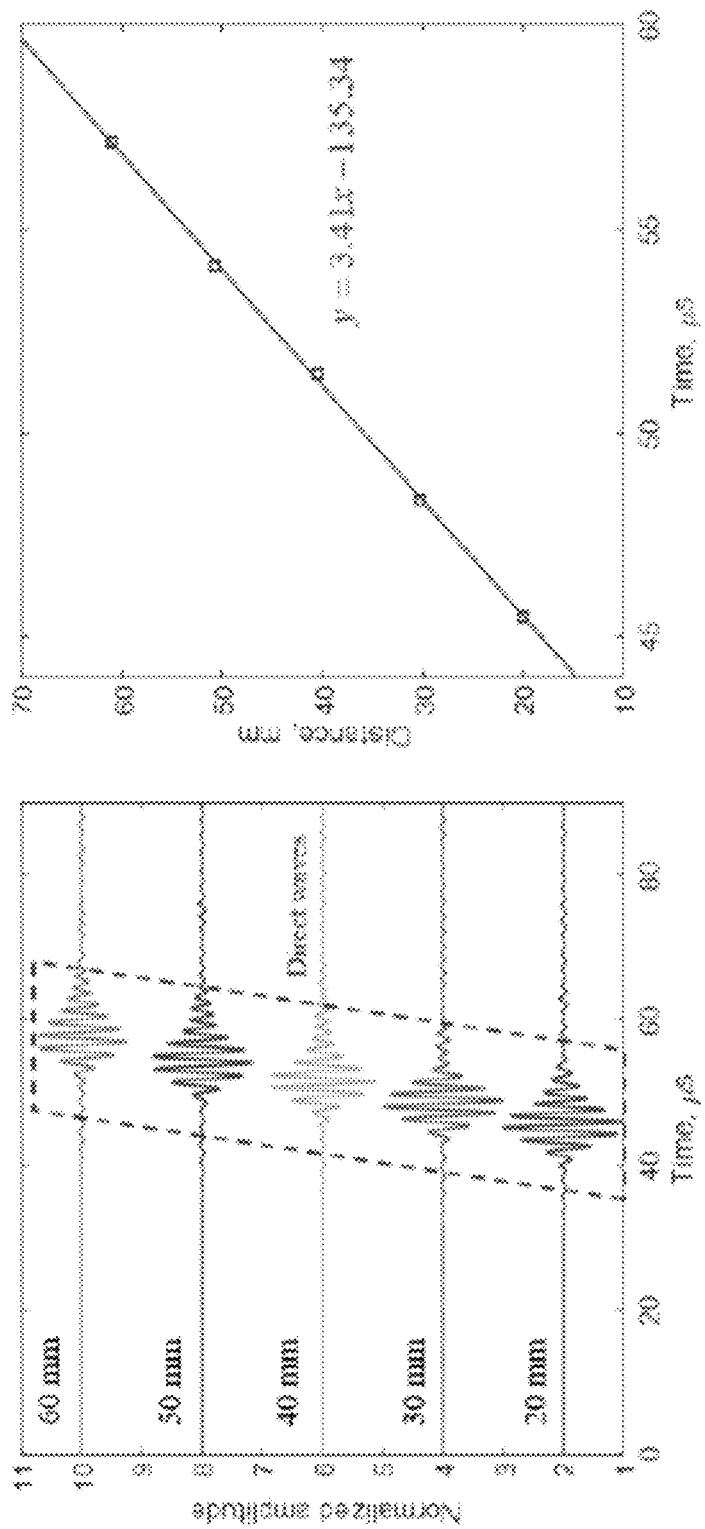
FIG. 27 shows measured signals (left) and time of flight vs distance (right).
Figure 28:
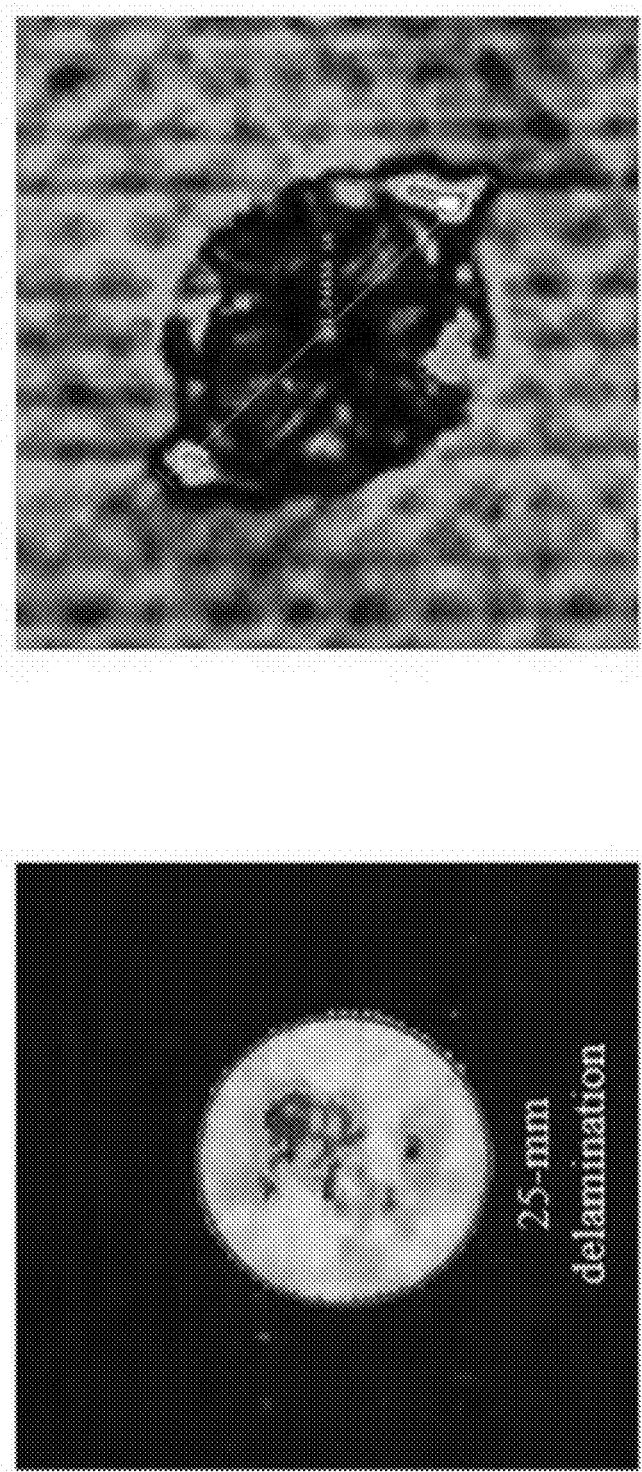
FIG. 28 shows C-scan results of 1" Teflon insert (left) and 1" impact damage (right).

Multi-Mode Guided Wave Detection on 2-mm Quasi-Isotropic Composite Plate with Teflon Insert and Impact Damage To conduct the ABT-ABT experiments on the 2-mm quasi-isotropic plate we need to first determine the tuning angles to produce the quasi-S0 mode and the quasi-SH0 mode. From the plots displayed in FIG. 4, we can see that the quasi-S0 mode can be excited by keeping the wedge angle as approximately 26 degrees and the quasi-SH0 mode can be excited by keeping the wedge angle at approximately 49 degrees. The experimental setup is displayed in FIG. 25. First the measured signals were received from the ABT at different distances to obtain the group velocity as can be seen in FIGS. 26 and 27. For the quasi-S0 mode it was observed that nondispersive waves were received and the measured group velocity of the direct waves is 5.43 mm/μs, which matches the theoretical group velocity of the quasi-S0 mode (5.48 mm/μs). Similarly, for the quasi-SH0 mode it was observed that nondispersive waves were received and the measured group velocity of direct waves is 3.41 mm/μs, which matches the theoretical group velocity of the quasi-SH0 mode (3.38 mm/μs). Both the 1" Teflon insert and the 1" impact damage were inspected in the ultrasonic immersion tank using a 10 MHz, 1" focus transducer and C-scans of the damages were obtained to visualize both the damages as observed in FIG. 28.

Figure 29:
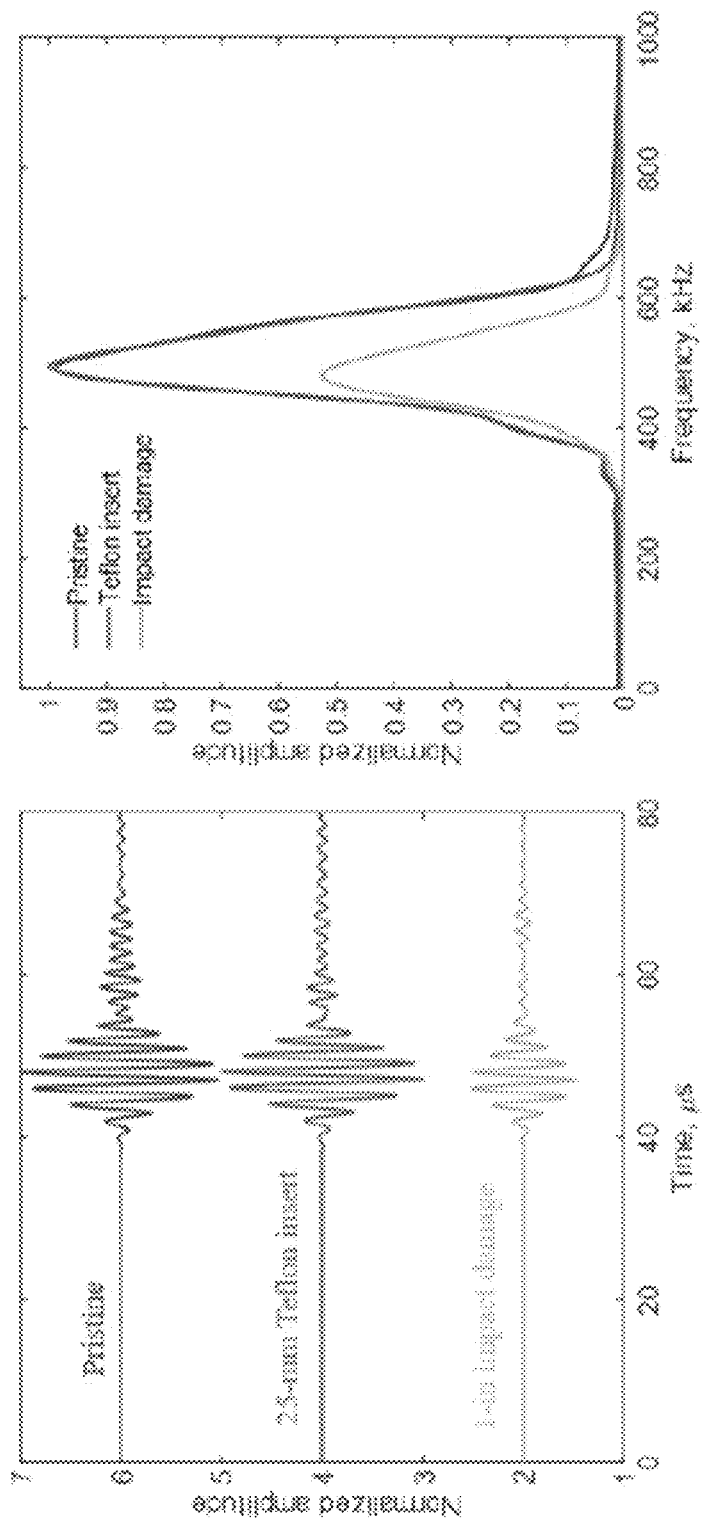
FIG. 29 shows measured signals (left) and FFT results (right) for quasi-S0 mode excitation.

Next, the ABT-ABT experimental setup was used to excite the quasi-S0 mode for detecting both the different types of damage. It can be clearly observed from the results obtained in FIG. 29, that no amplitude difference can be obtained between a pristine region and a region which has Teflon insert but a clear amplitude drop can be observed in the region which has the same size of impact damage as that of the Teflon insert. This means that the quasi-S0 mode interacts differently with the impact damage and the Teflon insert and is not sensitive to detect delamination but is sensitive to impact damage. This is a major finding in our research and in this disclosure.

Figure 30:
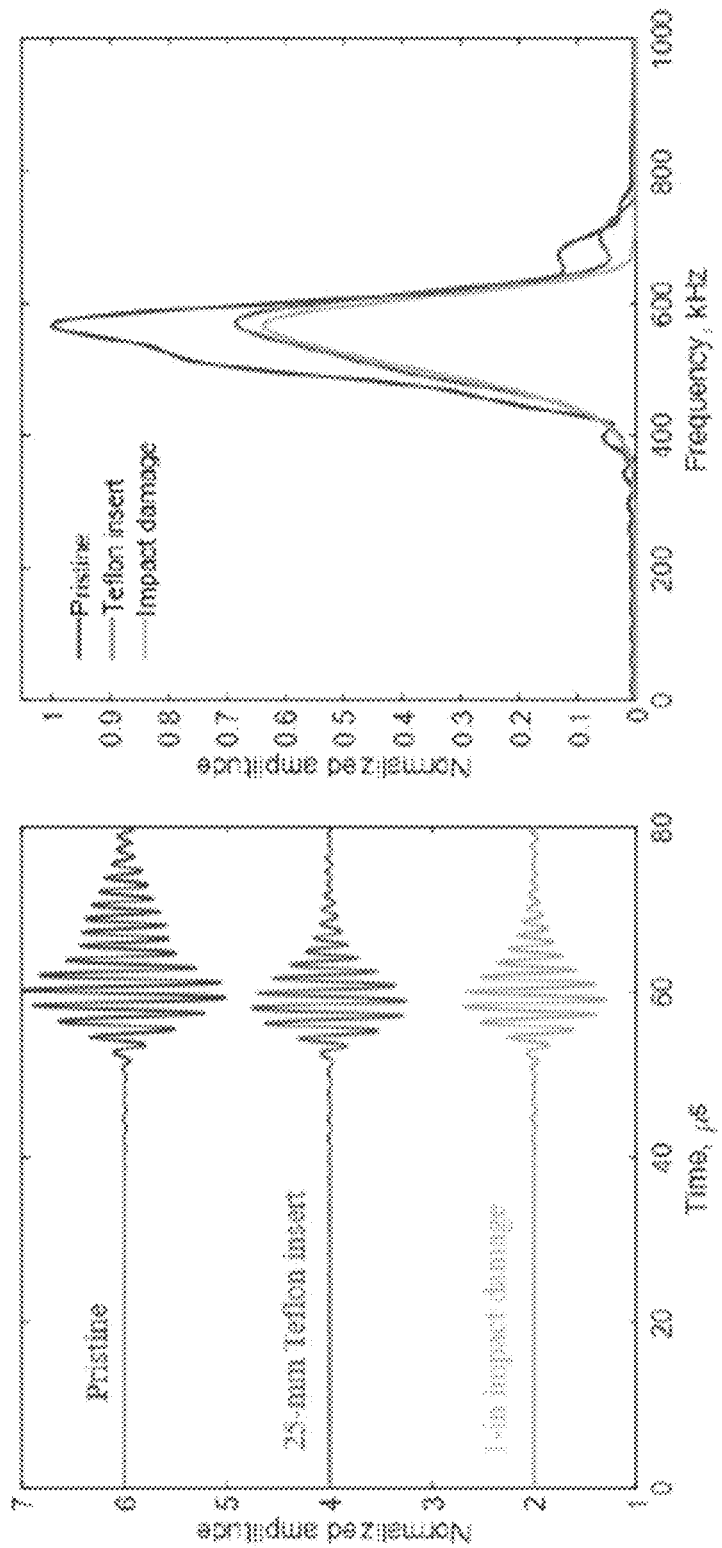
FIG. 30 shows measured signals (left); FFT results (right) for quasi-SH0 mode excitation.

Similarly, the ABT-ABT experimental setup was used to excite the quasi-SH0 mode for detecting both the different types of damage. It can be clearly observed from the results obtained in FIG. 30, that a clear amplitude drop can be observed between a pristine region and a region which has 1" Teflon insert and another region which has 1" impact damage. This means that the quasi-SH0 mode interacts with both—the impact damage and the Teflon insert and is sensitive to detect both types of damages. This is also major finding in our research and in this disclosure.

Figure 31:
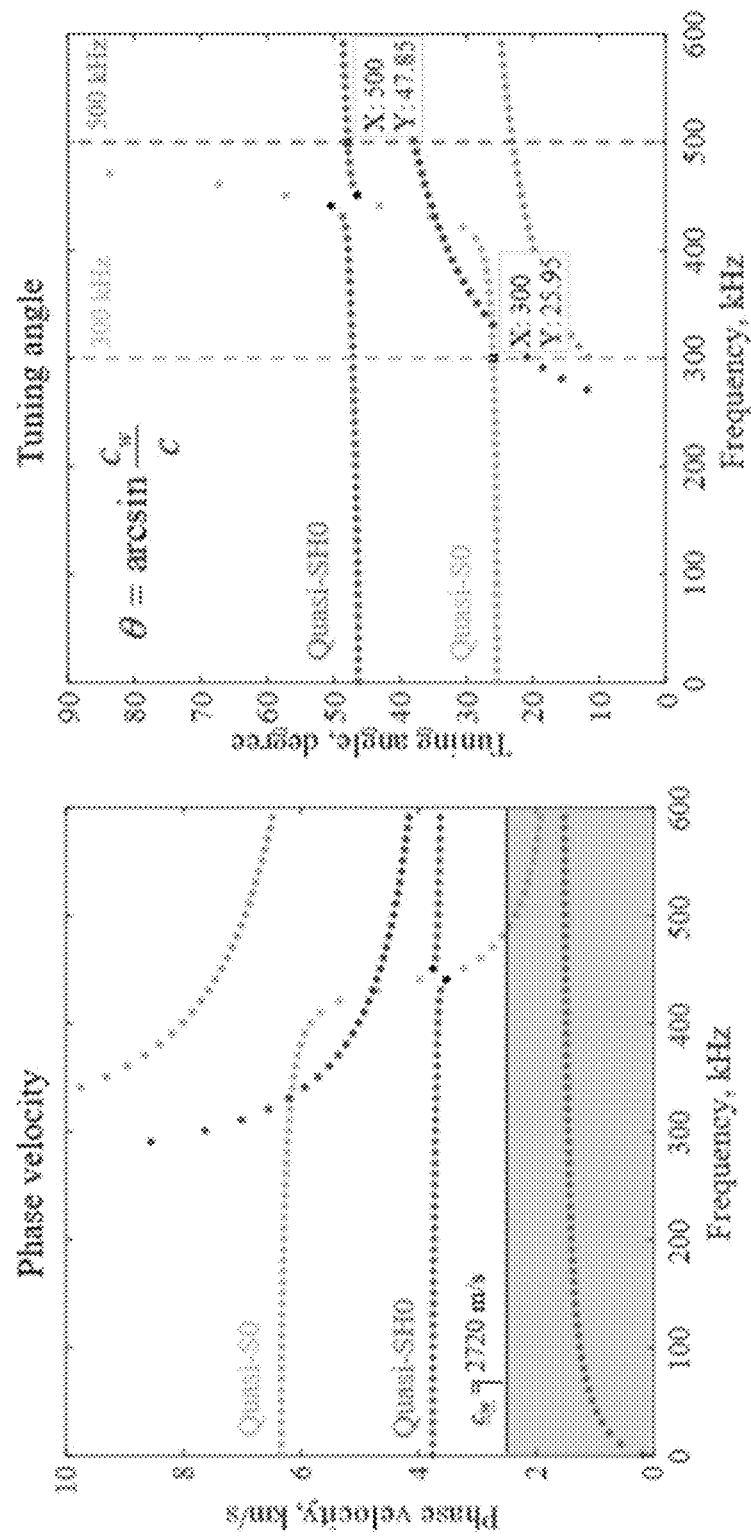
FIG. 31 shows phase velocity dispersion curve (left) and tuning angle plot (right).

Multi-Mode Guided Wave Detection on 3-mm Quasi-Isotropic Composite Plate with Teflon Insert and Impact Damage To conduct the ABT-ABT experiments on a 3-mm quasi-isotropic plate we need to first determine the tuning angles to produce the quasi-S0 mode and the quasi-SH0 mode. From the plots displayed in FIG. 31, we can see that the quasi-S0 mode can be excited at 300 kHz by keeping the wedge angle as approximately 26 degrees and the quasi-SH0 mode can be excited at 500 kHz by keeping the wedge angle at approximately 48 degrees. The experimental setup is similar to the one displayed in FIG. 25.

Figure 32:
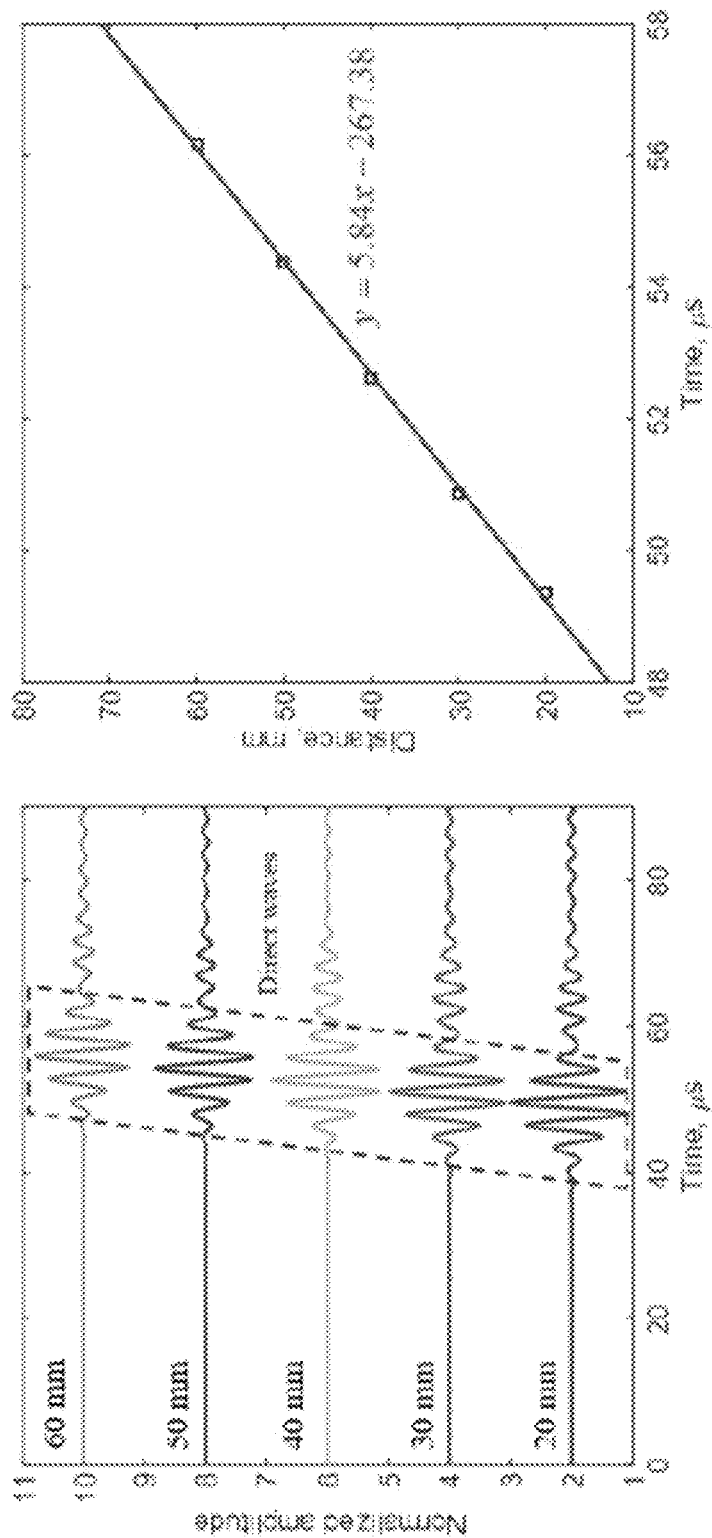
FIG. 32 shows measured signals (left) and FFT results (right) for quasi-S0 mode excitation.
Figure 33:
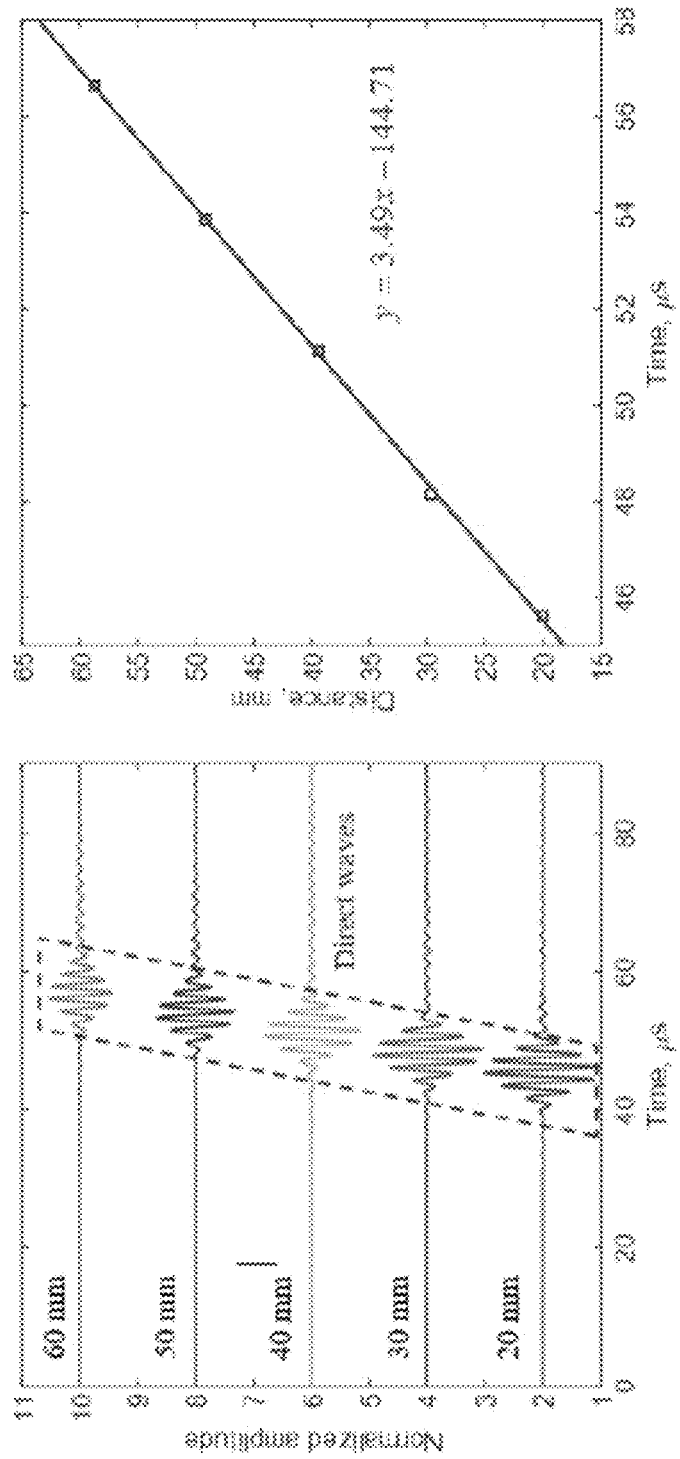
FIG. 33 shows measured signals (left) and FFT results (right) for quasi-SH0 mode excitation.

The measured signals were received from the ABT at different distances to obtain the group velocity as can be seen in FIGS. 32 and 33. For the quasi-S0 mode at 300 kHz, it was observed that nondispersive waves were received and the measured group velocity of the direct waves is 5.84 mm/μs, which matches the theoretical group velocity of the quasi-S0 mode (5.87 mm/μs). Similarly, for the quasi-SH0 mode at 500 kHz, it was observed that nondispersive waves were received and the measured group velocity of direct waves is 3.49 mm/μs, which matches the theoretical group velocity of the quasi-SH0 mode (3.39 mm/μs). We were unable to generate quasi-SH0 mode at 300 kHz and changed the frequency to 500 kHz to generate pure quasi-SH0 mode.

Figure 34:
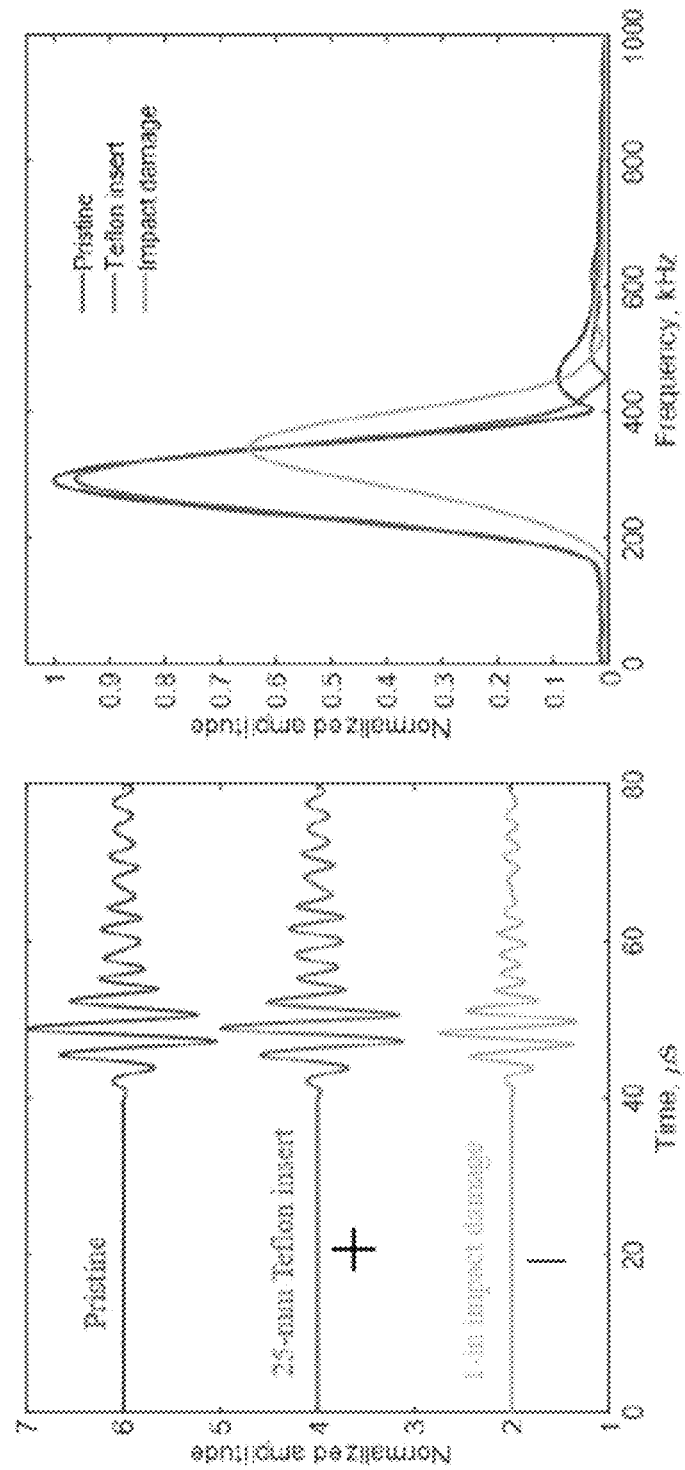
FIG. 34 shows measured signals (left) and FFT results (right) for quasi-S0 mode excitation.

The ABT-ABT experimental setup was used to excite the quasi-S0 mode for detecting both the different types of damage. It can be clearly observed from the results obtained in FIG. 34, that no amplitude difference can be obtained between a pristine region and a region which has Teflon insert but a clear amplitude drop and slight frequency shift can be observed in the region which has the same size of impact damage as that of the Teflon insert. This means that the quasi-S0 mode interacts differently with the impact damage and the Teflon insert, and is not sensitive to detect delamination but is sensitive to impact damage in thick CFRP composite plates. This is also a major finding in our research and in this disclosure.

Figure 35:
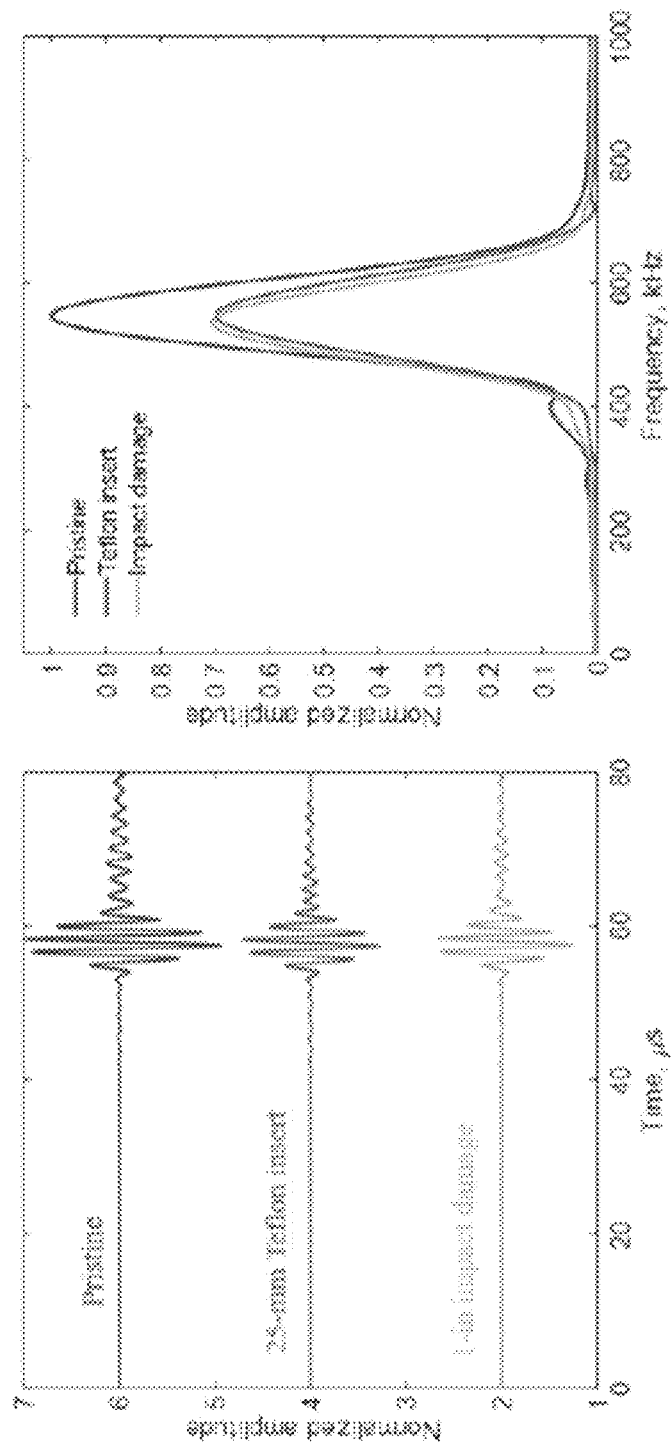
FIG. 35 shows measured signals (left) and FFT results (right) for quasi-SH0 mode excitation.

Similarly, the ABT-ABT experimental setup was used to excite the quasi-SH0 mode for detecting both the different types of damage. It can be clearly observed from the results obtained in FIG. 35, that a clear amplitude drop can be observed between a pristine region and a region which has 1" Teflon insert and another region which has 1" impact damage. This means that the quasi-SH0 mode interacts with both—the impact damage and the Teflon insert, and is sensitive to detect both types of damages in thick CFRP composite plates. This is also major finding in our research and in this disclosure.

Detection of Various Composite Damage Types Using ABT-PAT Experimental Setup

Figure 36:
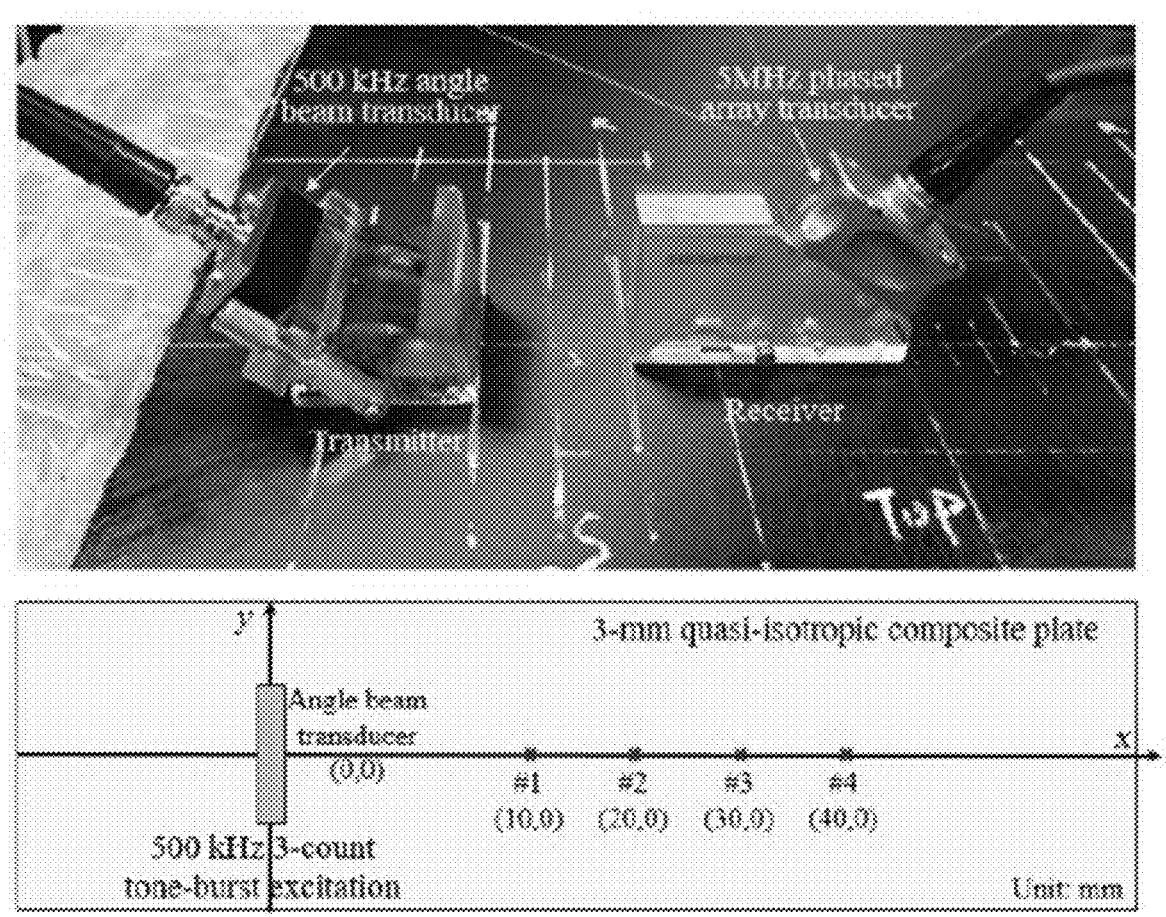
FIG. 36 shows pitch-catch experiments on 3-mm quasi-isotropic CFRP composite plate using ABT-PAT.
Figure 37:
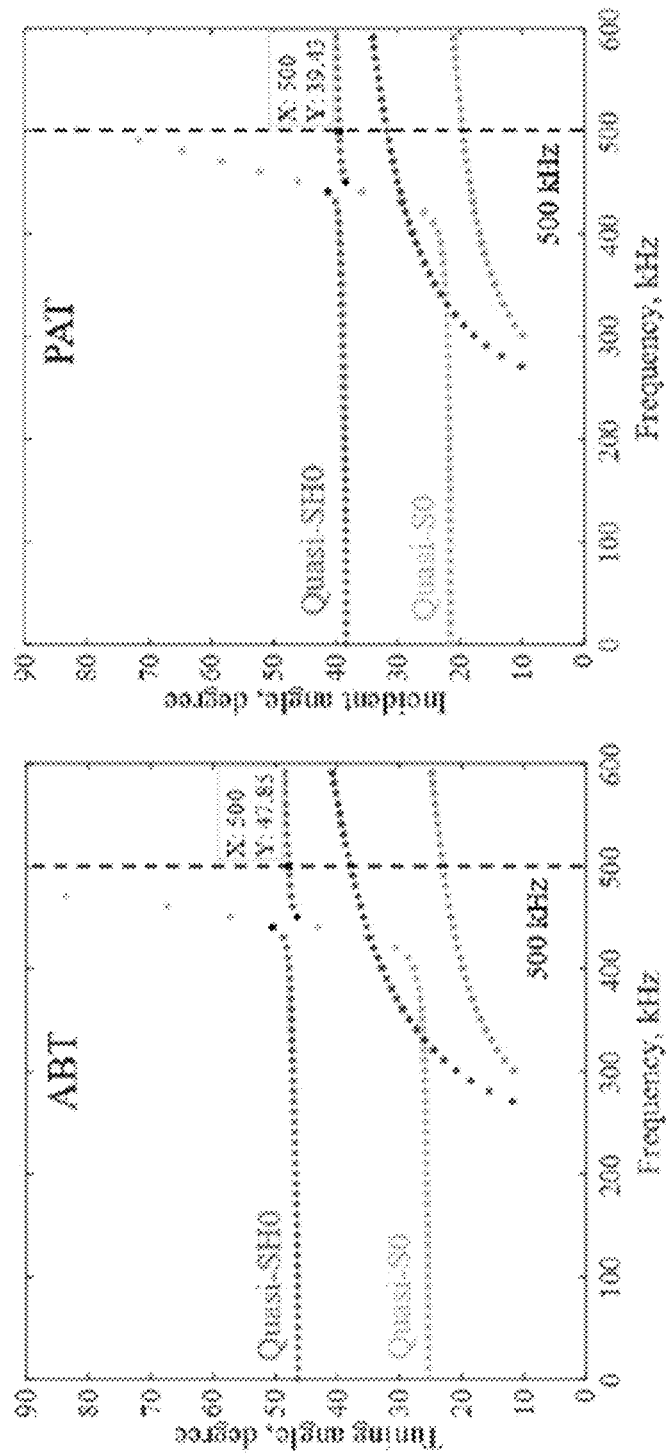
FIG. 37 shows tuning angles for transmitted ABT (left); tuning angles for receiver PAT (right).

Guided Wave Detection on 3-Mm Quasi-Isotropic Composite Plate with Teflon Insert and Impact Damage Using ABT-PAT Method In this section, we have described the multi-mode guided-wave detection of different types of damage in a 3-mm quasi-isotropic CFRP composite using the ABT-PAT experimental setup. The experimental setup is displayed in FIG. 36. From FIG. 37, we can observe that the tuning angle to generate the pure quasi-SH0 mode using the ABT is approximately 48 degrees at 500 kHz excitation. We can also observe that tuning angle to receive the quasi-SH0 mode using the PAT is 39 degrees.

Figure 38:
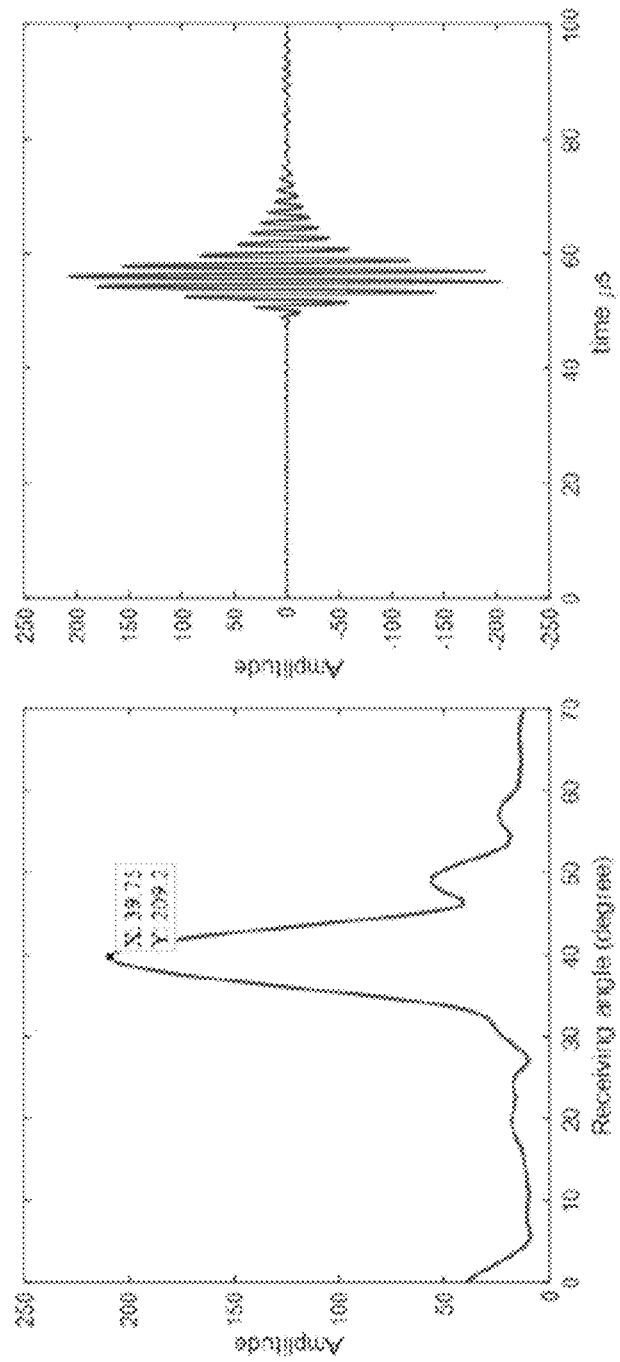
FIG. 38 shows receiving angle vs amplitude for the PAT (left); Waveform at 39.75 degrees (right).
Figure 39:
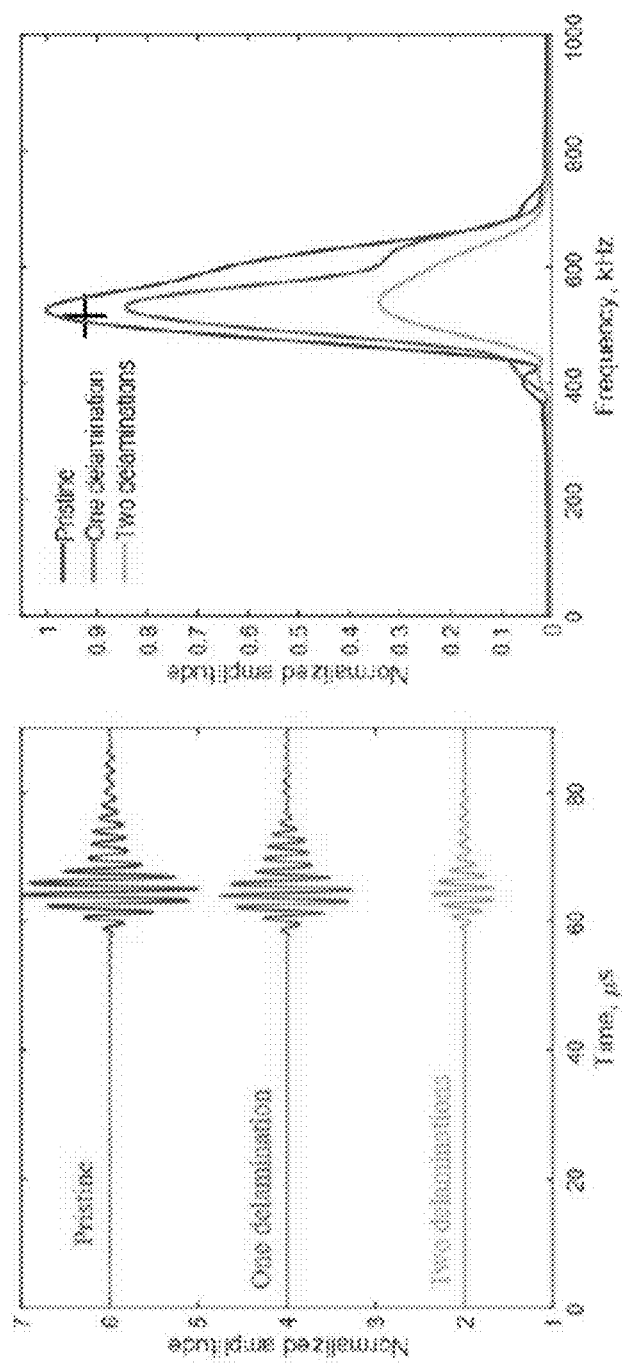
FIG. 39 shows PAT signal comparison between pristine and delaminations.

We use the ABT-PAT method over a pristine region to see if the pure quasi-SH0 mode can be received using the PAT and we find from FIG. 38 that the receiving angle of maximum amplitude is around 39.75 degrees which matches well with the tuning angle of the quasi-SH0 mode (theoretical value is 39.43 degrees). Looking at the signal comparison between the pristine scenario and the scenario with one and two delaminations in FIG. 39, we can observe that the ABT-PAT method can be used to differentiate between one delamination and two delaminations.

Figure 40:
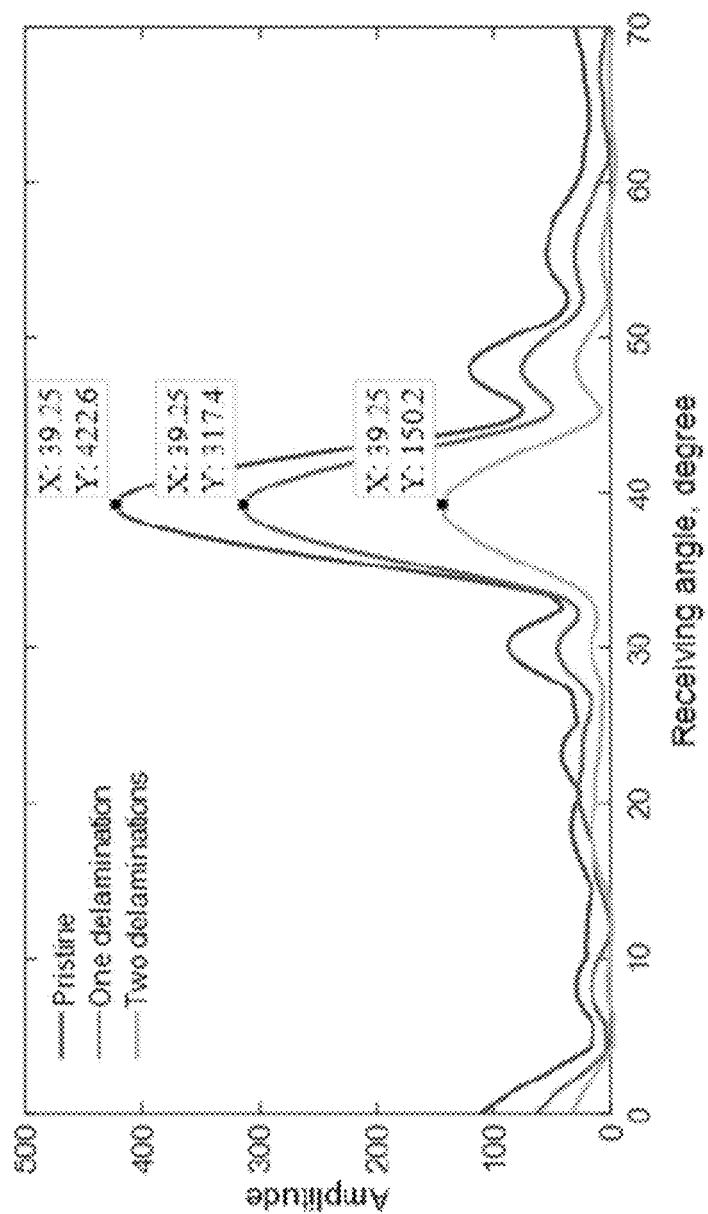
FIG. 40 shows receiving angle vs amplitude for pristine and delaminations.
Figure 41:
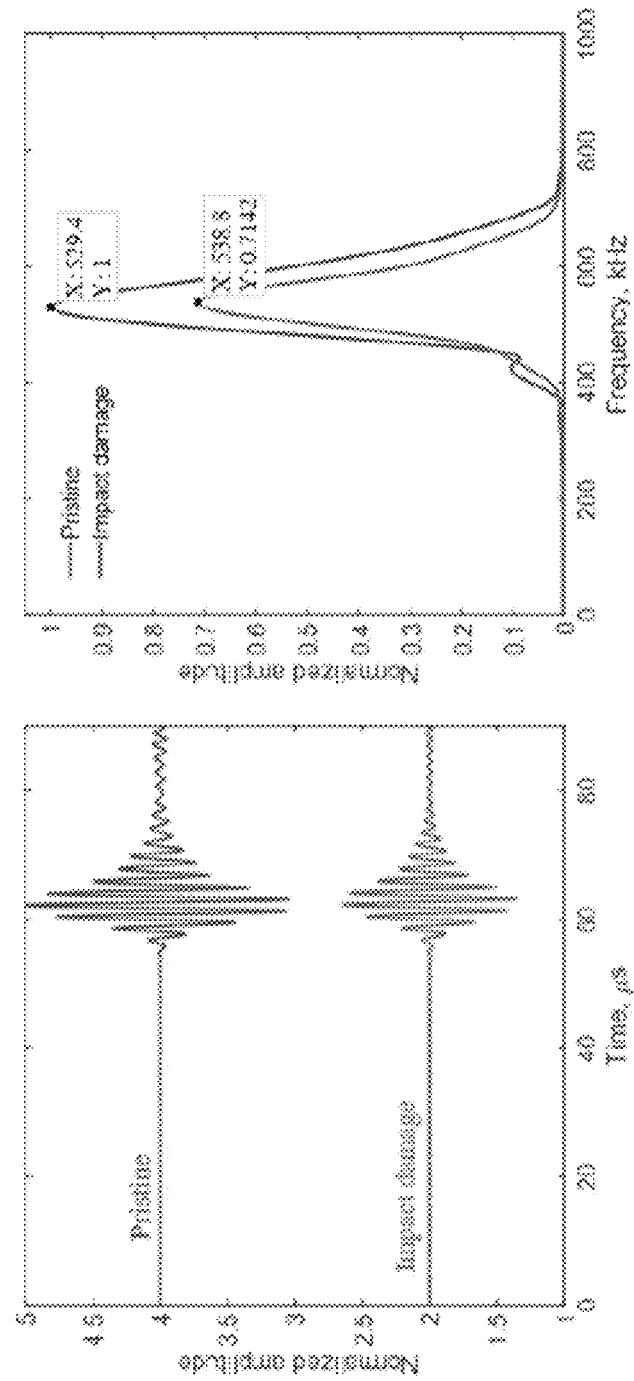
FIG. 41 shows a PAT signal comparison between pristine and impact damage.
Figure 42:
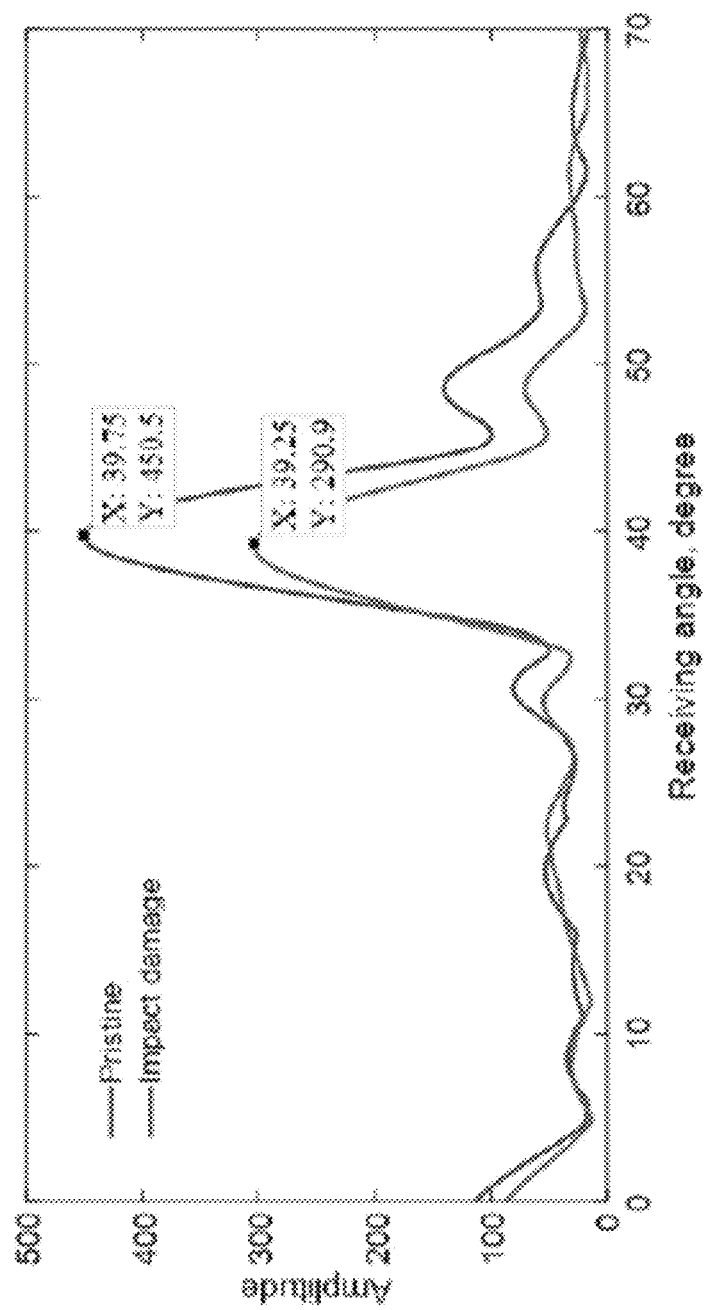
FIG. 42 shows receiving angle vs amplitude for pristine and impact damage.

Also, from FIG. 40, we can see the receiving angle vs amplitude plot for the PAT in which we observe that the amplitude drop can be clearly seen due to the presence of delamination, however, the receiving angle of the maximum amplitude remains almost the same. We have also compared the pristine area with an area which has an impact induced damage and we can observe from the results in FIG. 41, that a clear amplitude drop can be observed due to the presence of impact damage. Also, from FIG. 42, we can see the receiving angle vs amplitude plot for the PAT in which we observe that the amplitude drop can be clearly seen due to the presence of impact damage, however, the receiving angle of the maximum amplitude remains almost the same.

The current disclosure proposes a new single-mode guided wave-based method to detect various types of damage in aerospace composites. In this method, single-mode guided wave excitation was achieved using adjustable angle beam transducers (ABT). The ABT tuning angles of various pure-mode guided waves were calculated based on Snell's law applied to the composite dispersion curves. A finite element (FE) simulation of pure S0 mode excitation in a crossply composite plate was conducted and the simulation results were validated by the experiment. For the first time, angle beam transducers were applied to generate pure shear horizontal (SH0) wave in a thick quasi-isotropic composite plate. The pure SH0 wave excitation was successfully verified by a three-dimensional (3D) FE simulation. SH0-mode wave propagation and interaction with delaminations were further conducted and strong trapped waves within the delamination regions were observed. Experiments using S0 or SH0 pure-mode guided waves were conducted to detect various types of composite damage, such as wrinkle damage in the crossply composite plate, multilayer delaminations by Teflon inserts, and actual impact damage in the thick quasi-isotropic composite plate. A significant amplitude drop was observed due to the presence of different composite damage types. In addition, a linear scanning method using pure SH0 wave was also developed to estimate the sizes of delaminations and impact damage. Both numerical and experimental results demonstrated the validity and usefulness of the proposed method for the detection of various damage types in composites.

Guided waves have the advantage of long-distance propagation in complex structures and low energy loss, which have been widely used in the structural health monitoring of composite structures. In general, there are two different families of guided waves in plate-like structures: Lamb waves and shear horizontal (SH) waves, see Giurgiutiu V., *Structural health monitoring of aerospace composites*. Elsevier Academic Press; 2016. Among them, Lamb-wave based SHM technologies have been widely used to detect various types of damage in composite structures, including delamination, impact damage, and de-bonding. For the delamination detection, Guo and Cawley used a two-dimensional (2D) finite element (FE) method to investigate the reflection of the S0 mode Lamb wave from a delamination in unidirectional and crossply laminates. Ramadas et al. investigated the A0 mode interaction with the symmetric and asymmetric delaminations using a 2D FE model with experimental validations. They showed that the mode-converted S0 mode was confined only to the sub-laminates within the delamination region and converts back to the A0 mode when exiting the delamination that is symmetrically located across the thickness, while the propagation of mode-converted S0 mode in the main laminate was noted when A0 mode interacts with the delamination that is located asymmetrically across the thickness. More recently, Munian et al. used a 2D time-domain spectral finite element (TSFE) method to investigate the Lamb wave interaction with the delaminations. Leckey et al. presented the benchmark studies of four various simulation tools, three commercial packages COMSOL, ABAQUS, and ANSYS, and a custom code, elastodynamic finite integration technique (EFIT), for the three-dimensional (3D) modeling of Lamb wave interaction with the delamination in composites. Leckey and Seebo used FE simulations to study differences in trapped energy for multilayer delaminations and they found that the trapped energy increases when additional delaminations exist through the composite thickness. 3D FE simulations were also conducted to investigate the Lamb wave interaction with the impact damage in quasi-isotropic laminates.

These studies have facilitated our understanding of Lamb wave-based SHM applications for damage detection in composites. However, the problem for the typical Lamb wave is complicated by the existence of at least two wave modes at any given frequency, and by the inherent dispersive nature of the Lamb wave modes existing in thin-wall structures. Therefore, the multi-mode dispersive propagation will make the wave signal complex and increase the difficulty of signal interpretations. To solve the problem, a single piezoelectric transducer with mode tuning effect and double piezoelectric transducers with symmetric bonding technique have been tried for selective excitation of a single desired wave mode.

In recent years, adjustable angle beam transducers (ABT) have also been utilized to achieve single-mode Lamb wave excitation and detection. Bunget et al. [27] used the ABT pair, one transmitter ABT and one receiver ABT, to detect the crack growth in an aluminum plate using the S1 mode Lamb wave. Rafik et al. [28] utilized the ABT pair to evaluate the delamination simulated by Teflon insert in a crossply composite plate with the S0 mode Lamb wave being used to detect the simulated delamination. Toyama and Takatsubo employed the ABT and acoustic emission (AE) methods to detect impact damage in a crossply composite plate. In their study, the ABT was used as a transmitter to generate a pure S0-mode Lamb wave. These studies facilitate the understanding of SHM applications using single-mode Lamb waves generated by ABT.

Compared with widely used Lamb waves, fundamental shear horizontal (SH0) waves are relatively simpler because they are only mildly dispersive in typical composites. However, SH0 waves have been less investigated for composite SHM applications. In metallic structures, SH waves were usually excited by electromagnetic acoustic transducers (EMAT). ABT transducers are not usually used to excite SH0 waves in isotropic structures because they would require a shear-wave coupled transducer whereas ABT devices are usually pressure-wave coupled.

Therefore, EMAT transducers are the method of choice for exciting SH waves in metallic structures. However, EMAT methods are not appropriate for composites. In recent years, the convenience of SH waves has spurred the development of new techniques to overcome the difficulties associated with SH wave generation in composites. SH-wave piezoelectric transducers based on either thickness-shear (d15) mode or face-shear (d36 and d24) mode piezoelectric wafers or strips have been developed for SH wave generation. A thin, lightweight, and flexible shear-horizontal piezoelectric fiber patch has also been developed for exciting the SH waves in various materials. However, these SH-wave transducers must be permanently bonded onto the structures in order to be effective. Single-mode SH wave excitation and its NDE applications for composites are very limited at the present moment.

This disclosure provides a method for single-mode Lamb wave and SH wave generation in composites using adjustable angle-beam transducers. The pure-mode guided waves are used to detect various types of composite damage. The disclosure starts with the excitation of a pure S0 mode in a crossply composite plate and then continues with the excitation of a pure SH0 mode in a quasi-isotropic composite plate.

First, a finite element simulation was conducted to verify the feasibility of pure S0 mode excitation in a crossply composite plate using adjustable ABT methods. Next, a pitch-catch experiment using an adjustable ABT pair was conducted to validate the pure S0 mode Lamb wave excitation. Then, the S0 mode was utilized to detect wrinkle damage in the crossply composite plate. Finally, for the first time, angle beam transducers were used to generate pure SH0 mode in a quasi-isotropic composite plate. 3D FE simulations were also conducted to verify the pure SH0 mode excitation and to investigate SH0 wave interaction with multilayer delaminations in the quasi-isotropic composite plate. Experimental validations using pure SH0 waves were performed to detect multilayer delaminations simulated by Teflon inserts.

Both the simulation and the experiment confirmed the amplitude drops due to the trapped waves within the delamination regions. Pure SH0 wave was also used to detect the actual impact damage in the quasi-isotropic composite plate. A linear scanning method was developed to estimate the sizes of delaminations and impact damage. The estimated damage sizes were also compared with the data obtained by the conventional ultrasonic C-scan in an immersion tank. A good match was achieved.

The novelty of the proposed method consists of using pressure-wave angle-beam transducers to excite pure SH0 waves in composites. In isotropic metals, such SH0 excitation would be impossible with angle beam transducers because there is no coupling between pressure and SH0 waves. However, in composites with certain layups, such as quasi-isotropic composites, coupling exists between pressure and shear waves.

This work shows that such coupling can be exploited to generate pure SH0 waves using pressure transducers impinging at an oblique angle. Herein, the oblique angle may range from 90 to 180 degrees, 100 to 170, 110 to 160, 120 to 150, 130 to 140, as well as subsets of these ranges, such as angles in the ranges of 95 to 175, 105 to 165, 115 to 155, 125 to 145, 135 to 140, etc., including specific angles such as 95, 107, 113, 124, 156 degrees, etc. To the inventors' knowledge, this is the first time when such a phenomenon has been reported in composite ultrasonics. The use of pure SH0 waves has certain advantages for damage detection in the quasi-isotropic composite plate.

Single-Mode Tuning Using Angle Beam Transducers

Angle beam transducers (ABT) and wedges are generally used to generate and receive single-mode guided waves with specified mode-frequency combinations. In a practical application, the selection of a single-mode guided wave can be realized by using angle beam transducers and wedges for a selected frequency. Let $c_w$ be the velocity of the pressure waves in the wedge, c is the phase velocity of the desired wave mode at a selected frequency in a thin-wall composite structure. θ is the ABT tuning angle, which is the incident angle of the pressure waves impinging on the structure, as shown in FIG. 1. According to Snell's law, wave mode with a phase velocity of c will be enhanced through the phase matching, see Sun Z, Rocha B, Wu K T, Mrad N. *A methodological review of piezoelectric based acoustic wave generation and detection techniques for structural health monitoring*. Int J Aerospace Eng 2013; 2013:928627, much more than waves of any other phase velocities if the following condition is satisfied, see Equation 1:

$$\sin\theta = \frac{c_w}{c} \quad (1)$$

To change the ABT tuning angle θ, an angle-adjustable wedge (ABWX-2001) manufactured by Olympus was typically used, as shown in FIG. 2. It allows the user to adjust the tuning angle from 0° to 70° to generate various wave modes.

Pure S0 Mode Generation and Damage Detection in a Crossply Composite Plate

Adjustable angle beam transducers (ABT) were used to generate a pure S0-mode guided wave in a 1.5-mm crossply carbon fiber reinforced polymer (CFRP) composite plate with a stacking sequence of $[0/90]_{3s}$. First, the ABT tuning angle of the crossply composite plate was calculated based on Snell's law applied to the dispersion curves. Then, a finite element simulation of pure S0 mode generation was conducted in ABAQUS to verify the feasibility of single-mode generation using ABT in composites. Next, a pitch-catch experiment using an adjustable ABT pair was carried out to validate the pure S0 mode generation. Finally, pure S0 mode was utilized to detect wrinkle damage in the crossply composite plate.

ABT Tuning Angle Calculation

Figure 44:
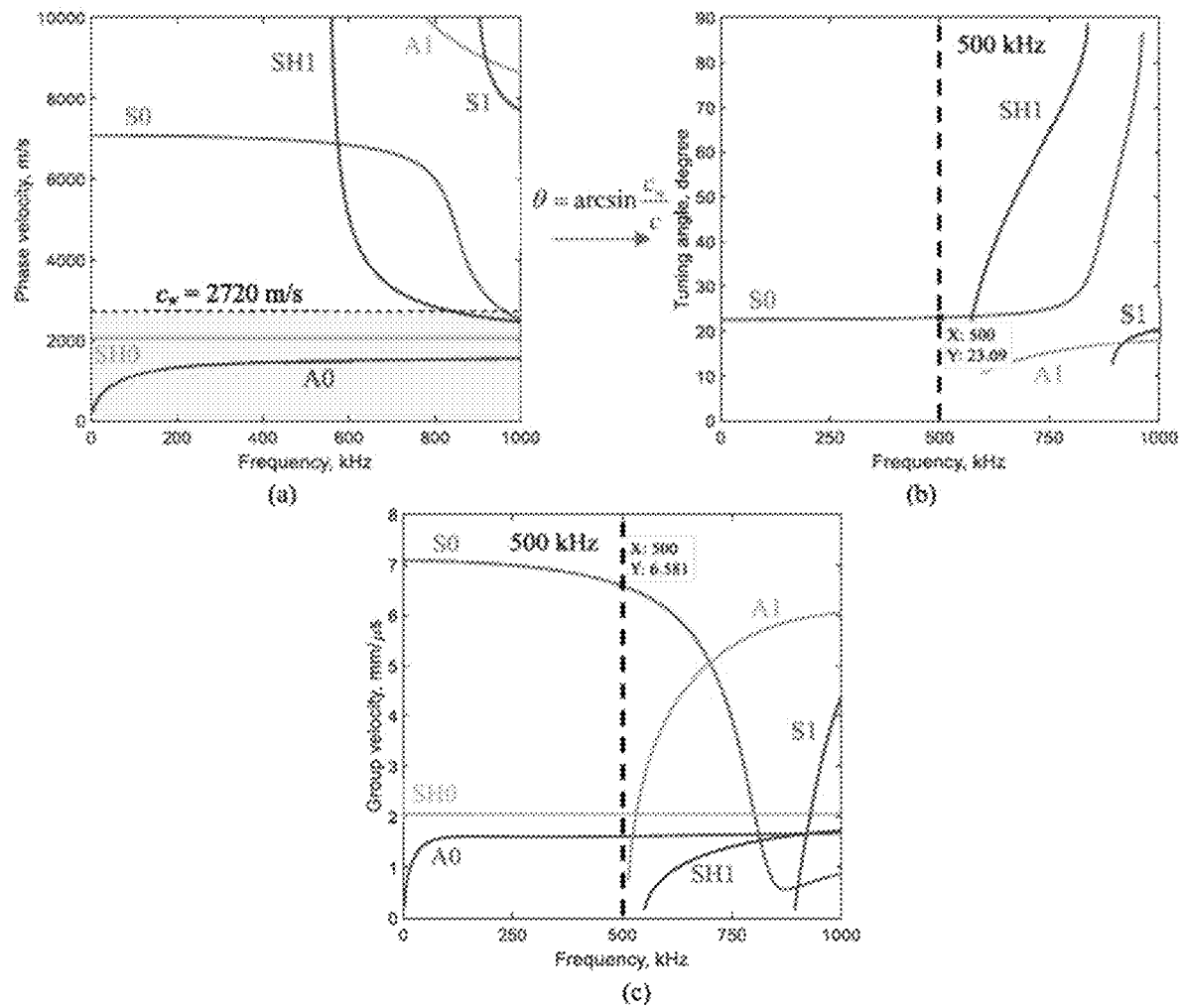
FIG. 44 shows dispersion curves of a 1.5-mm [0/90]$_{3s}$ crossply composite plate in the 0° direction at: (a) phase velocity; (b) ABT tuning angle; (c) group velocity.

To calculate the ABT tuning angle θ, the composite phase-velocity dispersion curve has to be obtained first. In this work, a semi-analytical finite element (SAFE) method was used to calculate the dispersion curves of the 1.5-mm crossply CFRP composite plate. The material properties were measured experimentally using the ultrasonic immersion technique as described in Barazanchy D, Roth W, Giurgiutiu V. *A non-destructive material characterization framework for retrieving a stiffness matrix using bulk waves*. Compos Struct 2018; 185:27-37, given in Table 1, FIG. 43. FIG. 44 shows the dispersion curves of the 1.5-mm crossply CFRP composite plate obtained using the SAFE method, see Mei H, Giurgiutiu V. Guided wave excitation and propagation in damped composite plates. *Struct Health Monit* 2019; 18(3):690-714. For the SAFE approach, 24 one-dimensional (1D) quadratic elements across the thickness direction were utilized to ensure the convergence of the solution. Phase-velocity dispersion curves of the 1.5-mm crossply CFRP composite plate in the 0° direction are shown in FIG. 44 at (a).

Here, the wedge velocity of the angle-adjustable wedge is 2720 m/s and the central frequency of the angle beam transducer is 500 kHz. The ABT tuning angle θ was calculated based on Eq. (1), as shown in FIG. 44 at (b). It can be found that the wave modes cannot be excited when their phase velocities are below $c_w$ because the value of sine function can never be greater than one. At 500 kHz, only S0 mode can be excited, and the corresponding tuning angle is around 23°. Therefore, the incident angle of the angle beam transducer should be set to 23° to excite pure S0 mode in the crossply CFRP composite plate. FIG. 44 at (c) shows the group-velocity dispersion curves. The theoretical group velocity of S0 mode at 500 kHz is 6.581 mm/μs, and it can be utilized to validate the pure S0 mode generation by comparing the experimental group velocity with the theoretical value.

Finite Element Simulation

Finite element (FE) simulations of guided wave generation using angle beam transducers have been studied by several authors. This method has been found promising applications in the field of structural health monitoring as a powerful tool for modeling guided wave generation and propagation in composite structures. In this section, the FE simulation was conducted to understand the efficiency of pure S0 mode excitation in the 1.5-mm crossply CFRP composite plate using angle beam transducers.

A two-dimensional (2D) FE simulation was conducted to verify the excitation of pure S0 mode wave through an angled wedge. The model consisted of a 1.5 mm $[0/90]_{3s}$ crossply composite plate with a rexolite wedge. Four-node plane-strain (CPE4R) elements with a reduced integration scheme were used for this analysis. The geometry of the FE model is shown in FIG. 5. The ply stiffness matrix was calculated for each ply angle in the specimen and entered as material properties for the 2D FE model. To excite pure S0 mode at 500 kHz, the incident angle of the wedge is set to 23° based on the theoretical ABT tuning angle in FIG. 44 at (b).

The pressure wave is generated on the wedge border by a distributed force of three-count tone burst at the central frequency of 500 kHz. Non-reflective boundaries (NRB) developed by Shen and Giurgiutiu, see Shen Y, Giurgiutiu V. *Effective non-reflective boundary for Lamb waves: theory, finite element implementation, and applications. Wave Motion* 2015; 58:22-41, were used around the wedge to absorb boundary reflections. A dense mesh was used due to the high frequencies and corresponding short wavelengths, the element size is 25 μm.

Figure 45:
FIG. 45 shows results of the in-plane guided wave displacement fields at different times: (a) 15 μs; (b) 20 μs; (c) 25 μs.

Results of the in-plane guided wave displacement fields at different times are shown in FIG. 45. It can be found that a single wave packet was generated in the crossply CFRP composite plate. The in-plane displacements are symmetrically displaced with respect to the mid-plane, which means that a symmetric mode guided wave was successfully generated in the composite plate.

In order to calculate the group velocity of the single-mode wave generated in the crossply composite plate, the waveforms at five various locations were extracted from the FE model, as shown in FIG. 6. The time of flight (TOF) of the direct wave packet was determined for each location and plotted as a function of distance from the excitation. A linear regression was used to estimate the group velocity, yielding a value of 6.60 mm/μs, which compares favorably to the theoretical S0-mode group velocity of 6.58 mm/μs at 500 kHz in the crossply composite plate, as shown in FIG. 44 at (c). Therefore, the excited guided wave in the crossply composite plate is a pure S0 mode as expected. It demonstrated that the angle beam transducer could successfully generate the selected single-mode guided wave in composite plates.

Experimental Validations of Pure S0 Mode Generation

FIG. 7 illustrates the experimental setup for the single-mode guided wave excitation and detection using adjustable angle beam transducers (ABT). A pair of ABT tuned at 500 kHz (Olympus A413S-SB) mounted on angle-adjustable wedges (Olympus ABWX-2001) were used to generate pure S0 mode in the crossply composite plate. The coupling between wedges and the specimen was ensured by a high-performance and general-purpose ultrasonic couplant (SOUNDSAFE, Olympus), which is compatible with most composites. For the excitation of pure S0 mode at 500 kHz, the incident angle of the wedge was set to 230 based on Snell's law, which is the same tuning angle used in the FE simulation. The excitation signal applied to the transmitter ABT was a three-count tone burst at the central frequency of 500 kHz generated by a function generator (33120A, Agilent), and amplified to 80 Vpp by a high-speed bipolar amplifier (HSA4014, NF). The response signals were collected by a digital oscilloscope (TDS5034B, Tektronix), which used 100 averages to improve the signal-to-noise ratio. The function generator also sent a trigger signal to the oscilloscope for the synchronization.

Figure 8:
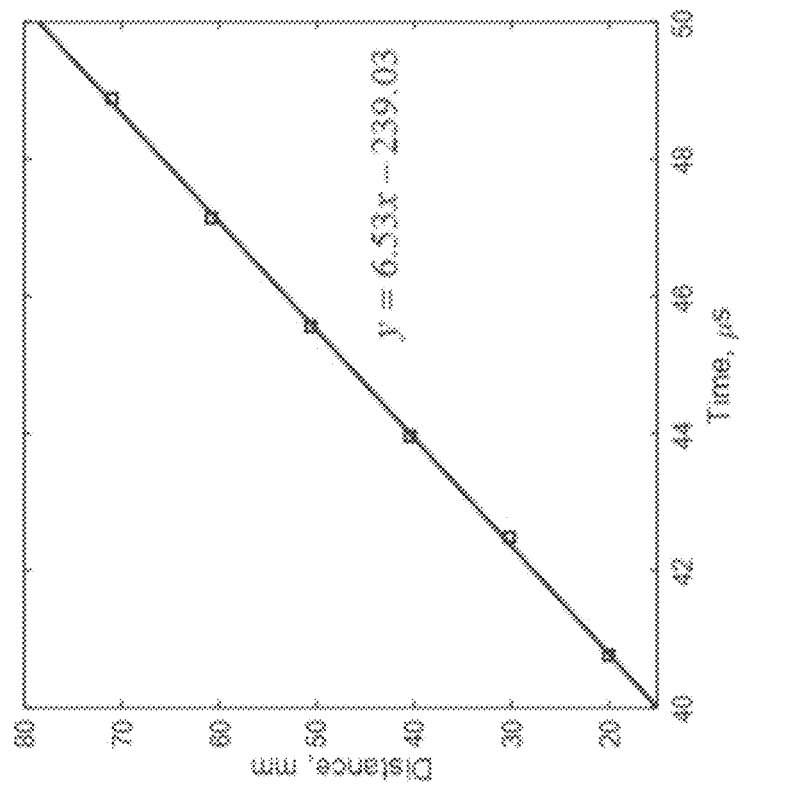
FIG. 8 shows at: (a) measured signals and at (b) time of fight versus distance of the setup shown in FIG. 7.
Figure 8:
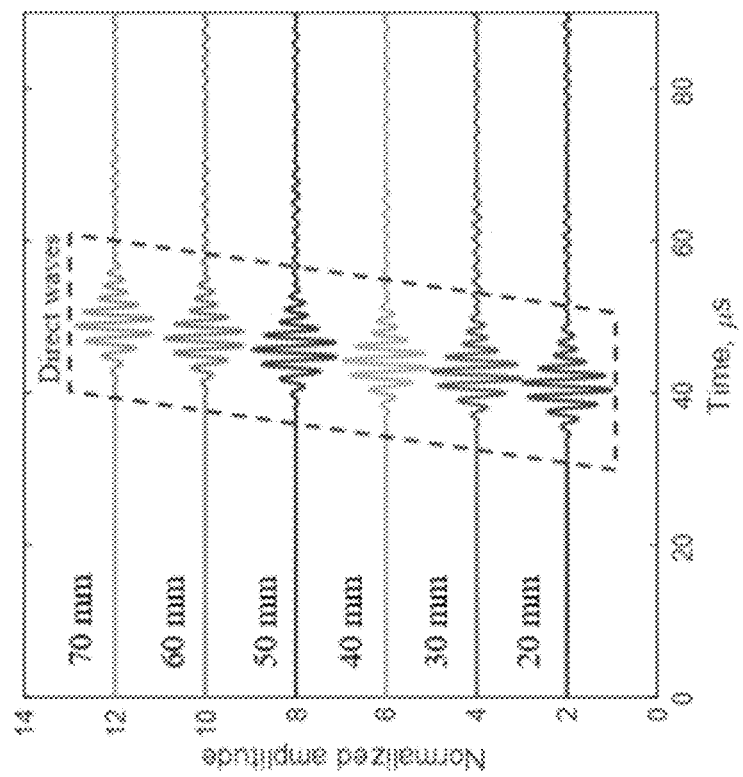

To validate the pure S0 mode excitation, the response signals at six various locations were measured by moving the receiver ABT, as presented in FIG. 7. FIG. 8 at (a) shows the waveforms at different locations. It can be found that strong and non-dispersive wave packets were received. The time of flight (TOF) of the direct wave packet was determined for each location and plotted as a function of distance, as shown in FIG. 8 at (b). Similarly, a linear regression was used to determine the experimental group velocity, yielding a value of 6.53 mm/μs, which agrees with the theoretical S0-mode group velocity of 6.58 mm/μs at 500 kHz. Therefore, the generated guided wave in the 1.5-mm crossply CFRP composite plate is pure S0 mode. The experimental results agree well with the FE simulation, which demonstrates that the selected single-mode guided wave can be successfully generated by the adjustable angle beam transducers in composite plates. The next step is to explore the feasibility of the damage detection using the pure S0-mode guided wave.

Damage Detection Using Pure S0 Mode Guided Wave

Composite Specimen and Ultrasonic Nondestructive Inspection

Figure 46:
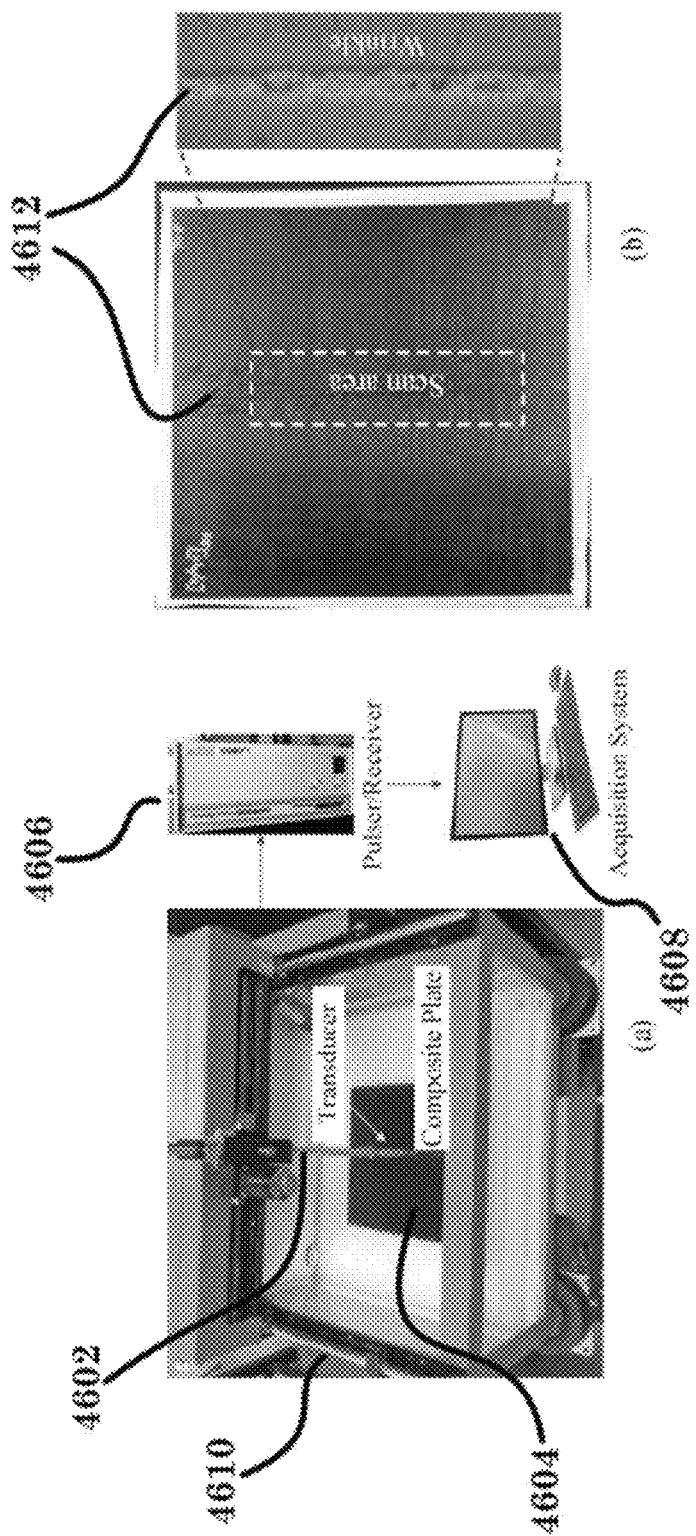
FIG. 46 shows ultrasonic immersion tank inspection at: (a) experimental setup; (b) C-scan results.

A simulated wrinkle damage was introduced between the 1st and 2nd layers of a 1.5-mm crossply $[0/90]_{3s}$ CFRP composite plate by inserting a Teflon rod in the layup during manufacturing. The Teflon rod was squashed during the hot-press processing creating a wrinkle-like damage in the composite plate. Ultrasonic immersion C-scan was conducted to verify and image the wrinkle damage in the specimen. A 10 MHz, 1-inch focused transducer was used for the ultrasonic C-scan. The experimental setup is shown in FIG. 46 at (a) which shows a transducer 4602, composite plate 4604, pulse/receiver 4606 and acquisition system 4608. Composite plate 4604 was placed in immersion tank 4610 with the focused transducer 4602 scanning in the x-y direction. The inspection result is shown in FIG. 46 at (b). Wrinkle damage 4612 can be clearly observed from the ultrasonic C-scan results.

Wrinkle Damage Detection with ABT Method

Figure 47:
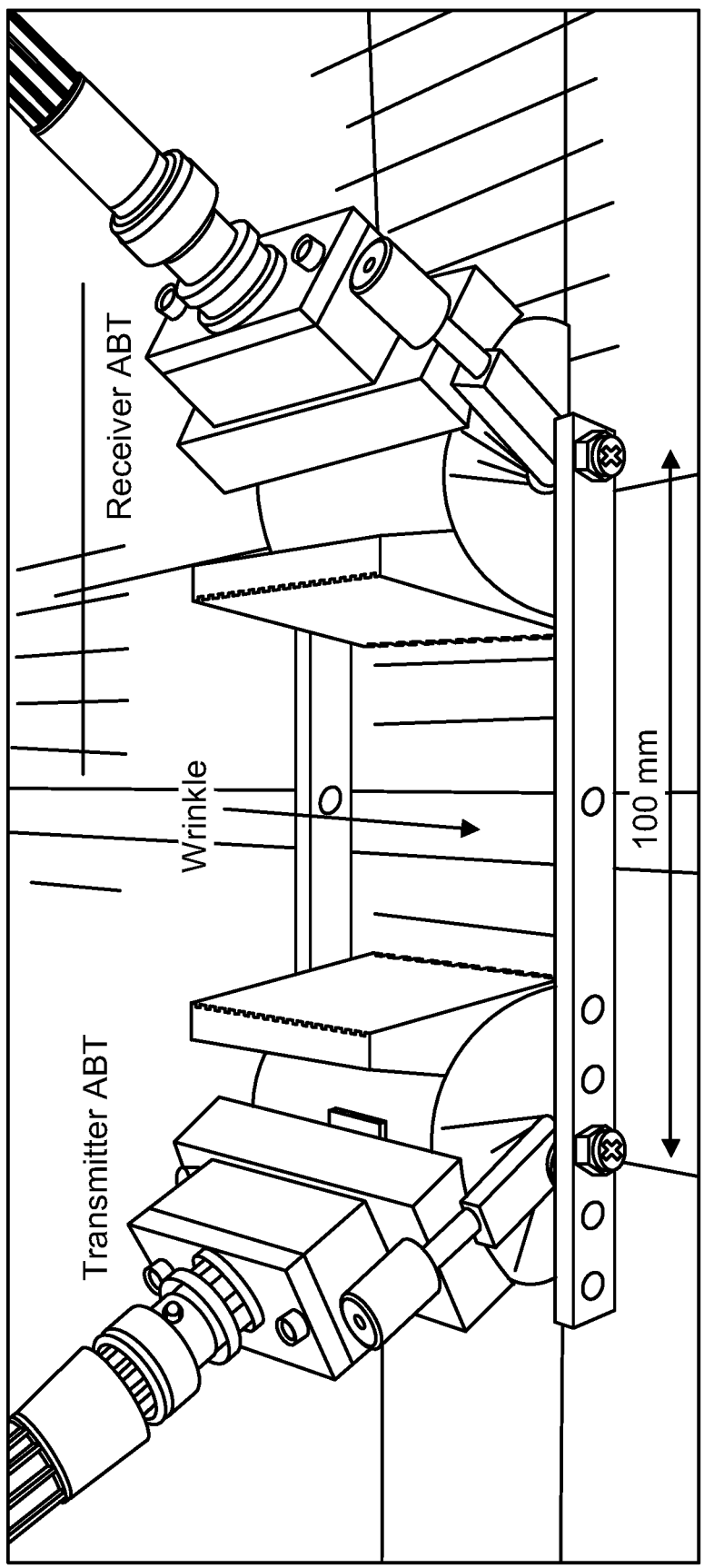
FIG. 47 shows a further experimental setup for wrinkle detection using angle beam transducers on the 1.5-mm $[0/90]_{2s}$ crossply CFRP composite plate.

The adjustable ABT pair was used to detect wrinkle damage using pure S0 mode. A spacing of 100 mm was ensured between transmitter ABT and receiver ABT using a rigid frame, as presented in FIG. 47. The coupling between wedges and the specimen was attained by the ultrasonic couplant (SOUNDSAFE, Olympus). For the inspection using pureS0 mode at 500 kHz, the incident angle of 23° for the wedges are retained based on the ABT tuning angle. A three-count tone burst at the central frequency of 500 kHz was used as the excitation signal for the transmitter ABT.

Figure 48:
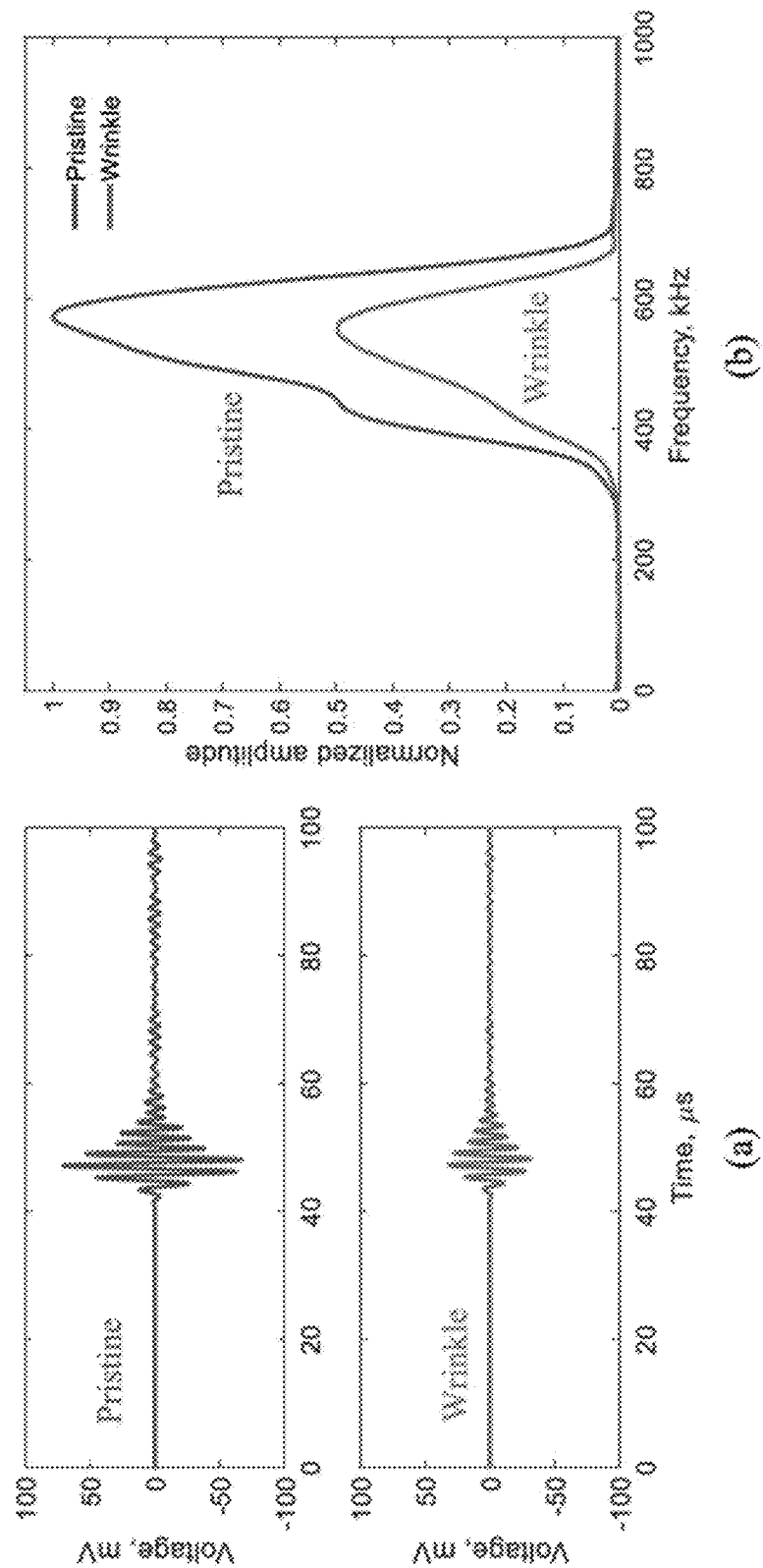
FIG. 48 shows a signal comparison between pristine and wrinkle damage using the pure S0 mode: (a) measured signals; (b) FFT results.

Signal comparison between the pristine and wrinkle damage is shown in FIG. 48. A strong single wave packet of S0 mode was observed for both pristine and wrinkle damage, as presented in FIG. 48 at (a). A high signal to noise ratio was obtained even in the presence of damage. The peak-to-peak amplitude of the S0 mode response signals for the pristine and wrinkle damage are around 140 mV and 60 mV, respectively. The amplitude drop can be clearly observed due to the presence of wrinkle damage. Similar amplitude drop can be noted in the fast Fourier transform (FFT) results, as shown in FIG. 48 at (b). Therefore, the wrinkle damage can be successfully detected using the pure S0 mode generated by angle beam transducers.

Pure SH0 Mode Generation and Damage Detection in a Quasi-Isotropic Composite Plate In this section, pure SH0 mode generated by adjustable angle beam transducers was used to detect various types of composite damage in a 3-mm thick in-house quasi-isotropic CFRP composite plate with a stacking sequence of $[-45/90/45/0]_{3s}$. First, pure SH0 mode was generated using adjustable ABT in the quasi-isotropic CFRP composite plate. Then, three-dimensional (3D) finite element simulations were conducted to verify the pure SH0 mode excitation and to investigate SH0-mode guided wave interaction with delaminations in the quasi-isotropic composite plate.

Next, pure SH0 mode was used to detect multilayer delaminations by Teflon inserts in the quasi-isotropic CFRP plate, one delamination and two delaminations were considered in the experiment. Finally, impact testing was conducted on the quasi-isotropic CFRP plate to produce the actual impact damage and the pure SH0 mode was used to detect impact damage and estimate the size.

Pure SH0 Wave Generation

It is known that SH0 mode shows higher sensitivity to damage for thickness and to delamination, see Su Z, Yang C, Pan N, Ye L, Zhou L M. *Assessment of delamination in composite beams using shear horizontal (SH) wave mode. Compos Sci Technol* 2007; 67(2):244-51 [39]. Pure SH0 mode wave generation and its validation were conducted on a 3-mm [−45/90/45/0]3 s quasi-isotropic CFRP composite plate. Although the ABT excitation consists of pressure waves, the generation of SH0 mode was possible due to the anisotropy of the quasi-isotropic composite layup.

Figure 49:
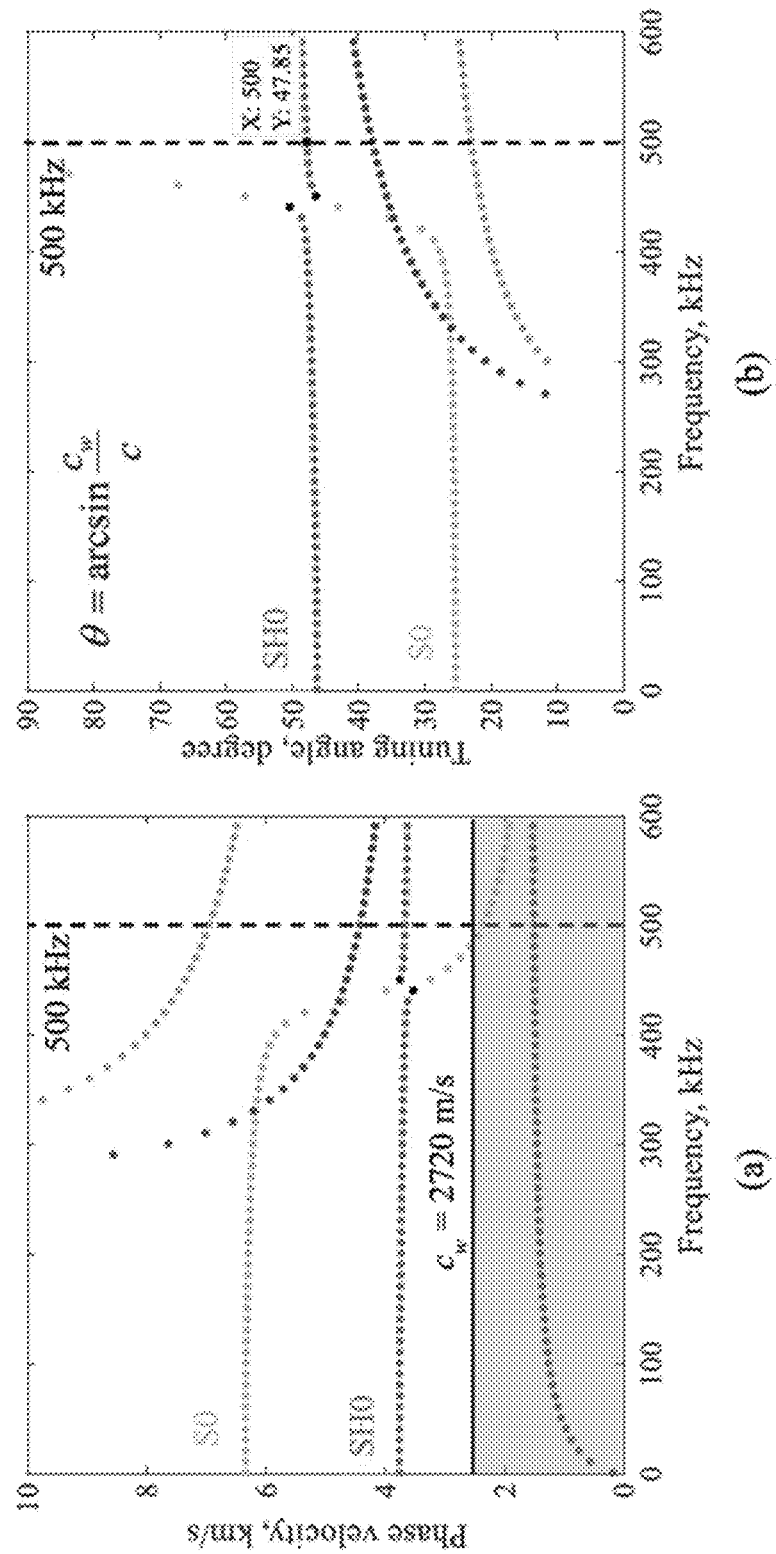
FIG. 49 shows dispersion curves of 3-mm $[-45/90/45/0]_{3s}$ quasi-isotropic CFRP composite plate: (a) phase velocity; (b) tuning angle.

First, the dispersion curves of the quasi-isotropic composite plate were obtained using the SAFE approach. Phase-velocity dispersion curves of the quasi-isotropic CFRP composite plate in the 0° direction are shown in FIG. 49 at (a). The theoretical ABT tuning angle was calculated based on Eq. (1) and the wedge velocity of 2720 m/s, as shown in FIG. 49 at (b). It can be found that the wave modes cannot be excited when their phase velocities are below cw. The phase velocity of SH0 mode is almost a constant, which means that it is only mildly dispersive. At 500 kHz, the ABT tuning angle of SH0 mode is around 48°. To generate pure SH0 mode in the quasi-isotropic composite plate, the incident angle of the wedge should be set to 48° in the experiment.

Figure 50:
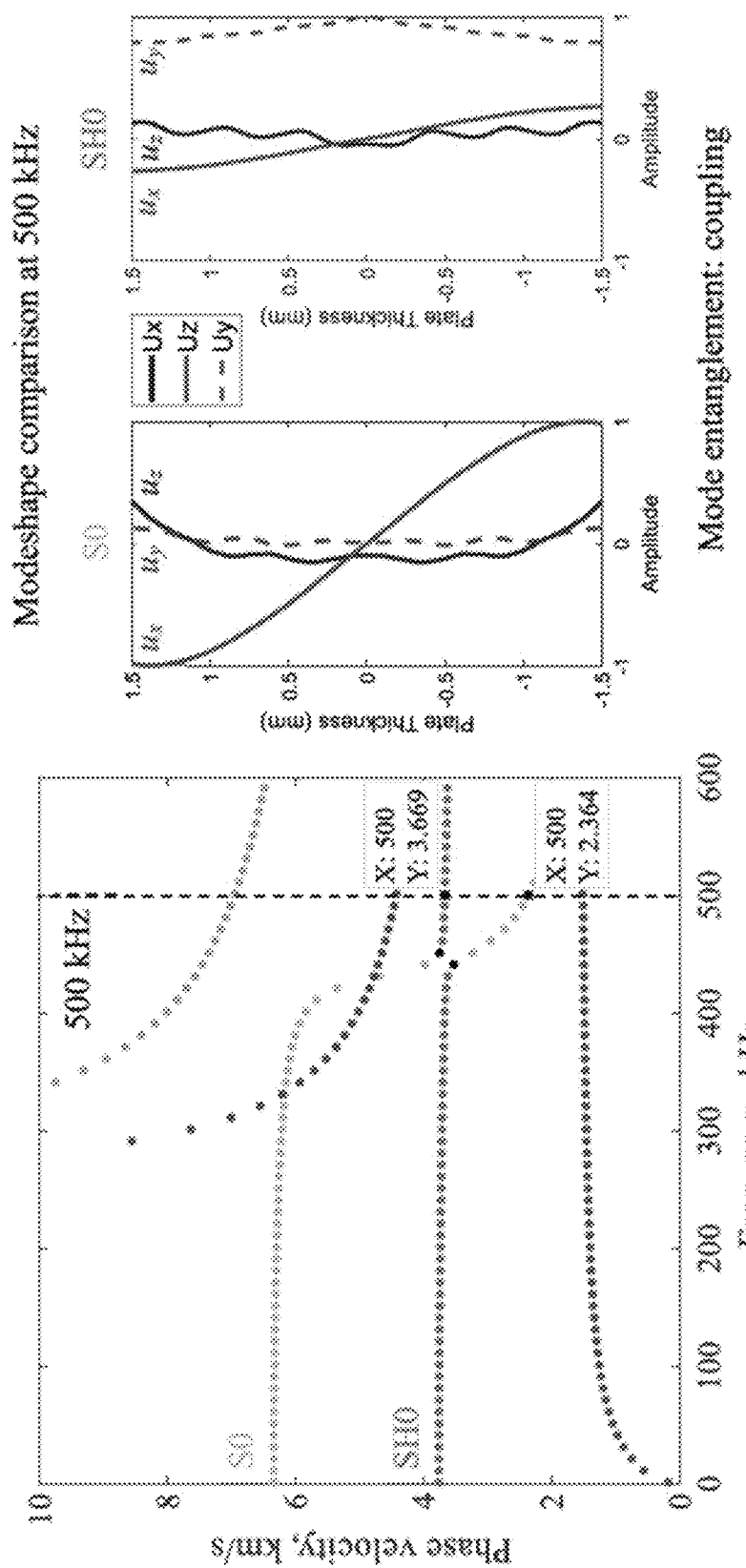
FIG. 50 shows a modeshape comparison between S0 and SH0 modes showing mode entanglement.

To explain the excitation of pure SH0 mode in the quasi-isotropic CFRP composite plate, the modeshape comparison between S0 and SH0 modes is shown in FIG. 50. Mode entanglement (modeshape coupling) due to the anisotropy of the quasi-isotropic composite layup can be clearly observed for both S0 mode and SH0 mode at 500 kHz. For the modeshape, the x-axis and y-axis define the horizontal plane. The x-axis is the wave propagation direction, whereas the y-axis is perpendicular to it. The z-axis is the out-of-plane direction. It can be found that the SH0 mode with the dominant in-plane $u_y$ component also has the in-plane $u_x$ and out-of-plane $u_z$ components at 500 kHz, which is not possible for isotropic metals. In isotropic materials, SH0 mode only has the in-plane $u_y$ component. This modeshape coupling of SH0 mode ($u_x$ and $u_z$ components) gives the opportunity to use the pressure-wave coupled ABT to excite shear-wave coupled wave, pure SH0 mode, in the quasi-isotropic CFRP composite plate. The SH0 mode has a strong through-thickness modeshape ($u_y$), which indicates that it is sensitive to the through-thickness damage types in composites.

Figure 51:
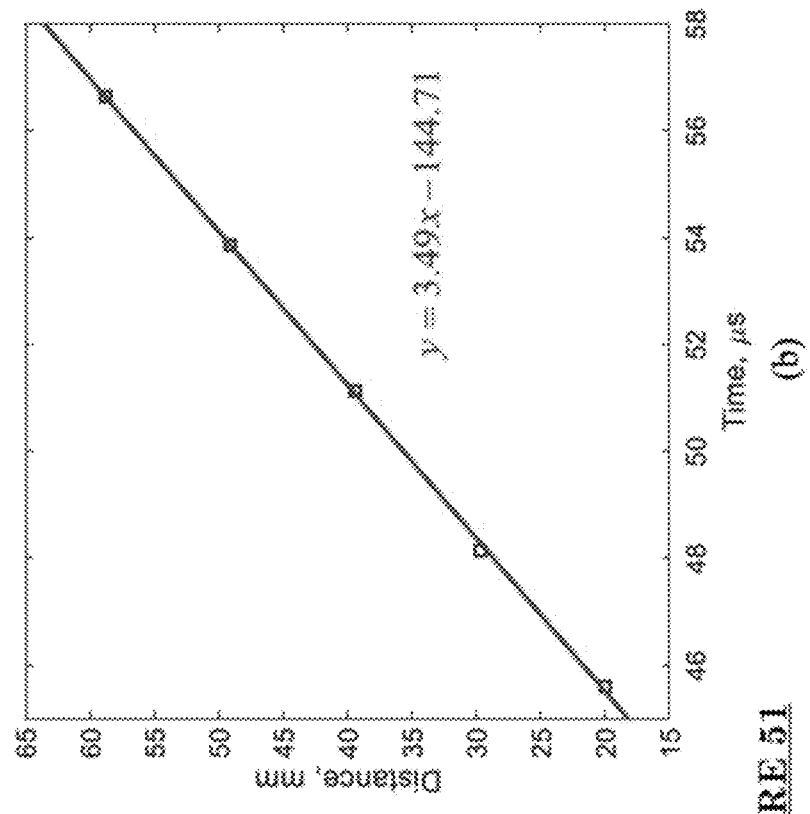
FIG. 51 shows further experimental measurement of group velocity in a 3-mm quasi-isotropic composite plate at: (a) waveforms at various locations showing non-dispersive waves; (b) correlation between distance and time of flight.
Figure 51:
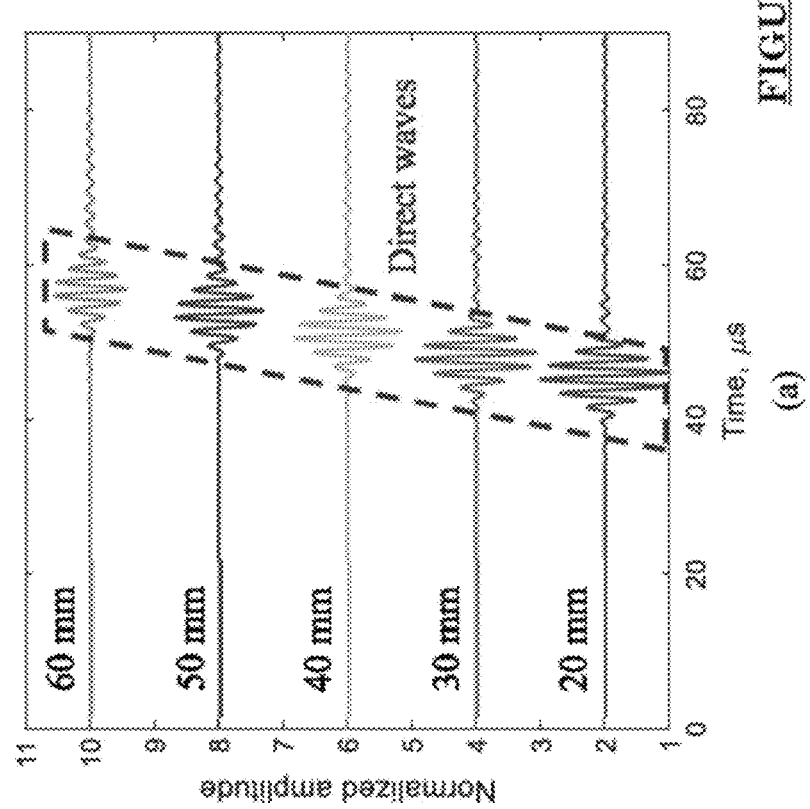

To validate the excitation of pure SH0 mode, the signals at various locations were measured by moving the receiver ABT. The received signals at different locations are plotted in FIG. 51 at (a) showing strong and non-dispersive waves. The TOF of the direct wave packet was determined for each location and plotted as a function of distance, as shown in FIG. 51 at (b). Similarly, a linear regression was used to estimate the group velocity, yielding a value of 3.49 mm/μs, which matches the theoretical SH0-mode group velocity of 3.41 mm/μs at 500 kHz. Therefore, the generated wave in the 3-mm thick quasi-isotropic composite plate is pure SH0 mode as expected.

Figure 52:
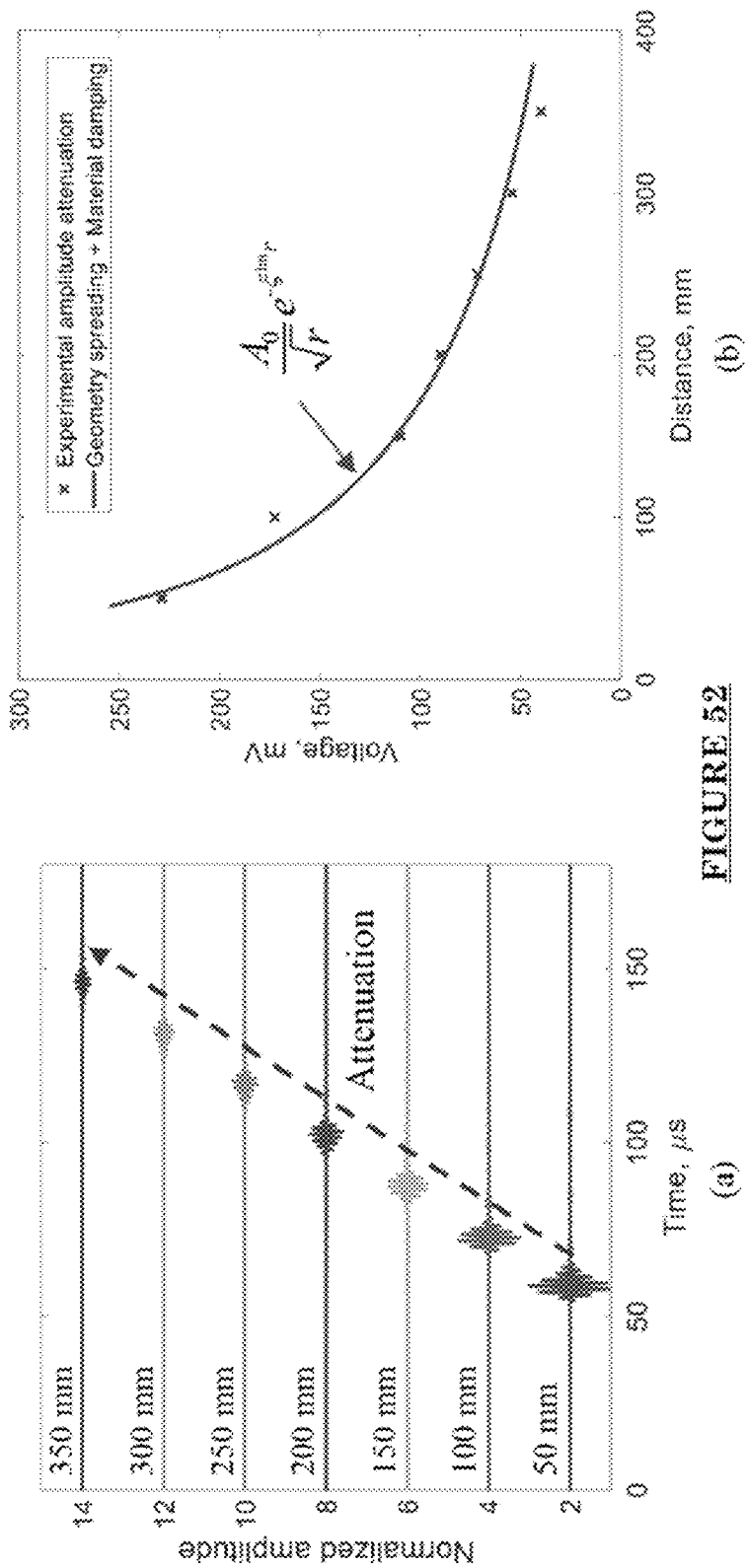
FIG. 52 shows experimental measurements of damping attenuation: (a) received signal at different distances; (b) curve fitting of the peak-to-peak magnitude versus the distance.

The damping attenuation is a critical parameter in mode selection for long-range SHM of aerospace composites, see Ramadas C, Balasubramaniam K, Hood A, Joshi M, Krishnamurthy C V. *Modelling of attenuation of Lamb waves using Rayleigh damping: numerical and experimental studies. Compos Struct* 2011; 93(8):2020-5, Shen Y, Cesnik C E. *Hybrid local FEM/global LISA modeling of damped guided wave propagation in complex composite structures. Smart Mater Struct* 2016; 25 (9):095021, Mei H, Giurgiutiu V. *Effect of structural damping on the tuning between piezoelectric wafer active sensors and Lamb waves. J Intell Mater Syst Struct* 2018; 29(10):2177-91. In order to measure the damping attenuation of SH0 wave over a long distance, seven (7) measurements were performed at various locations from 50 mm to 350 mm away from the transmitter ABT. The interval of two adjacent measurements is 50 mm. Received SH0-mode signals at different locations are shown in FIG. 52 at (a). All the signals were normalized by the maximum absolute amplitude of the signal at 50 mm. It can be noted that the signal amplitudes attenuate with the propagation distance and the wave packets become more dispersive. The curve fitting method was performed to obtain the experimental damping coefficient. The experimental and fitted amplitudes versus the distance are shown in FIG. 52 at (b). The blue cross marker represents the attenuation of experimental signal amplitudes, and the red solid line denotes the curve fitting using the equation of peak wave amplitude at distance r in Mei H, Giurgiutiu V. *Guided wave excitation and propagation in damped composite plates. Struct Health Monit* 2019; 18(3):690-714, see Equation 2:

$$A(r) = \frac{A_0}{\sqrt{r}} e^{-\xi^{Im} r} \quad (2)$$

where $\xi^{Im}$ is responsible for the material attenuation of guided waves and $1/\sqrt{r}$ is related to the geometric spreading attenuation.

The experimental damping coefficient $\xi^{Im}$ of the SH0 mode at 500 kHz was determined as 2.1 Np/m, which is much smaller than these of A0 and S0 modes in 1d. Therefore, in this particular composite plate, the damping effect on the SH0 wave is relatively small. From the time-domain signal, it was observed that a clear SH0-mode signal was measured even at the distance of 350 mm, which demonstrates the feasibility of long-distance damage detection in composites using pure SH0 mode.

Quasi-Isotropic Composite Plate with Simulated Delaminations

Composite Specimen

Figure 53:
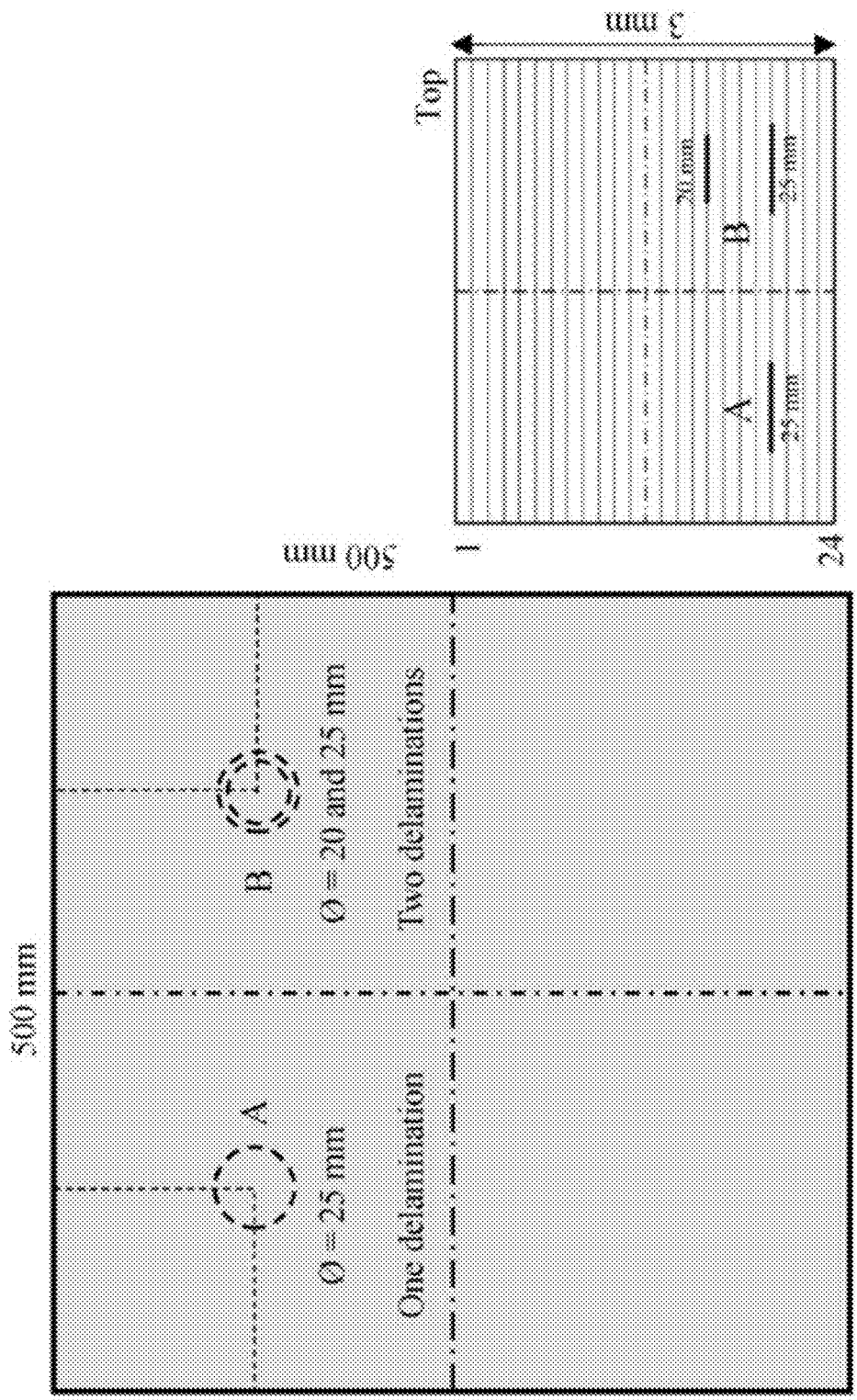
FIG. 53 shows schematic of 3-mm quasi-isotropic [−45/90/45/0]3 s CFRP composite plate with one and two delaminations.

A 3-mm thick quasi-isotropic CFRP composite plate with simulated delaminations was investigated. The dimension of the specimen is 500 mm×500 mm×3 mm. Two different simulated delaminations, one and two delaminations, were generated by inserting Teflon films before curing in the compression molding machine. One delamination was created by inserting one circular Teflon film (25 mm in diameter) between plies 20 and 21. Two delaminations were generated by inserting two Teflon films of different sizes at various depths. First, a large circular Teflon film (25 mm in diameter) was inserted between plies 20 and 21, which is the same size and depth of one delamination. Then, an additional small circular Teflon film (20 mm in diameter) was inserted between plies 16 and 17. The depth of the Teflon insert is based on the experimental results in Wallentine S M, Uchic M D. *A study on ground truth data for impact damaged polymer matrix composites. AIP Conf Proc* 2018; 1949(1):120002. The size was determined from the practical applications, where the typical delamination size for growth monitoring is 1-inch diameter. FIG. 53 shows the schematic of the quasi-isotropic composite plate with purpose-built delaminations.

Ultrasonic Nondestructive Inspection

Figure 54:
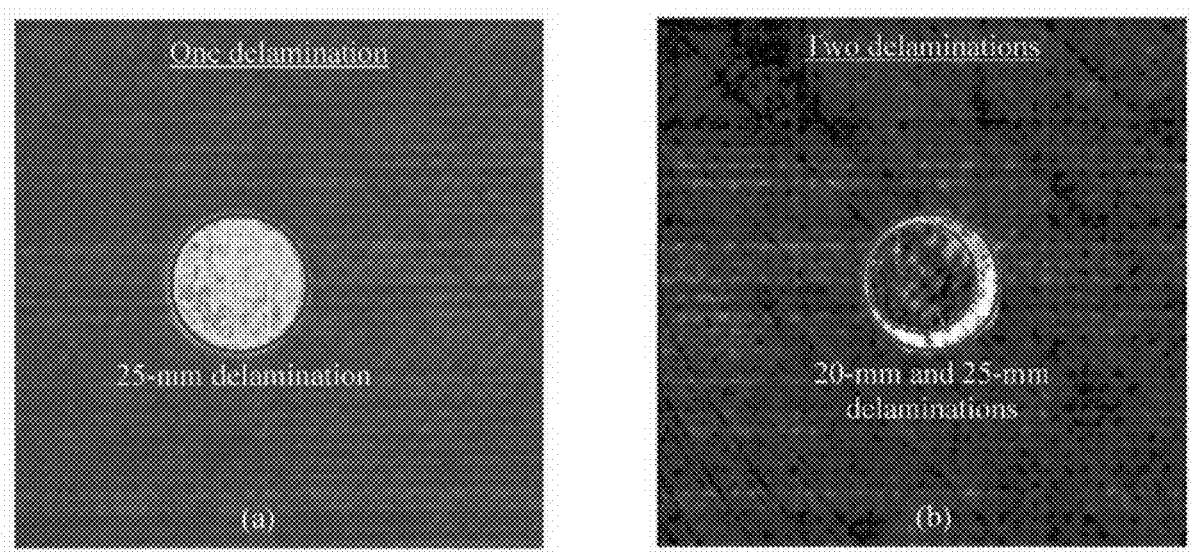
FIG. 54 shows NDE results of the composite plate: (a) one delamination; (b) two delaminations.

Ultrasonic nondestructive evaluation (NDE) was performed on the quasi-isotropic composite plate to verify and image the simulated delaminations. The ultrasonic immersion tank was used to inspect the specimen. In the experiment, a 10 MHz, 1-inch focused transducer was used to detect the delaminations by Teflon inserts. The scan area is 100 mm×100 mm. FIG. 54 shows the C-scan images of NDE results. The C-scan image shows the presence of one and two delaminations. From the C-scan image, 25-mm delamination can be observed for the case of one delamination, whereas a 20-mm shadow was noted at the center of the two delaminations, which means that there is small delamination at a different depth and it blocks the ultrasonic wave to penetrate. Therefore, the shape and size of the simulated delaminations can be visualized and quantified from the ultrasonic C-scan, which is consistent with the design supra.

FE Simulation of SH0 Wave Generation and its Interaction with Delaminations

3D FE models were utilized to simulate the SH0-mode guided wave generation and interaction with different delamination scenarios, i.e., one delamination vs. two delaminations, in the 3 mm thick quasi-isotropic CFRP composite plate.

Delamination Modeling.

Figure 55:
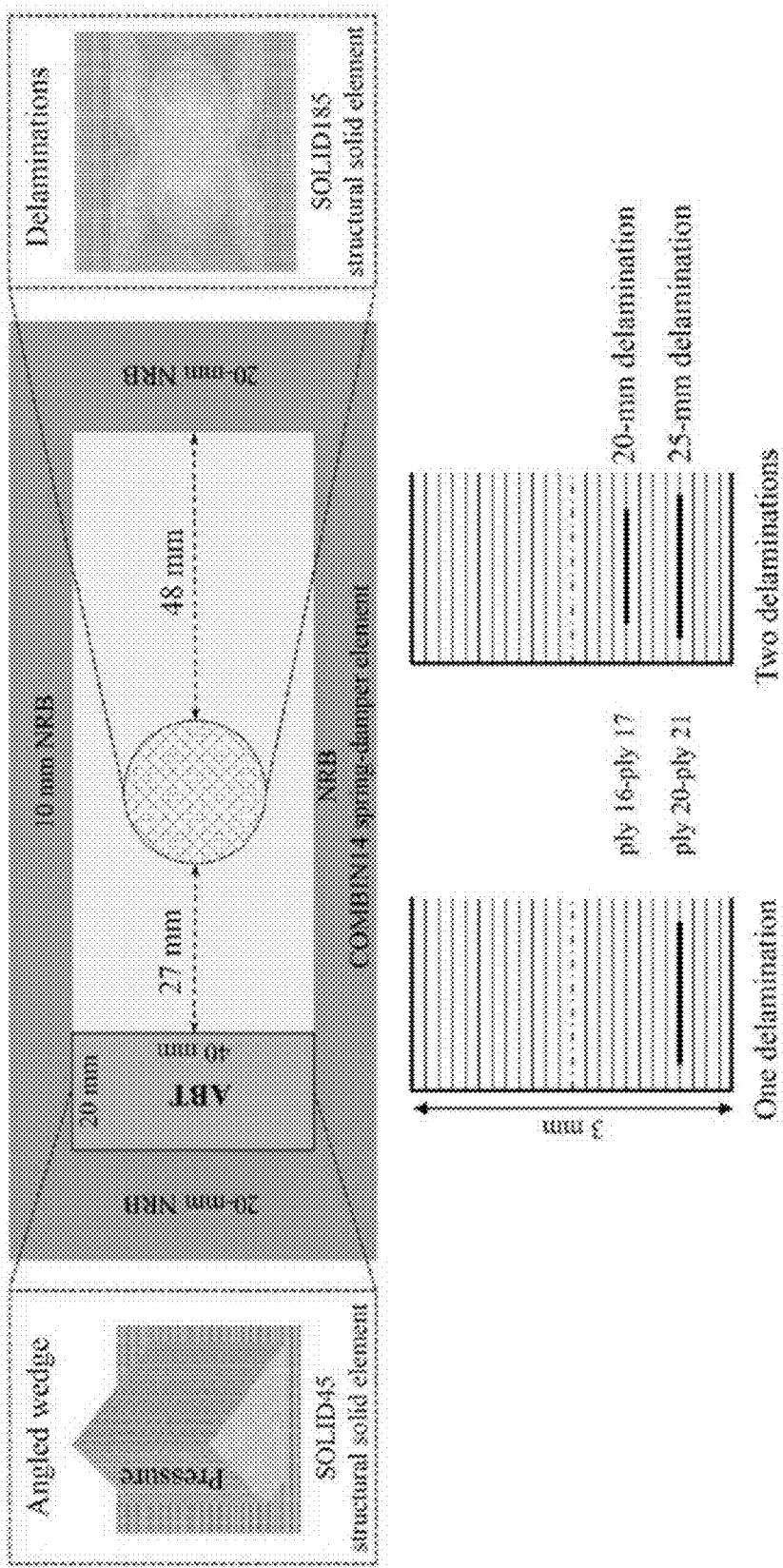
FIG. 55 shows 3D FE model of the 3-mm quasi-isotropic CFRP composite plate with one delamination and two delaminations.

Three sets of simulations were conducted: (1) pristine plate; (2) damaged plate with one delamination; (3) damaged plate with two delaminations. FIG. 55 shows the 3D FE models of the 3-mm quasi-isotropic composite plate with one delamination and two delaminations. The delaminations were modeled by detaching the nodes in the delamination regions, which has been widely used by many authors, see Ramadas C, Balasubramaniam K, Joshi M, Krishnamurthy C V. *Interaction of the primary anti-symmetric Lamb mode ($A_0$) with symmetric delaminations: numerical and experimental studies. Smart Mater Struct* 2009; 18(8):085011 and Ramadas C, Balasubramaniam K, Joshi M, Krishnamurthy C V. *Interaction of guided Lamb waves with an asymmetrically located delamination in a laminated composite plate. Smart Mater Struct* 2010; 19(6):065009. To excite pure SH0 wave at 500 kHz, the incident angle of the angled wedge is set to 48 based on the theoretical ABT tuning angle. A pressure was applied perpendicular to the wedge top surface to simulate the ABT excitation. The excitation signal is a three-count Hanning window modulated tone burst with the center frequency of 500 kHz. NRB was implemented around the FE models to calculate the transient response under the ABT excitation. The angled wedge was modeled with structural solid elements (SOLID45) in the commercial finite element package ANSYS 17. Structural solid elements (SOLID185) were used to mesh the quasi-isotropic composite plate. COMBIN14 spring-damper elements were utilized to construct the NRB. The mesh size adopted in this study was 0.5 mm for in-plane direction to guarantee that more than 20 elements exist per wavelength and 0.125 mm for the thickness direction to ensure that each ply contains at least one element. The delamination regions were meshed with even finer elements to accommodate the high-stress gradient. The time step was set to 0.1 us to ensure the convergence.

Simulation Results.

Figure 56:
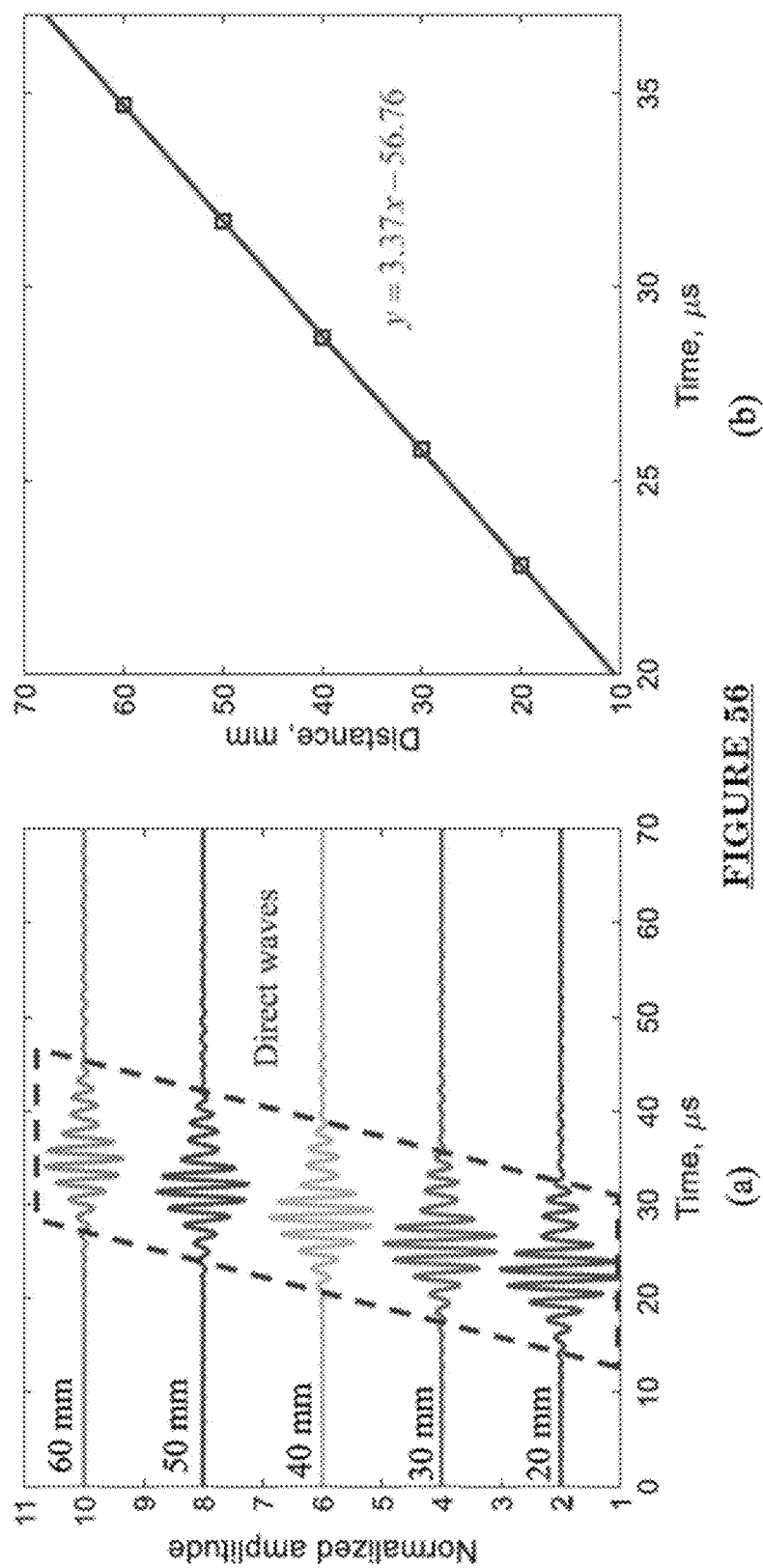
FIG. 56 shows extracted FEM waveforms and the group velocity calculation for the 3-mm quasi-isotropic CFRP composite plate: (a) waveforms at various locations; (b) correlation between distance and time of flight.

First, the waveforms (in-plane displacement $u_y$) at five various locations were extracted from the pristine FE model, as shown in FIG. 56 at (a). Compared to the experimental waveforms in FIG. 51 at (a), it can be found that the FE waveforms are much more dispersive. The TOF of the direct wave packet was determined and plotted as a function of distance, as shown in FIG. 56 at (b). A linear regression was used to calculate the group velocity, yielding a value of 3.37 mm/μs, which agrees well with the theoretical SH0-mode group velocity of 3.41 mm/μs at 500 kHz. Therefore, both FE simulations and experimental results demonstrated that the pressure-wave angle beam transducers could successfully excite pure-mode SH0 wave in this quasi-isotropic CFRP composite plate.

Second, the out-of-plane displacement on the top surface was extracted to visualize the SH0-mode guided wave interaction with delaminations.

Figure 57:
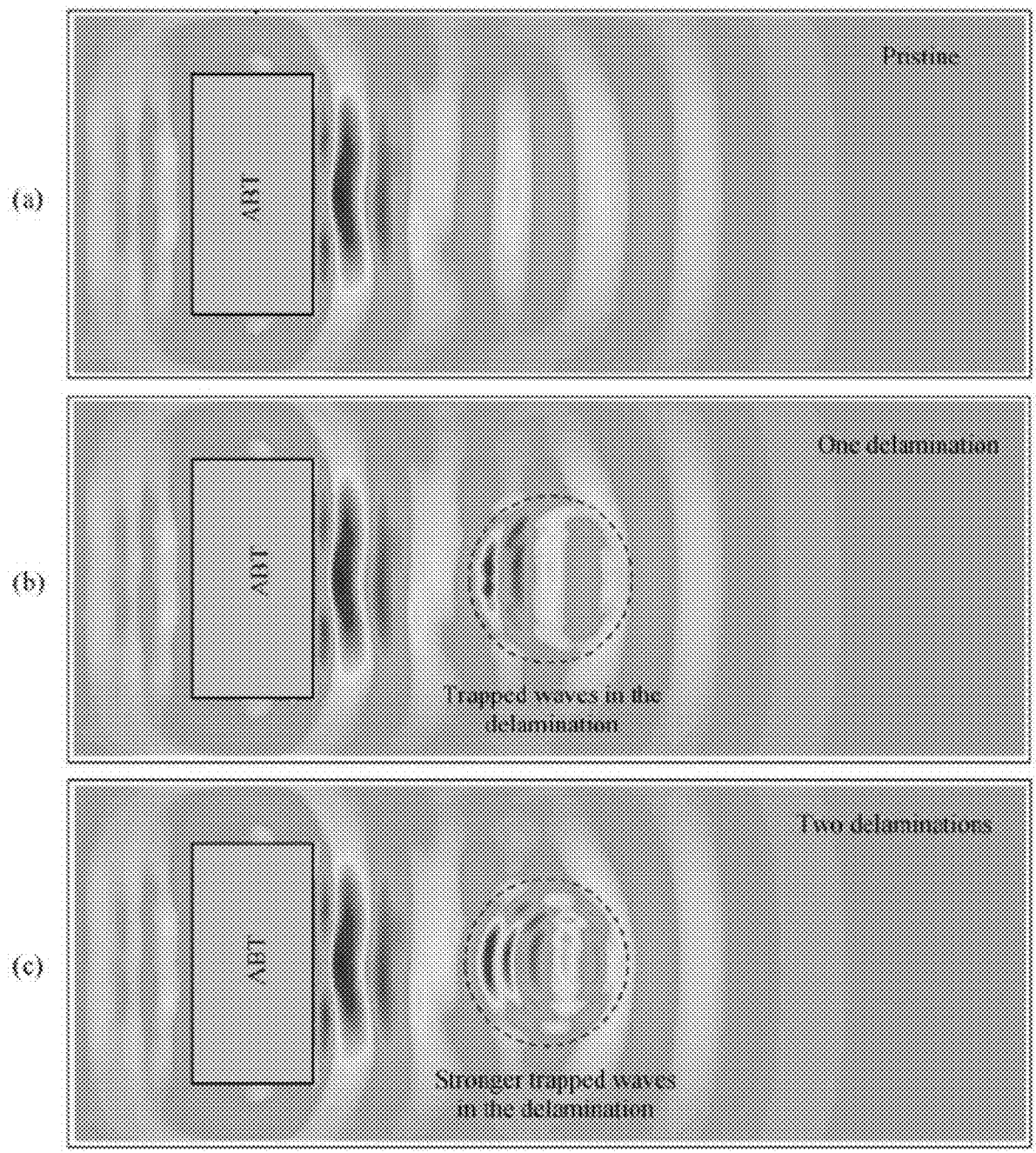
FIG. 57 shows a comparison of the transient spatial wavefield in the quasi-isotropic CFRP composite plate at: (a) pristine plate; (b) one delamination; (b) two delaminations.

FIG. 57 shows the comparison of the transient spatial wavefield among the pristine plate, one delamination, and two delaminations. For the pristine case in FIG. 57 at (a), it can be found that a straight-crested wavefront was generated by the ABT excitation, strong near the wave source, and weak at the far field due to the outward propagation pattern. No strong boundary reflections were observed due to the utilization of the NRB. FIG. 57 at (b) and (c) shows the guided wave interaction with one delamination and two delaminations, respectively. For the case of one delamination, it was found that strong trapped waves in the delamination region were clearly observed. Previous studies have confirmed the multiple reflections within the delamination regions and a considerable amount of ultrasonic energy is trapped, see Hayashi T, Kawashima K. *Multiple reflections of Lamb waves at a delamination. Ultrasonics* 2002; 40(1-8):193-7 and Ramadas C, Balasubramaniam K, Joshi M, Krishnamurthy C V. *Numerical and experimental studies on propagation of A0 mode in a composite plate containing semi-infinite delamination: observation of turning modes. Compos Struct* 2011; 93 (7):1929-38 and Panda R S, Rajagopal P, Balasubramaniam K. *Characterization of delamination-type damages in composite laminates using guided wave visualization and air-coupled ultrasound. Struct*

*Health Monit* 2017; 16(2):142-52 as well as Mei H, Migot A, Haider M F, Joseph R, Bhuiyan M Y, Giurgiutiu V. *Vibration-based in-situ detection and quantification of delamination in composite plates. Sensors* 2019; 19(7): 1734.

In addition, a much stronger trapped wave was noted for the case of two delaminations compared to the results of one delamination, which indicates that the more delaminations, the stronger the wave energy trapped. Therefore, the trapped energy which is related to the delamination severity can be used to detect and separate one delamination and two delaminations.

The FEM waveforms of the delaminations and the direct comparison with experimental waveforms were presented in the following section.

Delamination Detection and Validation Using Pure SH0 Mode Guided Wave

Figure 58:
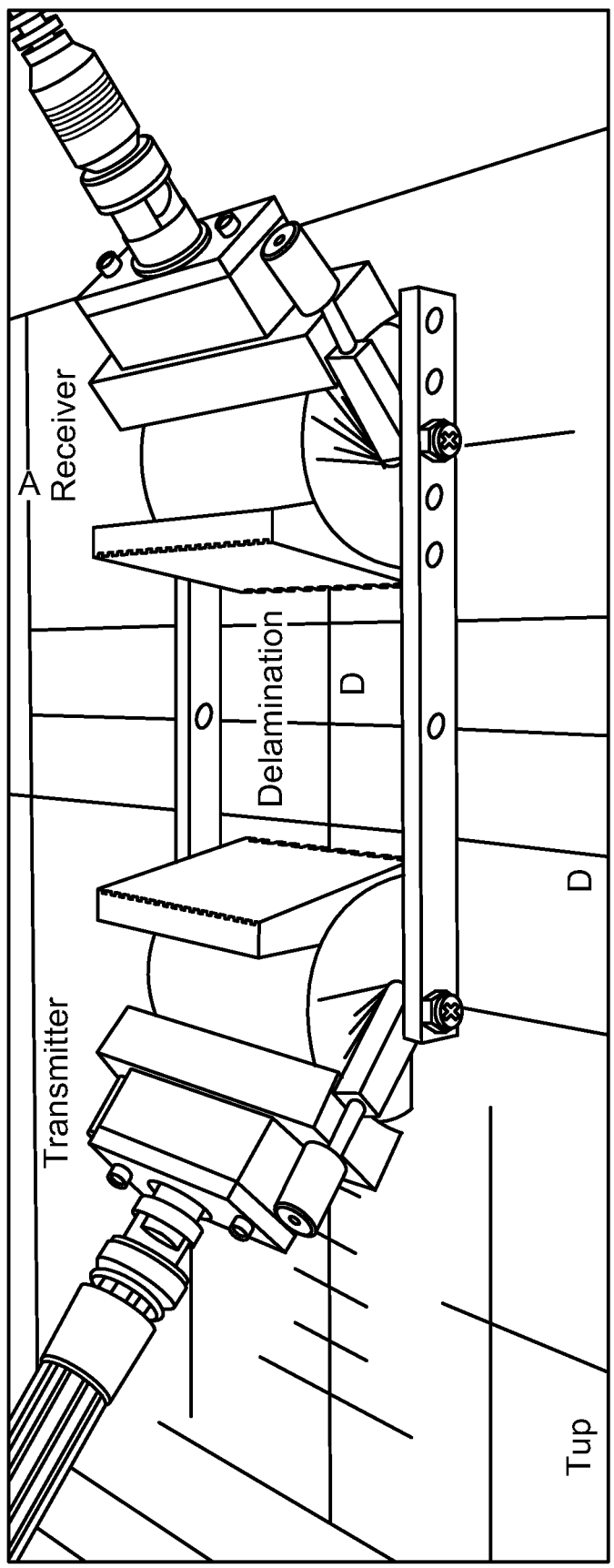
FIG. 58 shows an experimental setup for delamination detection in the quasi-isotropic composite plate.

The adjustable ABT pair was used as the transmitter and receiver to generate the pure SH0-mode guided wave and detect delaminations. A spacing of 100 mm was ensured between transmitter and receiver using a rigid frame, as presented in FIG. 58. For the inspection using SH0 mode at 500 kHz, the incident angle of the wedge was set to 48°. A narrow-band three-count tone burst at the central frequency of 500 kHz was used as the excitation signal.

Figure 59:
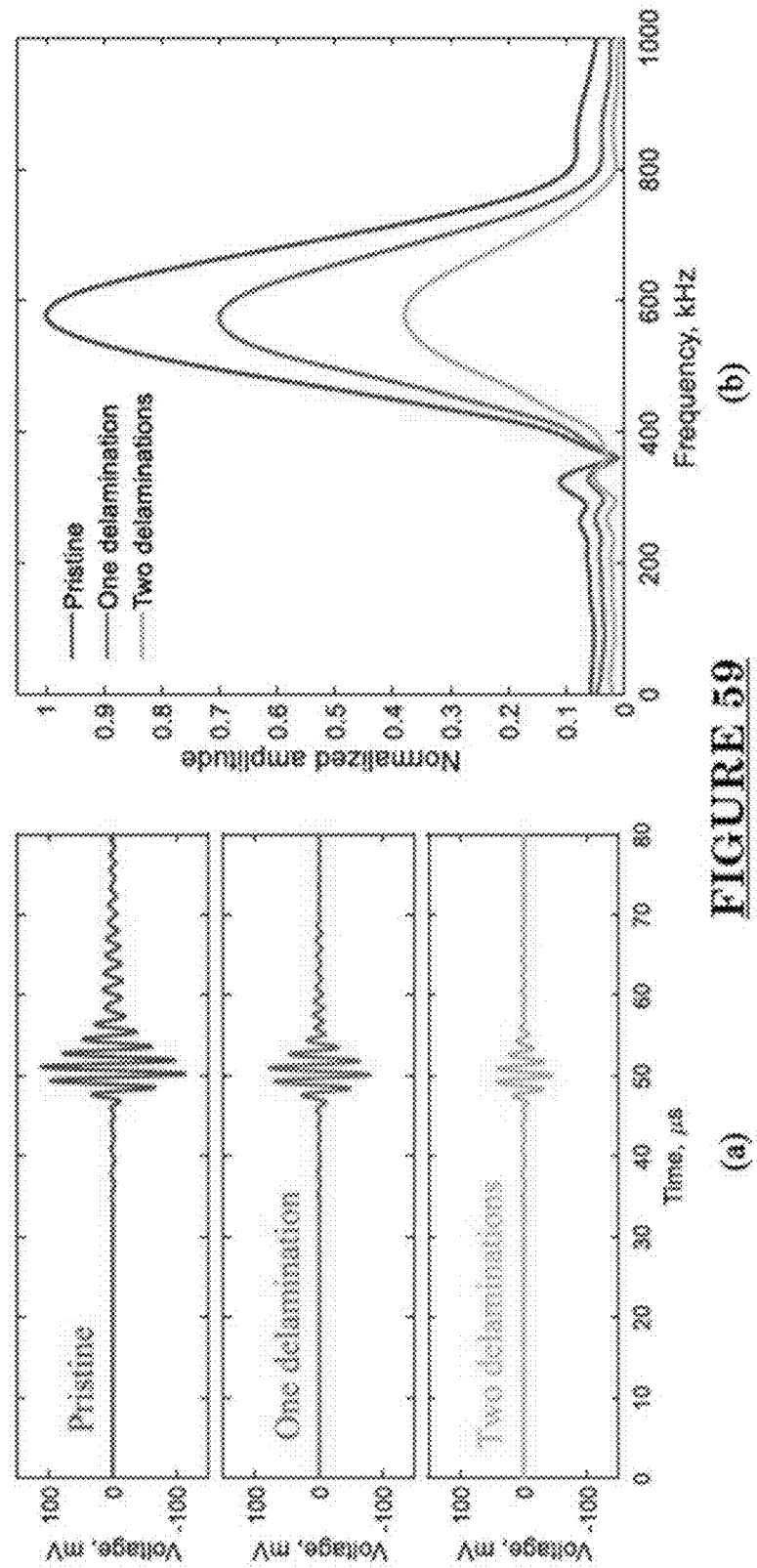
FIG. 59 shows experimental signal comparison among pristine and delaminations using the pure SH0 mode generated by angle beam transducers at: (a) measured signals; (b) FFT results.

Signal comparison among the pristine and delaminations is shown in FIG. 59. It can be found that strong and non-dispersive wave packets were clearly observed in the response signals, as shown in FIG. 59 at (a). The peak-to-peak amplitude of the SH0 mode response signals are around 220 mV, 150 mV, and 90 mV for the pristine case, one delamination, and two delaminations, respectively. The amplitude drop can be clearly observed due to the presence of delaminations. In addition, the amplitude further decreased when the delamination number increases from one to two. Similarly, amplitude drop can be noted in the frequency spectrum, as shown in FIG. 59 at (b). Therefore, delaminations simulated by Teflon inserts can be successfully detected using the pure SH0 mode. One and two delaminations was distinguished based on the amplitude information.

Figure 60:
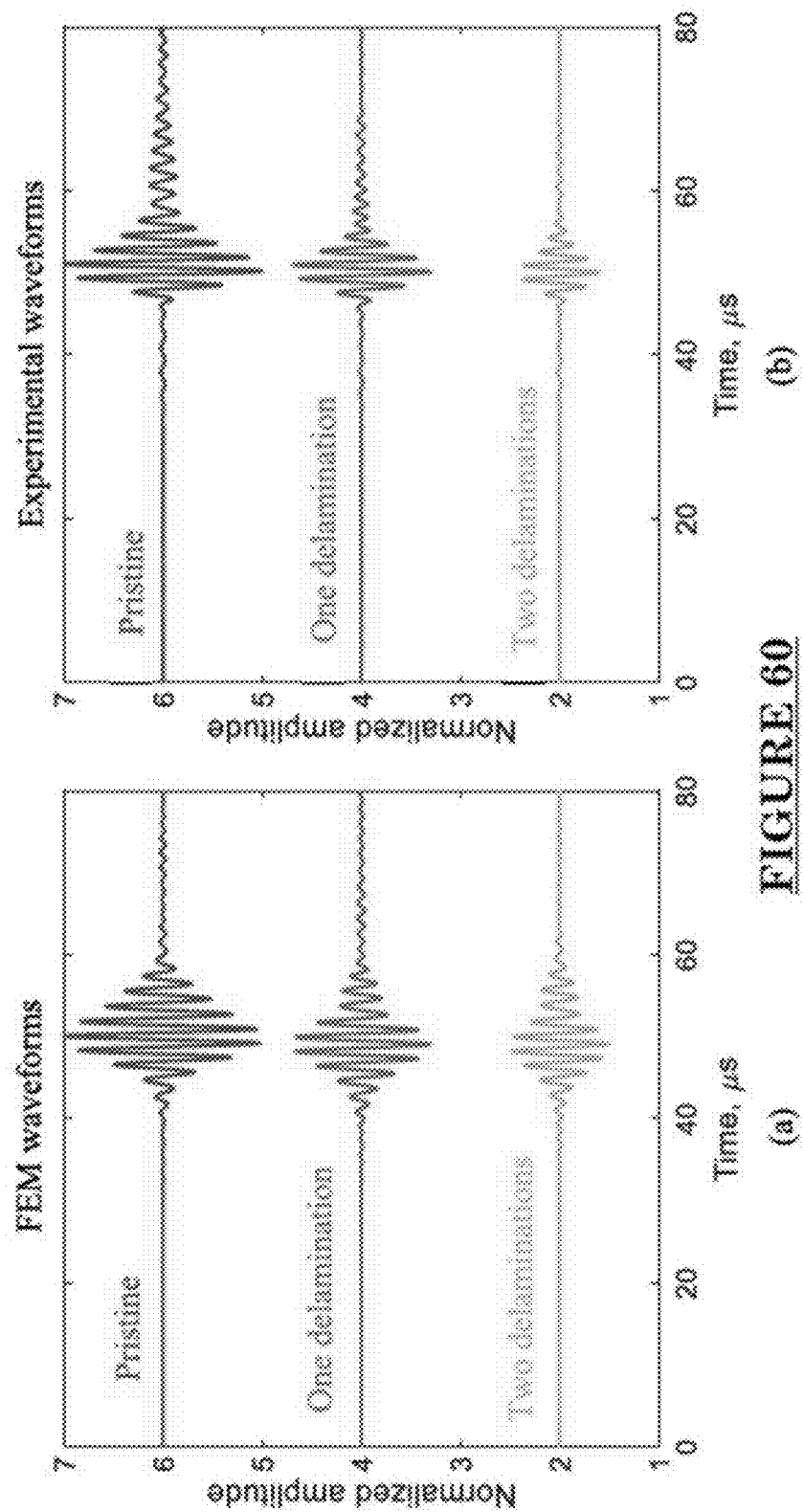
FIG. 60 shows a comparison between FEM simulation and experimental waveforms for SH0 mode: (a) FEM waveforms; (b) experimental waveforms.

In order to verify the experimental results as shown in FIG. 59, the FEM waveforms (in-plane displacements $u_y$) were extracted from the simulation results supra. FIG. 60 shows the signal comparison between FEM and the experimental waveforms. The FEM waveforms were normalized by the maximum absolute amplitude of the pristine signal, as shown in FIG. 60 at (a). The normalized experimental waveforms were presented in FIG. 60 at (b). It can be found that a good match between the simulation and the experiment was achieved. FEM waveforms are more dispersive than the experimental waveforms. Amplitude drops due to the SH0 wave interaction with delaminations were clearly observed in both the simulation and the experiment. Note that amplitudes of the delamination signals in the experiment are slightly weaker than in the FEM simulation. It is expected that this is due to the differences between Teflon inserts for the simulated delaminations in the experiment and the node detachment (zero volume delamination) in the simulation. Both numerical and experimental results confirmed that the SH0-mode amplitude further decreased when an additional delamination exists through the composite thickness.

Figure 61:
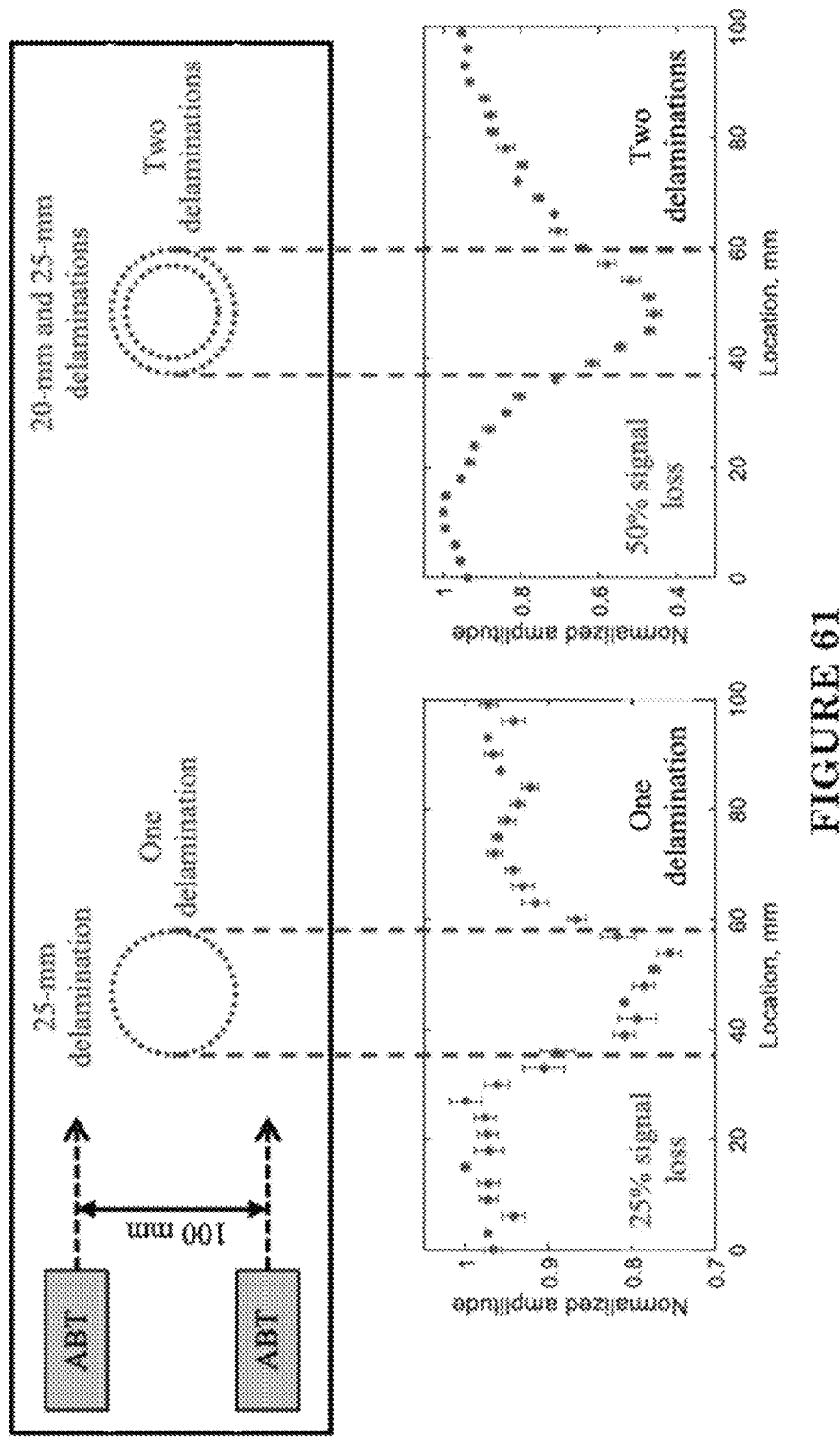
FIG. 61 shows a size estimation of one delamination and two delaminations using pure SH0 mode generated by angle beam transducers.

To estimate the sizes of the delaminations, a line scanning method was developed by moving the adjustable ABT pair with a step of 3 mm to cover the delaminations, as shown in FIG. 61. Error bars were obtained from the data of three repeated experiments to ensure the consistency and accuracy of the experiment. It can be found that a good consistency was achieved, and a significant amplitude drop was observed from the maximum amplitude at various locations. For the comparison between one and two delaminations, a 25% signal loss was observed for the case of one delamination, whereas a 50% signal loss can be noted for the case of two delaminations. Thus, a further amplitude drop was observed when the number of delamination increases. The sizes of both one and two delaminations can be roughly estimated from the maximum amplitude information at various locations, which agrees with the ultrasonic C-scan results.

Quasi-Isotropic Composite Plate with Impact Damage

A coupon was cut from the 3-mm quasi-isotropic CFRP composite plate and was used to conduct the impact testing. Then, the pure SH0 mode generated by adjustable ABT was used to detect the impact damage and estimate its size.

Impact Testing and Ultrasonic Nondestructive Inspection

Drop-weight tower 6200 with low friction guide rails 6202 was used to induce collision between a mass of known weight and a fixed composite specimen. Tower 6200 includes conveyor 6204, hoist control 6206, impact carriage 6208, load cell 6210, tup 6212, clamping assembly 6214, ASTM D7136 Fixture 6216, and velocity sensor assembly 6218.

Figure 62:
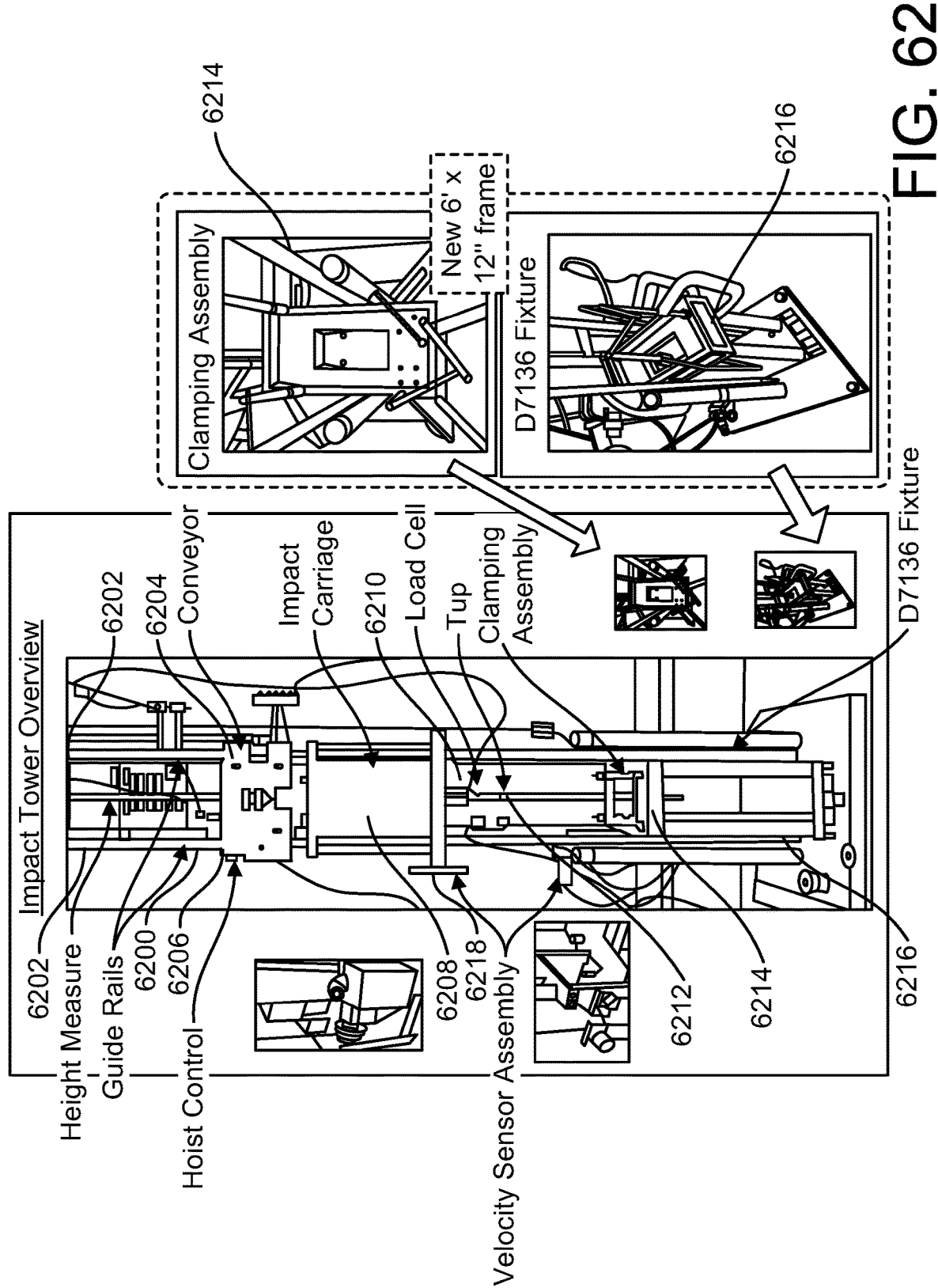
FIG. 62 shows a Dynatup 8200 drop-weight impact testing machine with the modified fixture.

In order to conduct the impact testing on a larger specimen, the specimen dimensions were changed from 6"×4" (standard ASTM dimension) to 12"×6" (the maximum in-plane dimension of the ASTM D7136 fixture). Two rectangular frames were constructed that can hold the specimen and be clamped to the D7136 fixture to conduct impact tests on the same drop-weight tower. The modified experimental setup is shown in FIG. 62. The controlled impact event is recorded by a piezoelectric load cell, which can accurately record data of the applied impact force, energy absorbed by the specimen, and the displacement of the specimen during the impact event.

A 12"×6" coupon was cut from the 3-mm quasi-isotropic CFRP composite plate and was used to conduct the impact testing. The details of the impact testing are given in Table 2, see FIG. 63. This table indicates that the coupon was impacted by an impactor mass of 3.06 kg with the potential energy of 17.56 J. This energy was chosen from engineering judgment to try to obtain a 1-inch impact damage size in the 3-mm thick composite coupon.

Figure 64:
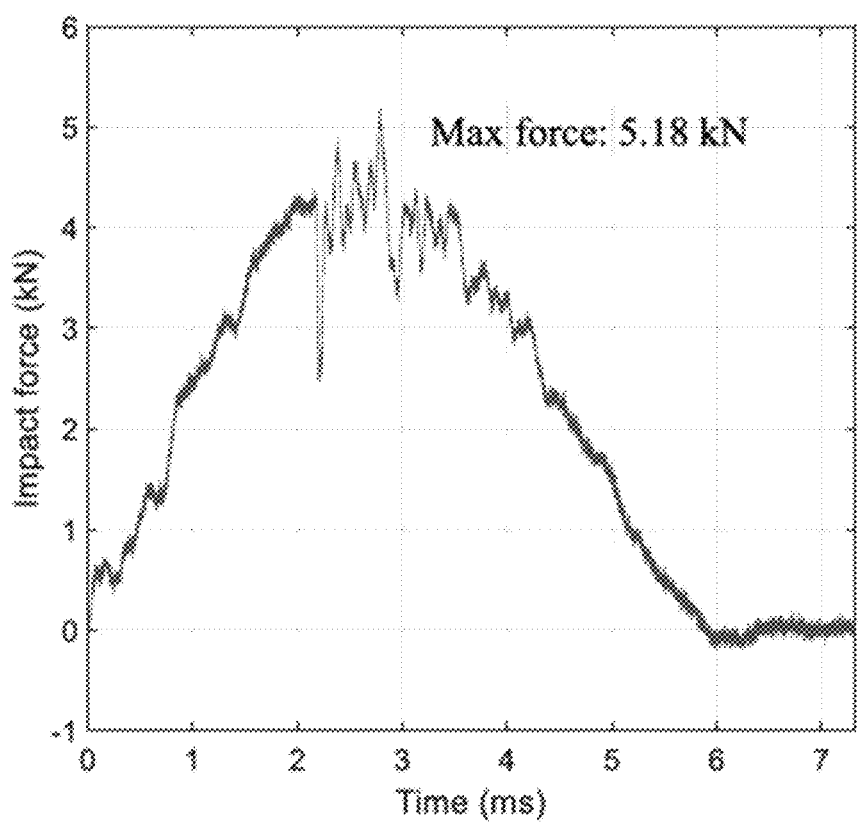
FIG. 64 shows force-time history of the 3-mm thick quasi-isotropic composite coupon.

The force-time history of the impact event is given in FIG. 64. The load curve shows peaks at a certain maximum load and is parabolic in shape. The maximum-recorded contact force for this impact event was 5.18 kN. When the load curve is symmetric, its shape indicates that the impact energy is primarily deflected and little or no damage has occurred in the specimen. When there are irregularities in the parabolic shape of the load curve, this indicates that the specimen has undergone extensive internal damage, see Sun X C, Hallett S R. *Barely visible impact damage in scaled composite laminates: experiments and numerical simulations. Int J Impact Eng* 2017; 109:178-95.

Figure 65:
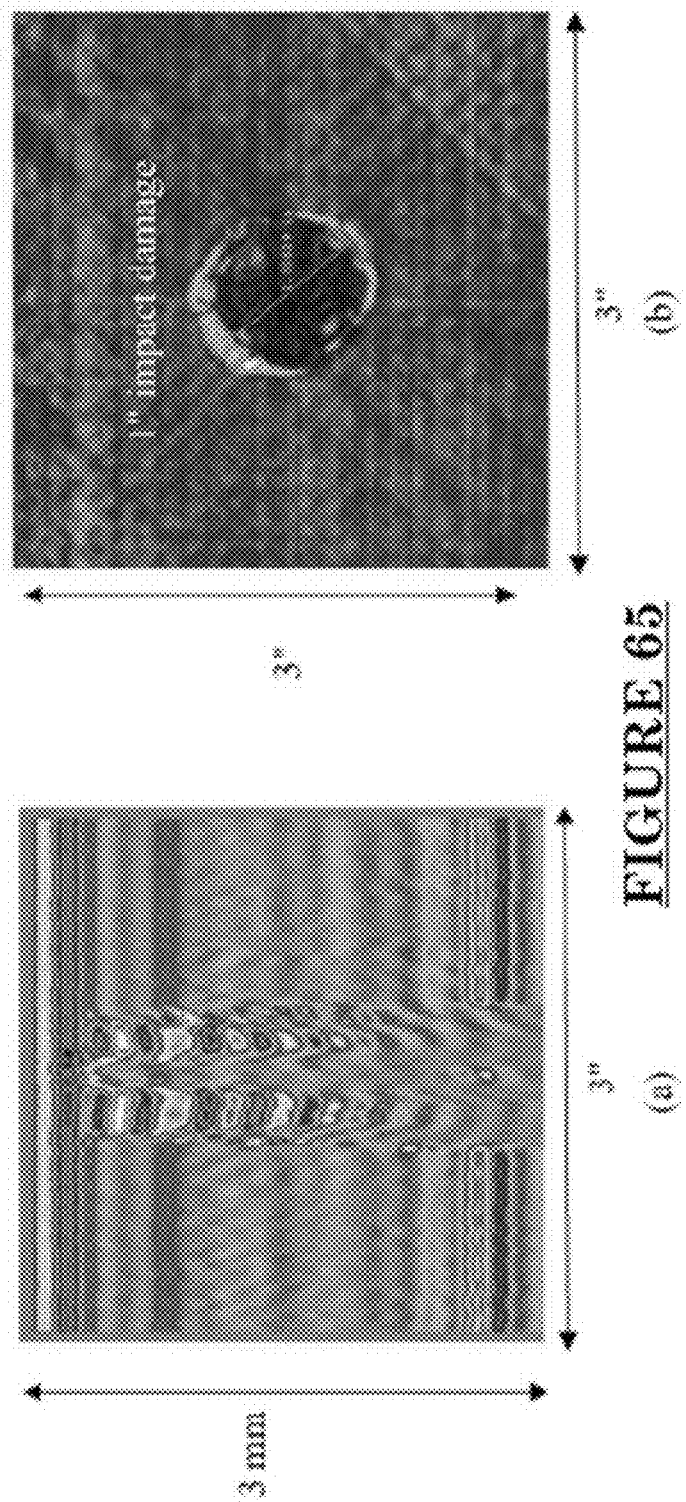
FIG. 65 shows an ultrasonic inspection results of the coupon after impact testing at: (a) B-scan; (b) C-scan.

After the impact testing, an ultrasonic NDE inspection was conducted using a 10 MHz, 1-inch focused transducer. The NDE inspection results are shown in FIG. 65. From the C-scan results, it can be found that the size of the impact damage obtained is around 1 inch. Multiple impact-induced delaminations across the thickness were observed from the B-scan result, as shown in FIG. 65 at (a).

Impact Damage Detection Using Pure SH0 Mode Guided Wave

Figure 66:
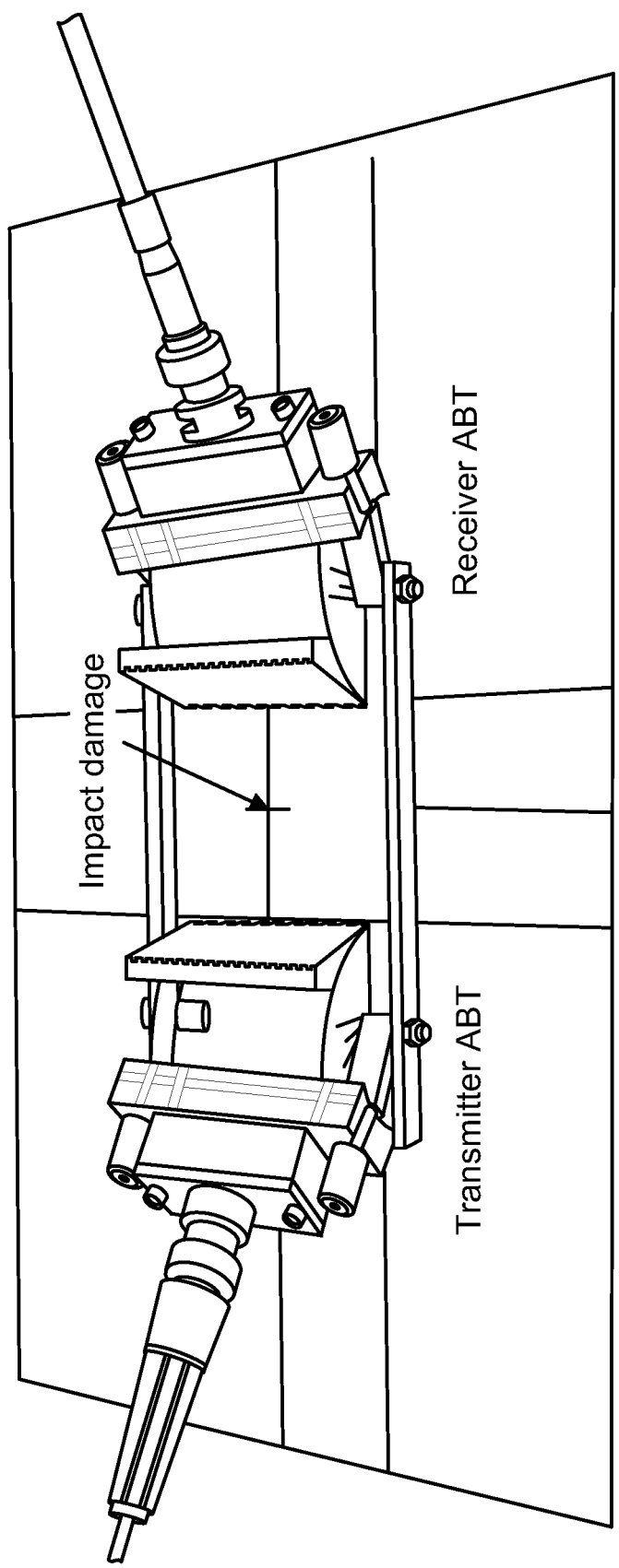
FIG. 66 shows an experimental setup for the impact damage detection using adjustable ABT pair.

The adjustable ABT pair was used to generate pure SH0 mode guided wave and detect the impact damage in the 3-mm quasi-isotropic CFRP coupon after impact testing. A spacing of 100 mm was ensured between the transmitter ABT and receiver ABT using a rigid frame, as shown in FIG. 66. The incident angle of the wedge was set to 480 for pure SH0 mode excitation at 500 kHz. A three-count tone-burst excitation at the central frequency of 500 kHz was used as the excitation signal.

Figure 67:
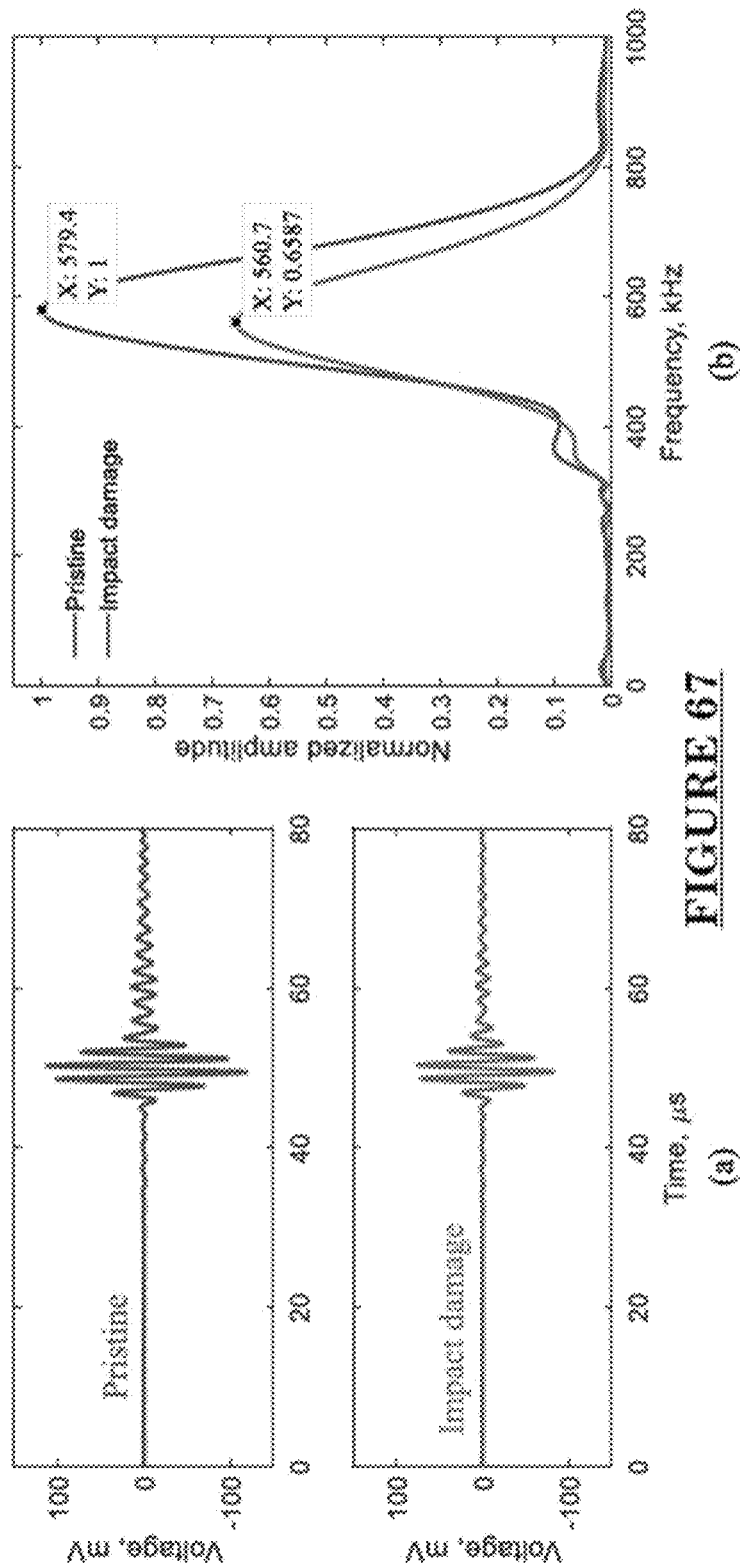
FIG. 67 shows a signal comparison between the pristine and impact damage: (a) signals; (b) FFT results.

Signal comparison between the pristine and impact damage is shown in FIG. 67. Strong response signals with a high signal-to-noise ratio were observed for both cases showing non-dispersive wave packets, as presented in FIG. 67 at (a). The peak-to-peak amplitude of the SH0-mode response signals for the pristine and the impact damage are around 220 mV and 160 mV, respectively. The amplitude drop was clearly observed due to the presence of impact damage. Therefore, the impact damage can be successfully detected using the pure SH0 mode generated by the angle beam transducers. Similarly, amplitude drop and a large peak shift were noted from the frequency spectrum, as shown in FIG. 67 at (b). This is because the impact damage, in the form of matrix cracking, fiber breakage, and interlaminar delamination, will cause a significant reduction in the local stiffness and increase in the local damping. This local stiffness reduction will cause the frequency shift as observed in the experiment. In addition, the large frequency shift is also due to the local damping effect. Because the wave undergoes a frequency dependent attenuation as it travels, which preferentially absorbs the high frequency components.

Figure 68:
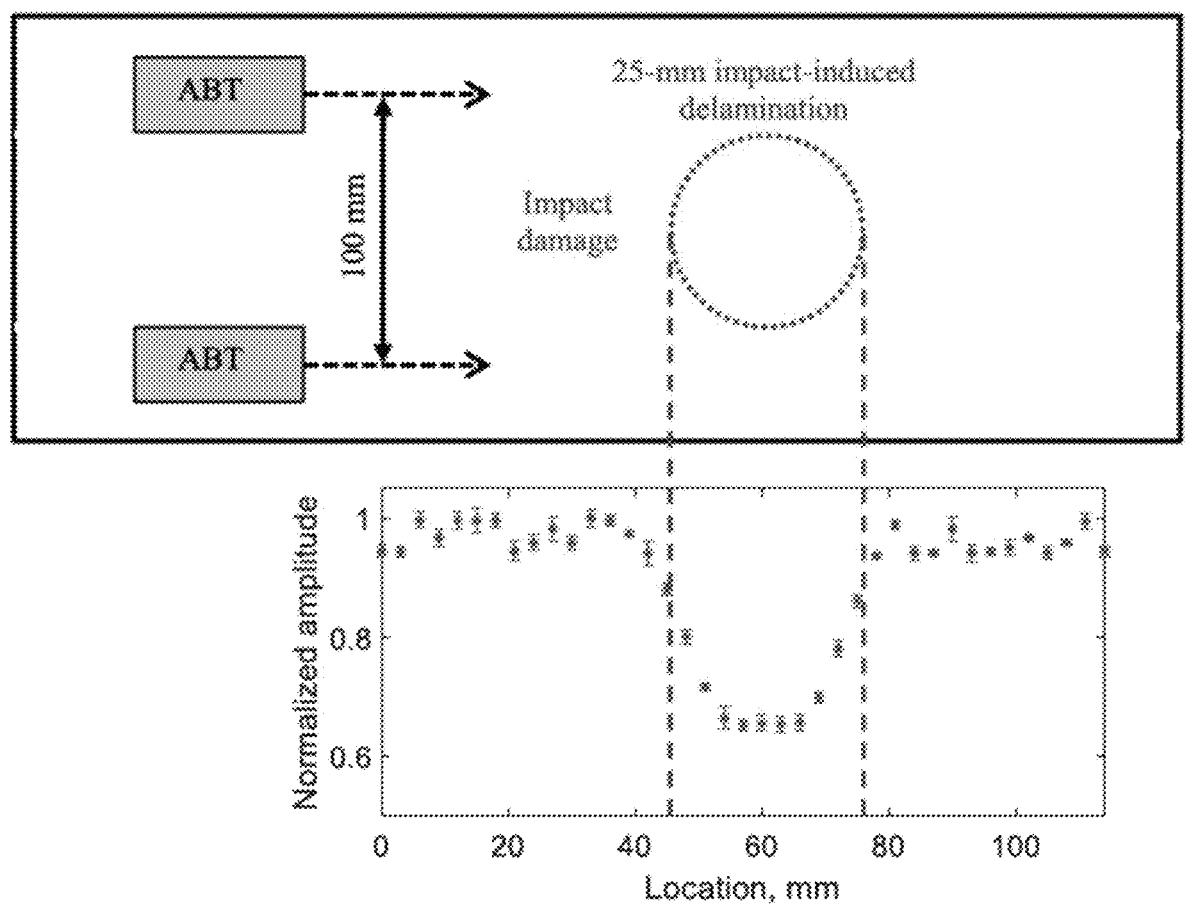
FIG. 68 shows impact damage size estimation using adjustable ABT pair to generate pure SH0 mode, showing the amplitude drop (marks with error bars) in the impact damage region.

In order to estimate the size of the impact damage, the line scanning method was used by moving the ABT pair with a step of 3 mm to cover the impact damage, as shown in FIG. 68. In the experiment, error bars were obtained from the data of three repeated experiments. It can be noted that a very good consistency result was achieved. Moreover, it can be found that a notable amplitude drop was observed from the maximum amplitude at various locations, as presented in FIG. 68. The size of impact damage can be roughly estimated as 25 mm from the amplitude information at various locations, which matches the ultrasonic C-scan results herein. Therefore, the pure SH0 mode generated by angle beam transducers was successfully used to detect and quantify the impact damage.

SUMMARY

The current disclosure presents a method using single-mode guided wave excited by adjustable ABT for detecting various composite damage types. First, pure S0 mode generation and damage detection were conducted in a 1.5-mm crossply composite plate. The ABT tuning angle of the single-mode guided wave was calculated from the theoretical phase-velocity dispersion curve based on Snell's law. Then, FE simulation and experiment were conducted to verify and validate the pure S0 mode excitation in the crossply composite plate. In addition, the pure S0 mode was utilized to detect wrinkle damage in the crossply composite plate. Finally, both FEM simulation and the experiment confirmed that pure SH0 mode was successfully generated by pressure-wave angle beam transducers in a 3-mm quasi-isotropic composite. The damage attenuation of SH0 mode was measured experimentally through curve fitting. 3D FE simulations were carried out to investigate the SH0 wave interaction with multilayer delaminations in the quasi-isotropic composite plate. The pure SH0 mode was used to detect delaminations simulated by Teflon inserts and the impact damage in the quasi-isotropic composite plate. A linear scanning method was developed to estimate the sizes of simulated delaminations and impact damage. The estimated damage sizes were also compared with the data obtained by a conventional ultrasonic C-scan. A good match was achieved. It was found that all the measured signals maintained a high signal-to-noise ratio even in the presence of damage and the considerable attenuation in composites. A significant amplitude drop was clearly observed due to the presence of various damage types and the damage size was successfully evaluated from the linear scanning method based on signal amplitudes at various locations. The damage severity was also determined from the amplitude change, where a further amplitude drop can be clearly noted when the number of delamination increases.

The current disclosure provides selectable single-mode excitation of S0 and SH0 guided waves in composite structures using adjustable ABT. This is the first time when pressure-wave ABT was used to excite pure SH0 waves in quasi-isotropic composites, a fact which is not possible in isotropic metals. In composites with certain layups, such as quasi-isotropic composites, coupling exists between pressure and shear waves. This disclosure shows that such coupling can be exploited to generate pure SH0 waves using pressure transducers impinging at the appropriate oblique angle. The use of pure SH0 waves has certain advantages for damage detection in the quasi-isotropic composite plate. Both numerical and experimental results confirm that the SH0-mode amplitude drop due to the trapped waves in the delamination regions is potentially related to the delamination severity. The pure-mode guided wave can be used to detect various types of composite manufacturing flaws and operational damage including simulated wrinkles, simulated delamination, and actual impact damage. The present method of simply measuring the change in the amplitude and frequency spectrum can detect various composite damage types, which is simple, reliable, and suitable for the quick and large-area inspection. This method has great potential for a quick inspection of various damage types in composite structures. In this method, no baseline measurement was required, which is important in practical use. This method is much more efficient than the point-by-point through-thickness scan used in conventional C-scan technique because guided waves can propagate a long distance with less energy loss. Considerable time saving can be achieved while maintaining the ability to evaluate the various composite damage types.

The current disclosure has myriad industrial applications including, but not limited to, single mode guided wave excitation and detection, pure SH wave generation in composites, guided-wave detection over large area of aerospace composite structures, inspection and detection of different types of damage (impact damage, delamination and wrinkle) in composite materials, distinguish between different types of damage using multi-mode guided-wave detection, and detecting mode conversion upon interaction with damage.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be ex-pressed herein in a range format. It will be further understood that the endpoints of each of the ranges are significant both in relation to the other endpoint, and independently of the other end-point. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be under-stood that the particular value forms a further aspect. For example, if the value "about 10" is dis-closed, then "10" is also disclosed.

It is to be understood that such a range format is used for convenience and brevity, and thus, should be interpreted in a flexible manner to include not only the numerical values explicitly re-cited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for detecting various types of damage in composites comprising:
    employing at least one adjustable angle beam transducer to achieve single-mode guided wave excitation by generating a shear horizontal (SH0) wave excited into at least one quasi-isotropic composite via intrinsic shear coupling present in the at least one quasi-isotropic composite;
    observing wave propagation and interaction within a test subject;
    and detecting damage in the test subject; and
    employing at least two different modes of wave propagation to detect and identify different types of damage, wherein the method can separate detection of delamination from impact damage other than delamination including matrix cracking and fiber breakage to the test subject.

2. The method of claim 1, further comprising indicating damage in the test subject via an SH0 amplitude drop.

3. The method of claim 1, further comprising estimating a size of at least one delamination and impact damage via linear scanning.

4. The method of claim 1, wherein the least one adjustable angle beam transducer impinges on the test subject at an oblique angle.

5. The method of claim 1, further comprising adjusting a tuning angel via an angle-adjustable wedge.

6. The method of claim 5, wherein the tuning angle is calculated via the equation: $\sin \theta = c_w/c$
    wherein;
    $\theta$ is an incident angle of pressure waves impinging on the test subject;
    $c_w$ is velocity of the pressure waves impinging on the test subject; and
    c is phase velocity of a wave mode at a selected frequency in the test subject.

7. The method of claim 5, wherein the tuning angle is adjusted from 0 to 70 degrees.

8. The method of claim 1, further comprising obtaining a phase-velocity dispersion curve of the test subject.

9. The method of claim 1, further comprising trapped energy analysis indicating a number of delaminations in the test subject.

10. A nondestructive inspection method comprising:
    exciting at least one adjustable angle beam transducer with an excitation signal;
    achieving single-mode guided wave excitation;

generating a shear horizontal (SH0) wave, via the at least one adjustable angle beam transducer, excited into at least one quasi-isotropic composite via intrinsic shear coupling present in the at least one quasi-isotropic composite;

observing wave propagation and interaction with a test subject; and detecting damage in the test subject; and employing at least two different modes of wave propagation to detect and identify different types of damage, wherein the method can separate detection of delamination from impact damage other than delamination including matrix cracking and fiber breakage to the test subject.

11. The method of claim 10, further comprising using trapped energy analysis to separate locations of multiple delaminations in the test subject.

12. The method of claim 10, further comprising employing at least two adjustable angle beam transducers with one acting as a transmitter and one acting as a receiver.

13. The method of claim 10, further comprising detecting a SH0 amplitude drop to estimate a size of damage to a test subject.

14. The method of claim 10, further comprising conducting line scanning using at least two adjustable angle beam transducers.

15. The method of claim 14, further comprising determining a size of impact damage on the test subject via linear scanning.

16. The method of claim 10, further comprising adjusting a tuning angel via an angle-adjustable wedge.

17. The method of claim 16, wherein the tuning angle is calculated via the equation:

$$\sin \theta = c_w/c$$

wherein;

$\theta$ is an incident angle of pressure waves impinging on the test subject;

$c_w$ is velocity of the pressure waves impinging on the test subject;

c is phase velocity of a wave mode at a selected frequency in the test subject; and with at least one specific value of c based on a mode selected for excitation.

18. The method of claim 16, wherein the tuning angle is adjusted from 0 to 70 degrees.

\* \* \* \* \*